US012668040B2

(12) United States Patent
Yasuda et al.

(10) Patent No.: US 12,668,040 B2
(45) Date of Patent: Jun. 30, 2026

(54) PACKAGING MATERIAL FOR POWER STORAGE DEVICE, METHOD OF PRODUCING SAME, AND POWER STORAGE DEVICE

(71) Applicant: DAI NIPPON PRINTING CO., LTD., Tokyo (JP)

(72) Inventors: Daisuke Yasuda, Tokyo (JP); Takanori Yamashita, Tokyo (JP); Tetsuya Ojiri, Tokyo (JP); Hiroyuki Kotera, Tokyo (JP); Tsuyoshi Ito, Tokyo (JP); Yoshiko Kiyohara, Tokyo (JP); Kazufumi Kodani, Tokyo (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 901 days.

(21) Appl. No.: 17/914,620

(22) PCT Filed: Mar. 26, 2021

(86) PCT No.: PCT/JP2021/013058
§ 371 (c)(1),
(2) Date: Jan. 20, 2023

(87) PCT Pub. No.: WO2021/193958
PCT Pub. Date: Sep. 30, 2021

(65) Prior Publication Data

US 2024/0217209 A1 Jul. 4, 2024

(30) Foreign Application Priority Data

Mar. 26, 2020 (JP) ................................ 2020-056494
May 8, 2020 (JP) ................................ 2020-082383
(Continued)

(51) Int. Cl.
*H01M 50/129* (2021.01)
*B32B 7/12* (2006.01)
(Continued)

(52) U.S. Cl.
CPC .............. *B32B 7/12* (2013.01); *B32B 15/088* (2013.01); *B32B 15/20* (2013.01); *B32B 27/08* (2013.01);
(Continued)

(58) Field of Classification Search
CPC ............. H01M 50/105; H01M 50/124; H01M 50/126; H01M 50/129
See application file for complete search history.

(56) References Cited

U.S. PATENT DOCUMENTS

2008/0286635 A1 11/2008 Seino et al.
2013/0143107 A1 6/2013 Kuramoto
(Continued)

FOREIGN PATENT DOCUMENTS

CN 105895833 B * 10/2018 ........... B32B 15/085
EP 1 102 336 5/2001
(Continued)

OTHER PUBLICATIONS

Clarivate Analytics machine translation of JP 2014-157727 A (Year: 2014).*
(Continued)

*Primary Examiner* — Kevin E Yoon
(74) *Attorney, Agent, or Firm* — Oliff PLC

(57) ABSTRACT

A power storage device is constituted by a laminate including, in the stated order, at least a substrate layer, a barrier layer, and an inside layer. The inside layer is provided with an adhesive layer and a heat-sealing resin layer from the
(Continued)

barrier layer side; and if dynamic viscoelasticity is measured by tension with respect to the inside layer, the growth rate at 80° C. is 8.0% or lower.

22 Claims, 9 Drawing Sheets

(30) Foreign Application Priority Data

Jan. 20, 2021 (JP) ................................ 2021-007419
Jan. 20, 2021 (JP) ................................ 2021-007420

(51) Int. Cl.

| | |
|---|---|
| ***B32B 15/088*** | (2006.01) |
| ***B32B 15/20*** | (2006.01) |
| ***B32B 27/08*** | (2006.01) |
| ***B32B 27/18*** | (2006.01) |
| ***B32B 27/32*** | (2006.01) |
| ***B32B 27/34*** | (2006.01) |
| ***B32B 27/36*** | (2006.01) |
| ***H01G 11/80*** | (2013.01) |
| ***H01G 11/84*** | (2013.01) |
| ***H01M 50/105*** | (2021.01) |
| ***H01M 50/119*** | (2021.01) |
| ***H01M 50/121*** | (2021.01) |
| ***H01M 50/124*** | (2021.01) |

(52) U.S. Cl.

CPC .............. *B32B 27/18* (2013.01); *B32B 27/32* (2013.01); *B32B 27/34* (2013.01); *B32B 27/36* (2013.01); *H01G 11/80* (2013.01); *H01G 11/84* (2013.01); *H01M 50/119* (2021.01); *H01M 50/121* (2021.01); *H01M 50/1243* (2021.01); *H01M 50/129* (2021.01); *B32B 2250/04* (2013.01); *B32B 2255/06* (2013.01); *B32B 2255/10* (2013.01); *B32B 2255/26* (2013.01); *B32B 2270/00* (2013.01); *B32B 2307/31* (2013.01); *B32B 2307/54* (2013.01); *B32B 2307/7246* (2013.01); *B32B 2307/7376* (2023.05); *B32B 2457/10* (2013.01); *B32B 2457/16* (2013.01)

(56) References Cited

U.S. PATENT DOCUMENTS

| | | | | |
|---|---|---|---|---|
| 2013/0164606 | A1 | 6/2013 | Hata | |
| 2017/0155101 | A1 | 6/2017 | Mochizuki et al. | |
| 2018/0331330 | A1 | 11/2018 | Amano et al. | |
| 2021/0226283 | A1 * | 7/2021 | Imamoto | H01M 50/131 |

FOREIGN PATENT DOCUMENTS

| | | | | | |
|---|---|---|---|---|---|
| EP | 3474340 | A1 | | 12/2017 | |
| EP | 3 531 464 | | | 8/2019 | |
| EP | 3778818 | A1 | | 10/2019 | |
| JP | 2001-247172 | A | | 9/2001 | |
| JP | 2008-287971 | A | | 11/2008 | |
| JP | 2011-181388 | A | | 9/2011 | |
| JP | 2013-101765 | A | | 5/2013 | |
| JP | 2013-101778 | A | | 5/2013 | |
| JP | 2013-125623 | A | | 6/2013 | |
| JP | 2014-157727 | A | | 8/2014 | |
| JP | 2015-050075 | A | | 3/2015 | |
| JP | 2016-081705 | A | | 5/2016 | |
| JP | 2016-136541 | A | | 7/2016 | |
| JP | 6402844 | B1 | | 10/2018 | |
| JP | 2019-204626 | A | | 11/2019 | |
| WO | WO-2012050182 | A1 | * | 4/2012 | H01M 10/0525 |
| WO | WO-2018194171 | A1 | * | 10/2018 | H01M 50/131 |
| WO | 2019/188284 | A1 | | 10/2019 | |

OTHER PUBLICATIONS

Dec. 16, 2024 Partial Supplementary Search Report issued in European Patent Application No. 21775821.8.
Jun. 8, 2021 International Search Report issued in International Patent Application No. PCT/JP2021/013058.
Jan. 15, 2026 Extended European Search Report issued in European Application No. 25206244.3.
Jan. 6, 2026 Office Action issued in Japanese Application No. 2025-074943.

* cited by examiner

PACKAGING MATERIAL FOR POWER STORAGE DEVICE, METHOD OF PRODUCING SAME, AND POWER STORAGE DEVICE

TECHNICAL FIELD

The present disclosure relates to an exterior material for an electrical storage device, a method of manufacturing the same, and an electrical storage device.

BACKGROUND ART

Conventionally, various types of electrical storage devices have been developed, but in any electrical storage device, an exterior material is an indispensable member for sealing an electrical storage device element such as an electrode or an electrolyte. Conventionally, metal exterior materials have been widely used as exterior materials for electrical storage devices.

On the other hand, conventionally, along with improvement in performance of electric vehicles, hybrid electric vehicles, personal computers, cameras, mobile phones, and the like, various shapes are required for electrical storage devices, and thickness reduction and weight reduction are required. However, metal exterior materials for electrical storage devices which have been widely used heretofore have a disadvantage that it is difficult to follow diversification of shapes and there is a limit to weight reduction.

Therefore, in recent years, a film-shaped laminate in which a base material layer, a barrier layer, an adhesive layer and a heat-sealable resin layer are laminated in this order has been proposed as an exterior material for an electrical storage device which can be easily processed into various shapes and can realize thickness reduction and weight reduction (See, for example, Patent Document 1.).

In such an exterior material for an electrical storage device, generally, a concave portion is formed by cold molding, an electrical storage device element such as an electrode or an electrolytic solution is disposed in a space formed by the concave portion, and the heat-sealable resin layer is heat-sealed, whereby an electrical storage device in which the electrical storage device element is accommodated in the interior of the exterior material for an electrical storage device is obtained.

PRIOR ART DOCUMENT

Patent Documents

Patent Document 1: Japanese Patent Laid-open Publication No. 2008-287971

Patent Document 2: Japanese Patent Laid-open Publication No. 2013-101778

SUMMARY OF THE INVENTION

Problems to be Solved by the Invention

The electrical storage device may be placed in a high-temperature environment depending on its application. For example, an in-vehicle electrical storage device is assumed to be used in a high-temperature environment. When the electrical storage device is placed in a high-temperature environment, gas is generated from an electrolytic solution or the like stored in the electrical storage device, and an internal pressure may increase. Therefore, the electrical storage device is required to have high sealability in a high-temperature environment.

However, in the above-mentioned film-shaped exterior material for an electrical storage device, the electrical storage device element is sealed by heat-sealing the heat-sealable resin layers to each other, and the adhesive layer and the heat-sealable resin layer located inside the barrier layer are easily softened in a high temperature environment. Then, in a high-temperature environment, when the internal pressure of the electrical storage device increases, at least one of the adhesive layer and the heat-sealable resin layer is broken, and sealing of the electrical storage device element by the exterior material for an electrical storage device may not be maintained.

Under such circumstances, a main object of a First Embodiment of the present disclosure is to provide an exterior material for an electrical storage device including a laminate including at least a base material layer, a barrier layer, and an inner layer in this order, the exterior material for an electrical storage device being excellent in sealability in a high-temperature environment.

Furthermore, in the film-shaped exterior material for an electrical storage device as described above, a polypropylene-based resin such as acid-modified polypropylene may be used as a material for forming an adhesive layer for bonding the barrier layer and the heat-sealable resin layer. For example, when the adhesive layer is formed of a polypropylene-based resin, polyethylene may be blended in the polypropylene-based resin in order to enhance processability and flexibility.

However, the polypropylene-based resin and polyethylene are not highly compatible. For example, when a small amount of polyethylene is added to the polypropylene-based resin and a heat-sealable resin layer is formed by melt extrusion molding, a sea-island structure in which island-portions of polyethylene are dispersed in a sea portion of the polypropylene-based resin is formed (Note that, in order to observe the sea-island structure, a cross section of the heat-sealable resin layer is dyed with ruthenium tetroxide or the like, and a cross-sectional image is acquired and observed using a scanning electron microscope.).

When a large stress is applied under a high-temperature environment to an exterior material for an electrical storage device provided with an adhesive layer in which such a sea-island structure is observed, the mechanical strength of the adhesive layer located inside the barrier layer is likely to decrease. Then, in a high-temperature environment, when an internal pressure of the electrical storage device increases, the adhesive layer may be broken, and the sealing of the electrical storage device element by the exterior material for an electrical storage device may not be maintained.

Under such circumstances, a main object of a Second Embodiment of the present disclosure is to provide an exterior material for an electrical storage device including a laminate including at least a base material layer, a barrier layer, an adhesive layer, and a heat-sealable resin layer in this order, the exterior material for an electrical storage device being excellent in sealability in a high-temperature environment.

Furthermore, in the film-shaped exterior material for an electrical storage device as described above, a polyolefin such as polypropylene may be used as a material for forming the heat-sealable resin layer. For example, when polypropylene is used for forming the heat-sealable resin layer, polyethylene may be used in combination for enhancing processability and flexibility.

However, polypropylene and polyethylene are not highly compatible. For example, when a small amount of polyethylene is added to polypropylene and a heat-sealable resin layer is formed by melt extrusion molding, a sea-island structure in which island portions of polyethylene are dispersed in a sea portion of polypropylene is formed (Note that, in order to observe the sea-island structure, a cross section of the heat-sealable resin layer is dyed with ruthenium tetroxide or the like, and a cross-sectional image is acquired and observed using a scanning electron microscope.). For this reason, when the external material for an electrical storage device is subjected to the cold molding, fine cracks are generated at an interface between a polypropylene portion and a polyethylene portion of the heat-sealable resin layer by the stress applied during the molding, which may cause whitening of the heat-sealable resin layer and deterioration of the insulation quality of the exterior material for an electrical storage device.

For example, Patent Document 2 describes that when an inner layer of an exterior material for a battery is formed of a mixture of a polypropylene resin and a polyethylene resin, the sealing strength between heat-sealed inner layers can be controlled by controlling the size and number of "islands" by controlling the manufacturing conditions of the exterior material for a battery, a thickness of the inner layer, a mixing ratio of the polypropylene resin and the polyethylene resin, and the like, and it is described that in a mixture having a sea-island structure, a particle diameter of the polyethylene resin, which is a size of the "island", is preferably in a range of 0.5 to 5 μm (that is, about 0.196 to 19.6 $\mu m^2$).

However, as a result of studies by the inventors of the present disclosure, as disclosed in Patent Document 2, it has been found that in the conventional exterior material for a battery in which polypropylene and polyethylene are blended in the inner layer, the particle diameter of the polyethylene resin is large, and whitening and deterioration of insulation quality due to molding cannot be sufficiently suppressed.

Under such circumstances, a main object of a Third Embodiment of the present disclosure is to provide an exterior material for an electrical storage device that includes a heat-sealable resin layer containing polypropylene and polyethylene, and in which whitening and deterioration of insulation quality due to molding are suppressed.

Means for Solving the Problem

The inventors of the present disclosure have intensively studied to solve the problem of the invention according to the First Embodiment as described above. As a result, it has been found that, in an exterior material for an electrical storage device including a laminate including at least a base material layer, a barrier layer and an inner layer in this order, when a dynamic viscoelasticity measurement by tension is performed on the inner layer, the exterior material for an electrical storage device having an elongation rate at 80° C. of 8.0% or less is excellent in sealability in a high-temperature environment.

The First Embodiment of the present disclosure has been completed by further conducting studies based on these findings. That is, the First Embodiment of the present disclosure provides the invention of the following aspect.

An exterior material for an electrical storage device, including a laminate that includes at least a base material layer, a barrier layer, and an inner layer in this order, in which the inner layer includes an adhesive layer and a heat-sealable resin layer from a side of the barrier layer, and when the inner layer is subjected to dynamic viscoelasticity measurement by tension, an elongation rate at 80° C. is 8.0% or less.

The inventors of the present disclosure have intensively studied to solve the problem of the invention according to the Second Embodiment as described above. As a result, it has been found that, in an exterior material for an electrical storage device, including a laminate that includes at least a base material layer, a barrier layer, an adhesive layer, and a heat-sealable resin layer in this order, the adhesive layer contains a polypropylene-based resin and polyethylene, a sea-island structure is observed in a cross-sectional image acquired using a scanning electron microscope for a cross section of the adhesive layer in a direction parallel to a transverse direction (TD) and in a thickness direction, the cross-sectional image is a cross-sectional image acquired within a range from a surface of the adhesive layer on a side of the barrier layer to a portion having a thickness of 25% when a thickness of the adhesive layer is 100%, and in the cross-sectional image, a ratio of a total number of island portions having an area of less than 0.25 $\mu m^2$ to a total number of island portions of the sea-island structure is 40% or more. (That is, [the total number of island portions of less than 0.25 $\mu m^2$/the total number of all island portions]≥40%) It has been found that the sealability in a high-temperature environment is excellent.

The Second Embodiment of the present disclosure has been completed by further conducting studies based on these findings. That is, the Second Embodiment of the present disclosure provides the invention of the following aspect.

An exterior material for an electrical storage device, including a laminate that includes at least a base material layer, a barrier layer, an adhesive layer, and a heat-sealable resin layer in this order, in which the adhesive layer contains a polypropylene-based resin and polyethylene, a sea-island structure is observed in a cross-sectional image acquired using a scanning electron microscope for a cross section of the adhesive layer in a direction parallel to a transverse direction (TD) and in a thickness direction, the cross-sectional image is a cross-sectional image acquired within a range from a surface of the adhesive layer on a side of the barrier layer to a portion having a thickness of 25% when a thickness of the adhesive layer is 100%, and in the cross-sectional image, a ratio of a total number of island portions having an area of less than 0.25 $\mu m^2$ to a total number of island portions of the sea-island structure is 40% or more.

The inventors of the present disclosure have intensively studied to solve the problem of the invention according to the Third Embodiment as described above. As a result, it has been found that, in an exterior material for an electrical storage device, including a laminate that includes at least a base material layer, a barrier layer, and a heat-sealable resin layer in this order from an outside toward an inside, the heat-sealable resin layer contains polypropylene and polyethylene, a sea-island structure is observed in a cross-sectional image acquired using a scanning electron microscope for a cross section of the heat-sealable resin layer in a direction parallel to a transverse direction (TD) and in a thickness direction, in the cross-sectional image, a ratio of a total number of island portions having an area of 0.02 $\mu m^2$ or less to a total number of island portions of the sea-island structure is 80.0% or more, and at least one of layers inside the barrier layer contains at least one of an antioxidant and a radical scavenger, and whitening and a decrease in insulation quality due to molding are suppressed. The cross-sectional image is a cross-sectional image acquired within a range from a surface of the heat-sealable resin layer on a side opposite to a side of the barrier layer to a portion having a thickness of 12.5% when the total thickness of layers located inside the barrier layer is 100%. Note that a direction of the heat-sealable resin layer MD laminated on the laminate and a transverse direction can be generally discriminated from the barrier layer described later. That is, in the exterior material for an electrical storage device, MD and TD in the manufacturing process of the barrier layer described later can be generally discriminated. For example, when the barrier layer is made of an aluminum foil, linear streaks called so-called rolling marks are formed on a surface of the aluminum foil in a rolling direction (RD) of the aluminum foil. Since the rolling marks extend along the rolling direction, the rolling direction of the aluminum foil can be grasped by observing the surface of the aluminum foil. Furthermore, in the manufacturing process of the laminate, the MD of the laminate and the RD of the aluminum foil generally coincide with each other, and thus the MD (that is, MD of the heat-sealable resin layer) of the laminate can be specified by observing the surface of the aluminum foil of the laminate and specifying the rolling direction (RD) of the aluminum foil. Furthermore, since the TD of the laminate is perpendicular to the MD of the laminate, the TD (that is, TD of the heat-sealable resin layer) of the laminate can also be specified.

The Third Embodiment of the present disclosure has been completed by further conducting studies based on these findings. That is, the Third Embodiment of the present disclosure provides the invention of the following aspect.

An exterior material for an electrical storage device, including a laminate that includes at least a base material layer, a barrier layer, and a heat-sealable resin layer in this order from an outside toward an inside, in which the heat-sealable resin layer contains polypropylene and polyethylene, a sea-island structure is observed in a cross-sectional image acquired using a scanning electron microscope for a cross section of the heat-sealable resin layer in a direction parallel to a transverse direction (TD) and in a thickness direction, the cross-sectional image is a cross-sectional image acquired within a range from a surface of the heat-sealable resin layer on a side opposite to a side of the barrier layer to a portion having a thickness of 12.5% when a total thickness of layers located inside the barrier layer is 100%, in the cross-sectional image, a ratio of a total number of island portions having an area of 0.02 $\mu m^2$ or less to a total number of island portions of the sea-island structure is 80.0% or more, and at least one of the layers inside the barrier layer contains at least one of an antioxidant and a radical scavenger.

Advantages of the Invention

According to the First Embodiment of the present disclosure, it is possible to provide an exterior material for an electrical storage device including a laminate that includes at least a base material layer, a barrier layer, and an inner layer in this order, the exterior material for an electrical storage device being excellent in sealability in a high-temperature environment. Furthermore, according to the First Embodiment of the present disclosure, it is also possible to provide a method of manufacturing an exterior material for an electrical storage device, and an electrical storage device.

Furthermore, according to the Second Embodiment of the present disclosure, it is possible to provide an exterior material for an electrical storage device including a laminate that includes at least a base material layer, a barrier layer, an adhesive layer, and a heat-sealable resin layer in this order, the exterior material for an electrical storage device being excellent in sealability in a high-temperature environment. Furthermore, according to the Second Embodiment of the present disclosure, it is also possible to provide a method of manufacturing an exterior material for an electrical storage device, and an electrical storage device.

According to the Third Embodiment of the present disclosure, it is possible to provide an exterior material for an electrical storage device, which includes a heat-sealable resin layer containing polypropylene and polyethylene and in which whitening and a decrease in insulation quality due to molding are suppressed. Furthermore, according to the Third Embodiment of the present disclosure, it is also possible to provide a method of manufacturing an exterior material for an electrical storage device, and an electrical storage device.

EMBODIMENTS OF THE INVENTION

Figure 1:
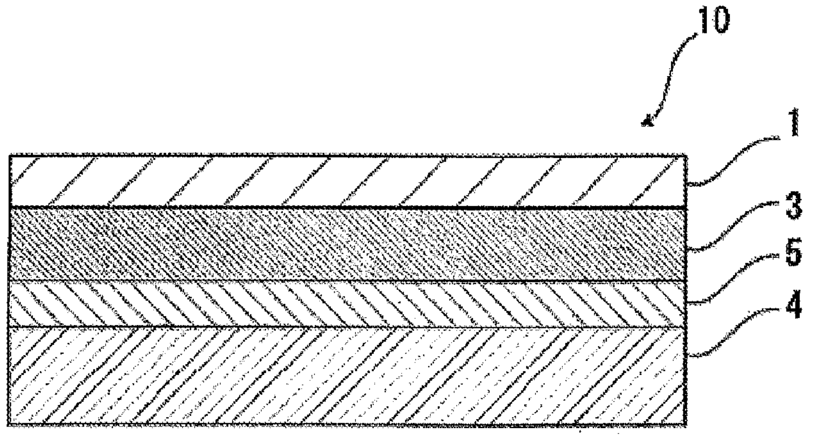
FIG. 1 is a schematic diagram illustrating an example of a cross-sectional structure of an exterior material for an electrical storage device according to a First Embodiment of the present disclosure.

An exterior material for an electrical storage device according to a First Embodiment of the present disclosure includes a laminate including at least a base material layer, a barrier layer, and an inner layer in this order, and when dynamic viscoelasticity measurement by tension is performed on the inner layer, an elongation rate at 80° C. is 8.0% or less.

According to the exterior material for an electrical storage device according to the First Embodiment of the present disclosure, when the heat-sealable resin layers are heat-sealed to each other, adhesion between the heat-sealable resin layers in a high temperature environment is high, and excellent sealability in a high temperature environment can be exhibited due to the configuration.

An exterior material for an electrical storage device according to a Second Embodiment of the present disclosure includes a laminate including at least a base material layer, a barrier layer, an adhesive layer, and a heat-sealable resin layer in this order, in which the adhesive layer contains a polypropylene-based resin and polyethylene, a sea-island structure is observed in a cross-sectional image acquired using a scanning electron microscope for a cross section of the adhesive layer in a direction parallel to TD and in a thickness direction, the cross-sectional image is a cross-sectional image acquired within a range from a surface of the adhesive layer on a side of the barrier layer to a portion having a thickness of 25% when a thickness of the adhesive layer is 100%, and in the cross-sectional image, a ratio of a total number of island portions having an area of less than 0.25 $\mu m^2$ in the island portions to a total number of island portions of the sea-island structure is 40% or more. The exterior material for an electrical storage device according to the Second Embodiment of the present disclosure is excellent in sealability in a high-temperature environment due to the configuration.

An exterior material for an electrical storage device according to a Third Embodiment of the present disclosure includes a laminate including at least a base material layer, a barrier layer, and a heat-sealable resin layer in this order from an outside toward an inside, in which the heat-sealable resin layer contains polypropylene and polyethylene, a sea-island structure is observed in a cross-sectional image acquired using a scanning electron microscope for a cross section of the heat-sealable resin layer in a direction parallel to TD and in a thickness direction, the cross-sectional image is a cross-sectional image acquired within a range from a surface of the heat-sealable resin layer on a side opposite to a side of the barrier layer to a portion having a thickness of 12.5% when a total thickness of layers located inside the barrier layer is 100%, and in the cross-sectional image, a ratio of a total number of island portions having an area of 0.02 $\mu m^2$ or less to a total number of island portions of the sea-island structure is 80.0% or more, and at least one of the layers inside the barrier layer contains at least one of an antioxidant and a radical scavenger. According to the exterior material for an electrical storage device of the Third Embodiment of the present disclosure, whitening and deterioration of insulation quality due to molding are suppressed by providing the configuration.

Hereinafter, an exterior material for an electrical storage device of the present disclosure will be described in detail. Note that, in the present specification, a numerical range indicated by "to" means "greater than or equal to" and "less than or equal to". For example, a notation 2 to 15 mm means 2 mm or more and 15 mm or less.

In the following description, description regarding matters unique to the First Embodiment, the Second Embodiment, or the Third Embodiment in the present disclosure will be clearly indicated. In a case where the present disclosure is described without any particular indication, it is a description of matters common to the First Embodiment, the Second Embodiment, and the Third Embodiment.

Note that, in the exterior material for an electrical storage device, MD (Machine Direction) and TD (Transverse Direction) in the manufacturing process of a barrier layer 3 described later can be usually discriminated. For example, when a barrier layer 3 is made of an aluminum foil, linear streaks called a so-called rolling marks are formed on a surface of the aluminum foil in a rolling direction (RD) of the aluminum foil. Since the rolling marks extend along the rolling direction, the rolling direction of the aluminum foil can be grasped by observing the surface of the aluminum foil. Furthermore, in the manufacturing process of the laminate, the MD of the laminate and the RD of the aluminum foil usually coincide with each other, and thus the MD of the laminate can be specified by observing the surface of the aluminum foil of the laminate and specifying the rolling direction (RD) of the aluminum foil. Furthermore, since the TD of the laminate is perpendicular to the MD of the laminate, the TD of the laminate can also be specified.

Furthermore, when the MD of the exterior material for an electrical storage device cannot be specified by the rolling score of the aluminum alloy foil, the MD can be specified by the following method. As a method of confirming the MD of the exterior material for an electrical storage device, there is a method of observing a cross section of a heat-sealable resin layer of the exterior material for an electrical storage device with an electron microscope to confirm a sea-island structure. In this method, the direction parallel to the cross section in which the average of the diameters of the island shapes in the direction perpendicular to the thickness direction of the heat-sealable resin layer is maximum can be determined as MD. Specifically, the cross section in a length direction of the heat-sealable resin layer and each cross section (10 cross sections in total) from a direction parallel to the cross section in the length direction to a direction perpendicular to the cross section in the length direction while changing the angle by 10 degrees from the direction parallel to the cross section in the length direction are observed with an electron micrograph to confirm the sea-island structure. Next, in each cross section, the shape of each island is observed. For the shape of each island, a straight line distance connecting a leftmost end in a vertical direction with respect to a thickness direction of the heat-sealable resin layer and a rightmost end in the vertical direction is defined as a diameter y. In each cross section, an average of the top 20 diameters y is calculated in descending order of the diameter y of the island shape. A direction parallel to the cross section having the largest average of the diameters y of the island shape is determined as MD.

1. Laminated Structure and Physical Property of Exterior Material for Electrical Storage Device For example, as illustrated in FIG. 1, an exterior material 10 for an electrical storage device according to a First Embodiment of the present disclosure includes a laminate including a base material layer 1, a barrier layer 3, and an inner layer (an adhesive layer 5 and a heat-sealable resin layer 4) in this order. In the exterior material 10 for an electrical storage device, the base material layer 1 is an outermost layer side, and the heat-sealable resin layer 4 of an inner layer is an innermost layer. When an electrical storage device is assembled using the exterior material 10 for an electrical storage device and an electrical storage device element, the electrical storage device element is accommodated in a space formed by heat-sealing a peripheral part in a state where the heat-sealable resin layers 4 of the exterior material 10 for an electrical storage device face each other. In the laminated body constituting the exterior material 10 for an electrical storage device according to the First Embodiment of the present disclosure, a side of the heat-sealable resin layer 4 with respect to the barrier layer 3 is an inner side, and a side of the base material layer 1 with respect to the barrier layer 3 is an outer side, with respect to the barrier layer 3 as a reference.

Figure 2:
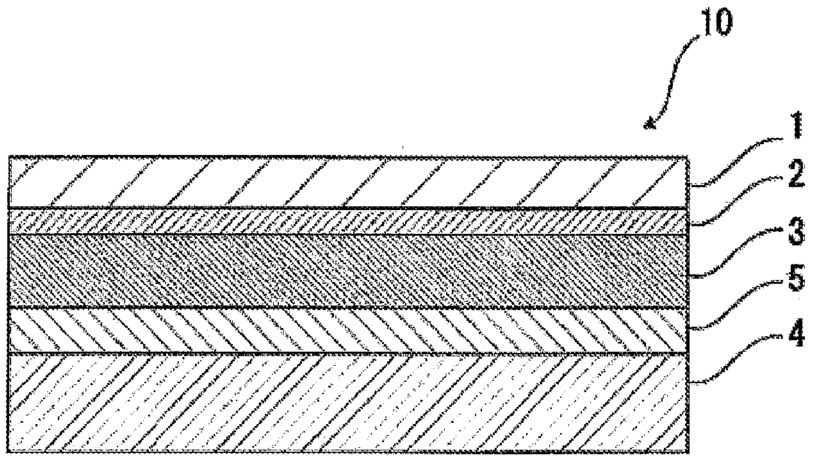
FIG. 2 is a schematic diagram illustrating an example of a cross-sectional structure of the exterior material for an electrical storage device according to the First Embodiment of the present disclosure.
Figure 3:
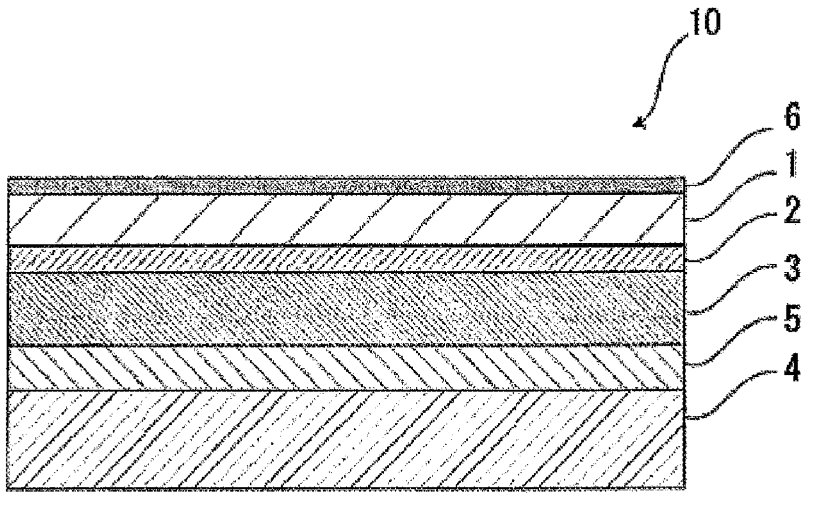
FIG. 3 is a schematic diagram illustrating an example of a cross-sectional structure of the exterior material for an electrical storage device according to the First Embodiment of the present disclosure.

For example, as illustrated in FIG. 2 and FIG. 3, the exterior material 10 for an electrical storage device according to the First Embodiment may have an adhesive agent layer 2 between the base material layer 1 and the barrier layer 3 as necessary for the purpose of, for example, improving bondability between these layers. Furthermore, as illustrated in FIG. 3, a surface coating layer 6 or the like may be provided on an outer side of the base material layer 1 (a side opposite to the side of the heat-sealable resin layer 4) as necessary.

Figure 10:
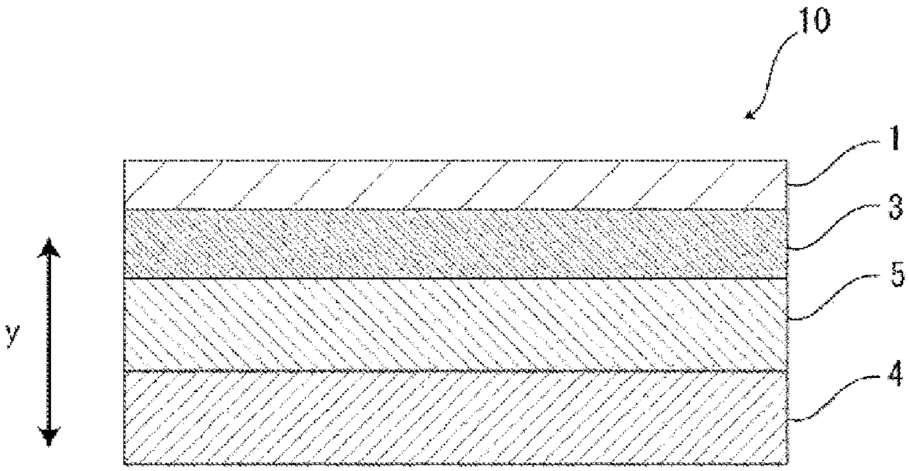
FIG. 10 is a schematic diagram illustrating an example of a cross-sectional structure of an exterior material for an electrical storage device according to a Second Embodiment.

Furthermore, as illustrated in FIG. 10, for example, an exterior material 10 for an electrical storage device according to a Second Embodiment of the present disclosure includes a laminate including a base material layer 1, a barrier layer 3, an adhesive layer 5, and a heat-sealable resin layer 4 in this order. In the exterior material 10 for an electrical storage device, the base material layer 1 is an outermost layer side, and the heat-sealable resin layer 4 is an innermost layer. When an electrical storage device is assembled using the exterior material 10 for an electrical storage device and an electrical storage device element, the electrical storage device element is accommodated in a space formed by heat-sealing a peripheral part in a state where the heat-sealable resin layers 4 of the exterior material 10 for an electrical storage device face each other.

Figure 11:
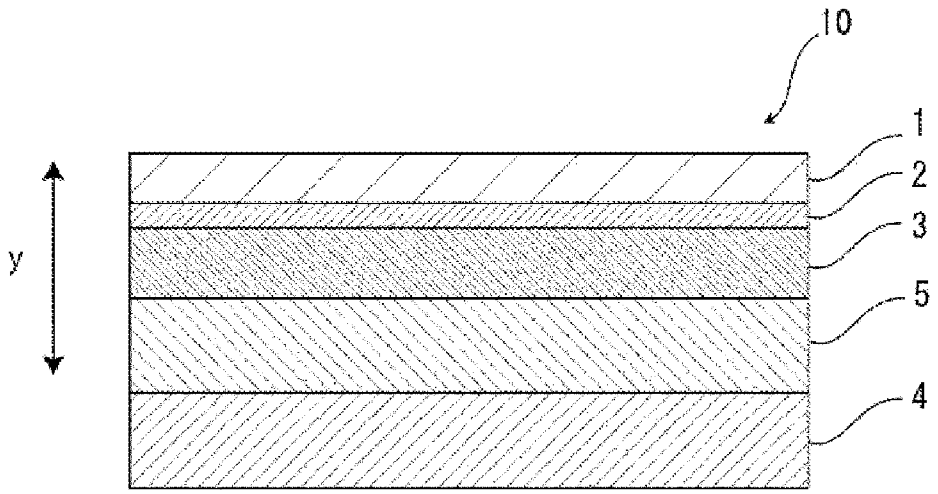
FIG. 11 is a schematic diagram illustrating an example of a cross-sectional structure of the exterior material for an electrical storage device according to the Second Embodiment.
Figure 12:
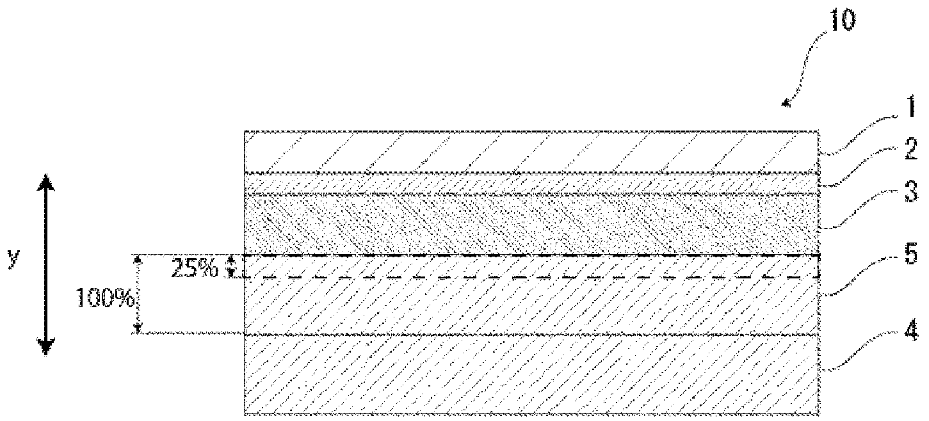
FIG. 12 is a schematic diagram illustrating an example of a cross-sectional structure of the exterior material for an electrical storage device according to the Second Embodiment.
Figure 13:
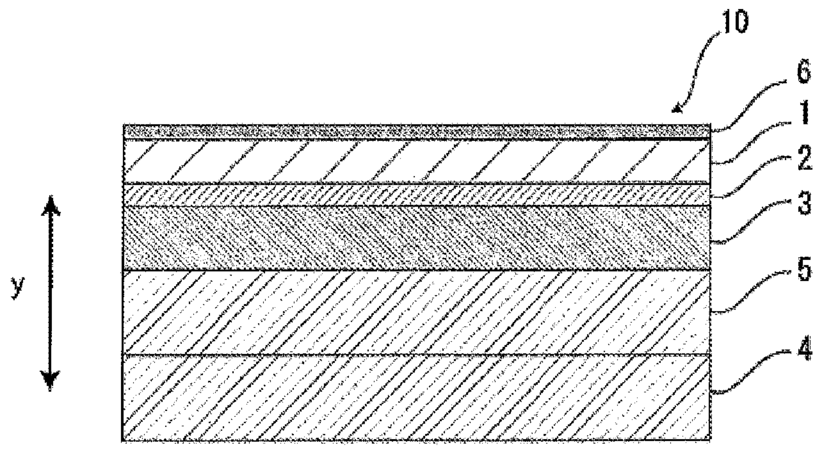
FIG. 13 is a schematic diagram illustrating an example of a cross-sectional structure of the exterior material for an electrical storage device according to the Second Embodiment.
Figure 14:
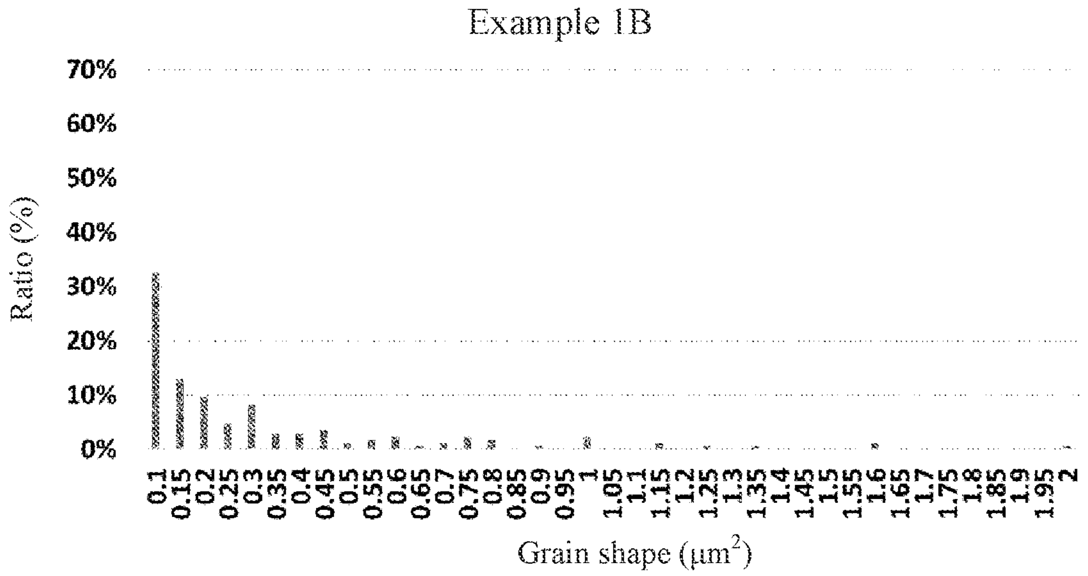
FIG. 14 is a graph illustrating a relationship between an area ($\mu m^2$) of island portions and a ratio (%) of the number of island portions in each area to the total number of all island portions in an adhesive layer of Example 1B.
Figure 15:
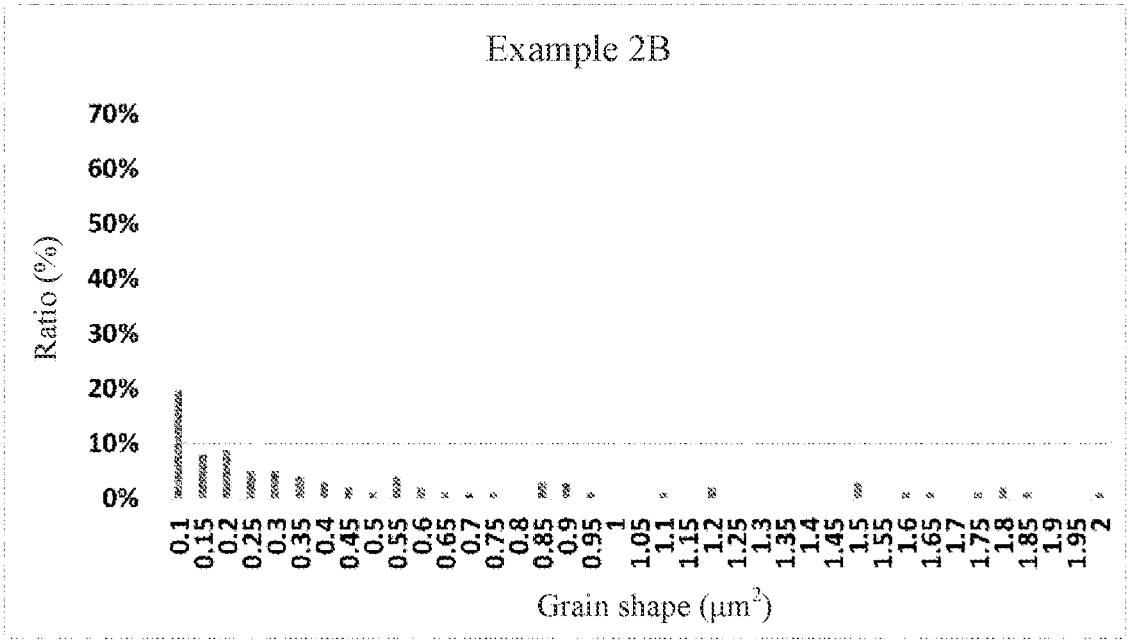
FIG. 15 is a graph illustrating a relationship between an area ($\mu m^2$) of island portions and a ratio (%) of the number of island portions in each area to the total number of all island portions in an adhesive layer of Example 2B.
Figure 16:
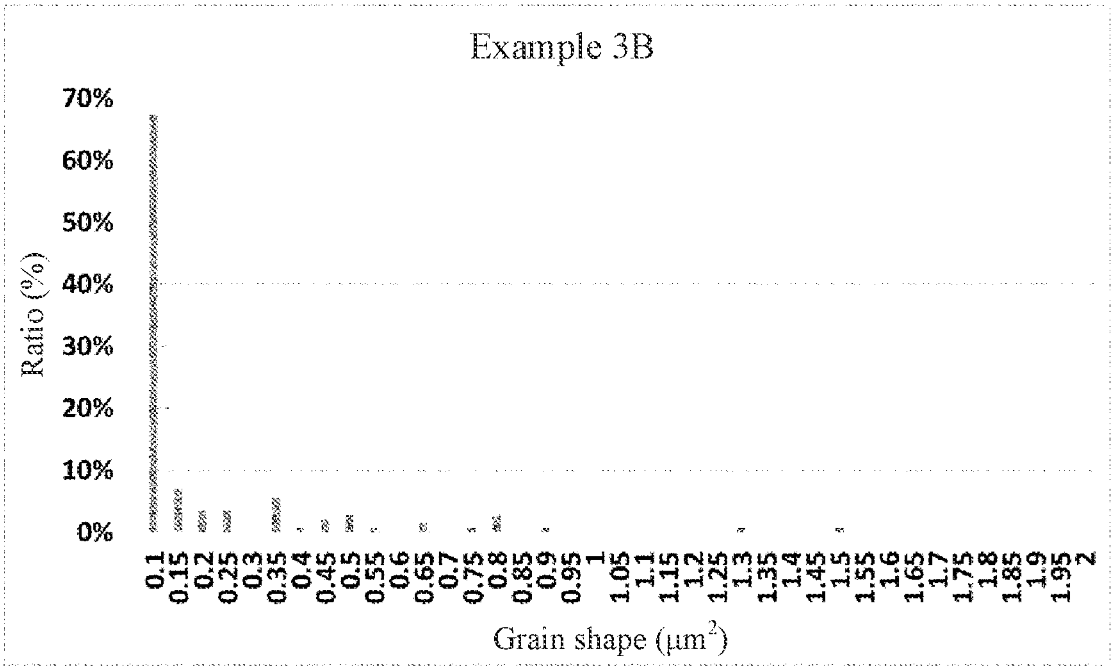
FIG. 16 is a graph illustrating a relationship between an area ($\mu m^2$) of island portions and a ratio (%) of the number of island portions in each area to the total number of all island portions in an adhesive layer of Example 3B.
Figure 17:
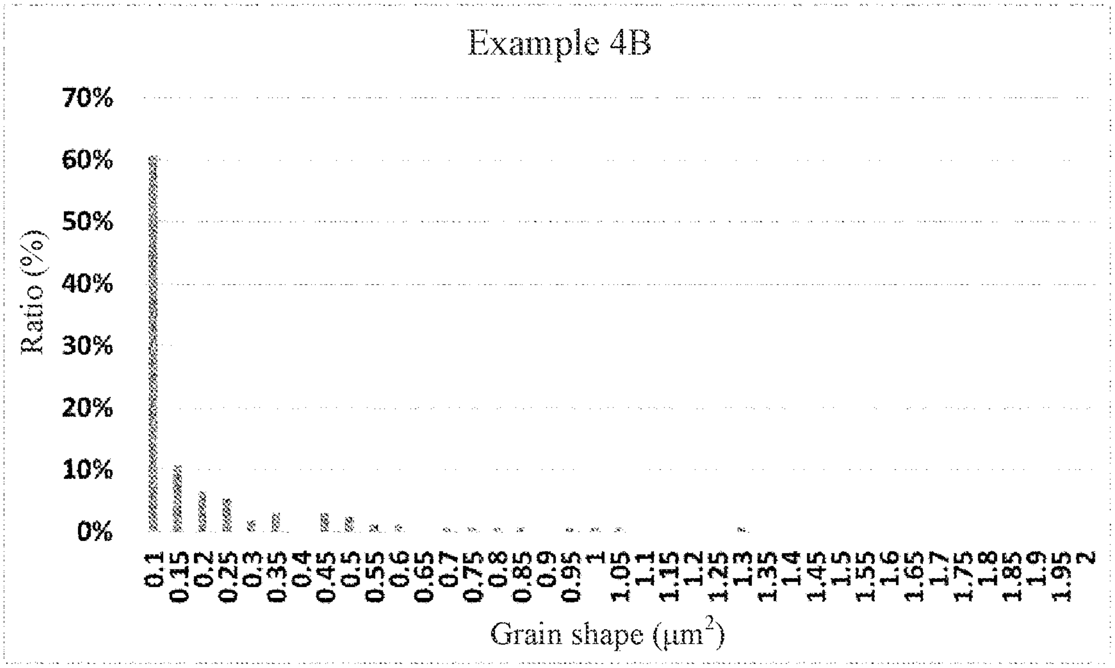
FIG. 17 is a graph illustrating a relationship between an area ($\mu m^2$) of island portions and a ratio (%) of the number of island portions in each area to the total number of all island portions in an adhesive layer of Example 4B.
Figure 18:
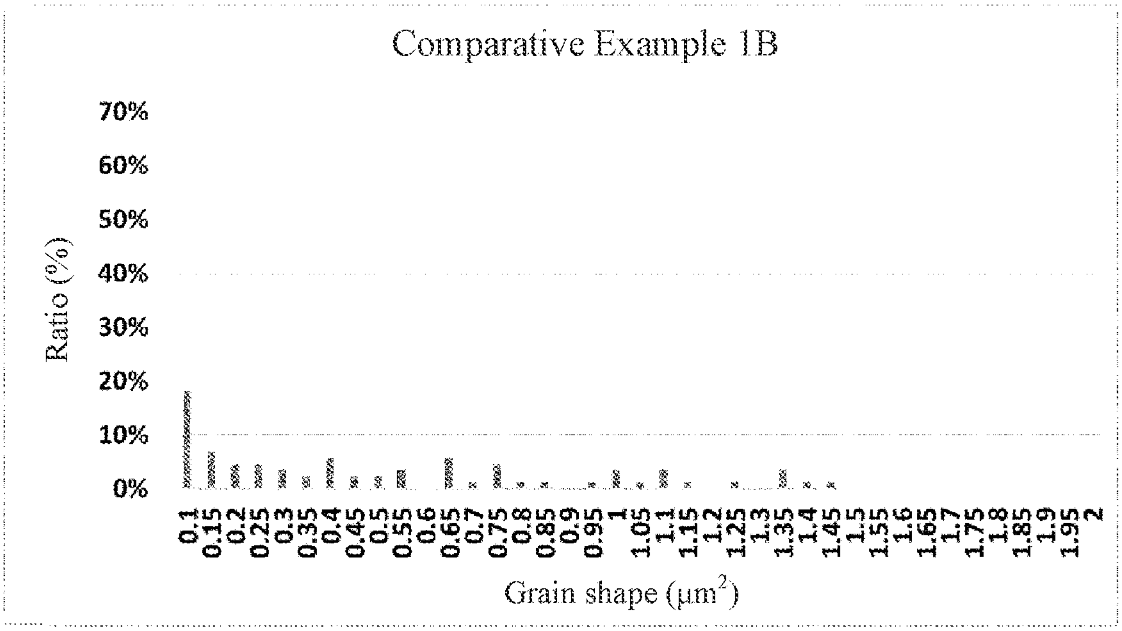
FIG. 18 is a graph illustrating a relationship between an area ($\mu m^2$) of island portions and a ratio (%) of the number of island portions in each area to the total number of all island portions in an adhesive layer of Comparative Example 1B.

For example, as illustrated in FIG. 11 to FIG. 13, the exterior material 10 for an electrical storage device according to the Second Embodiment may have an adhesive agent layer 2 between the base material layer 1 and the barrier layer 3 as necessary for the purpose of, for example, improving bondability between these layers. As illustrated in FIG. 13, a surface coating layer 6 or the like may be provided on the outer side of the base material layer 1 (the side opposite to the heat-sealable resin layer 4 side) as necessary.

Figure 19:
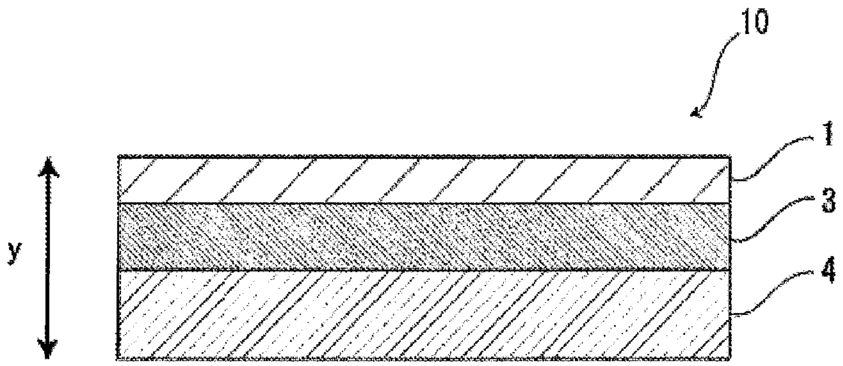
FIG. 19 is a schematic diagram illustrating an example of a cross-sectional structure of an exterior material for an electrical storage device according to a Third Embodiment.

Furthermore, as illustrated in FIG. 19, for example, an exterior material 10 for an electrical storage device according to a Third Embodiment of the present disclosure includes a laminate including a base material layer 1, a barrier layer 3, and a heat-sealable resin layer 4 in this order. In the exterior material 10 for an electrical storage device, the base material layer 1 is an outermost layer side, and the heat-sealable resin layer 4 is an innermost layer. When an electrical storage device is assembled using the exterior material 10 for an electrical storage device and an electrical storage device element, the electrical storage device element is accommodated in a space formed by heat-sealing a peripheral part in a state where the heat-sealable resin layers 4 of the exterior material 10 for an electrical storage device face each other.

Figure 20:
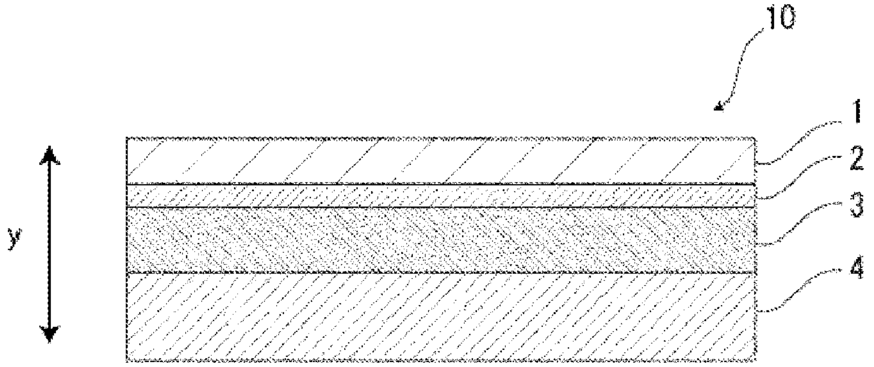
FIG. 20 is a schematic diagram illustrating an example of a cross-sectional structure of the exterior material for an electrical storage device according to the Third Embodiment.
Figure 21:
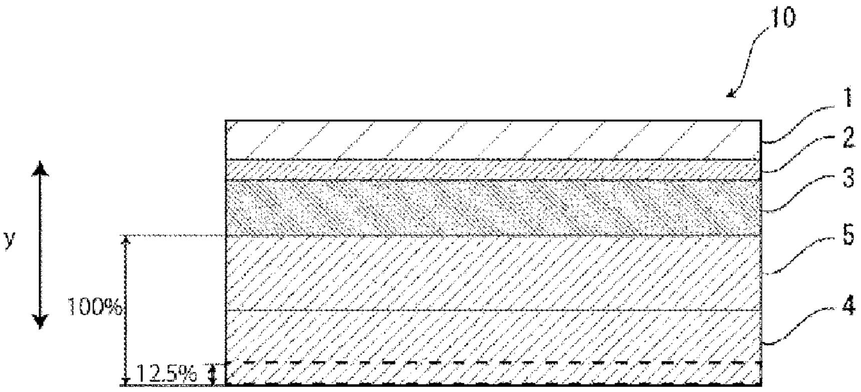
FIG. 21 is a schematic diagram illustrating an example of a cross-sectional structure of the exterior material for an electrical storage device according to the Third Embodiment.
Figure 22:
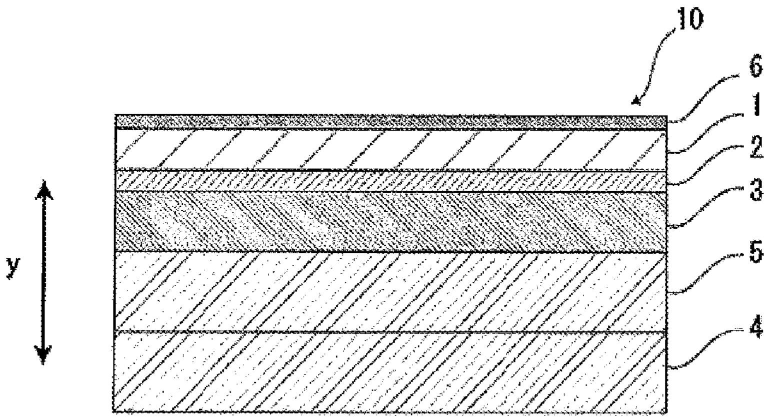
FIG. 22 is a schematic diagram illustrating an example of a cross-sectional structure of the exterior material for an electrical storage device according to the Third Embodiment.

For example, as illustrated in FIG. 20 to FIG. 22, the exterior material 10 for an electrical storage device according to the Third Embodiment may have an adhesive agent layer 2 between the base material layer 1 and the barrier layer 3 as necessary for the purpose of, for example, improving bondability between these layers. For example, as illustrated in FIGS. 21 and 22, an adhesive layer 5 may be provided between the barrier layer 3 and the heat-sealable resin layer 4 as necessary for the purpose of, for example, improving bondability between these layers. As illustrated in FIG. 22, a surface coating layer 6 or the like may be provided on the outer side of the base material layer 1 (the side opposite to the heat-sealable resin layer 4 side) as necessary.

Furthermore, as illustrated in FIG. 19, for example, an exterior material 10 for an electrical storage device according to a Third Embodiment of the present disclosure includes a laminate including a base material layer 1, a barrier layer 3, and a heat-sealable resin layer 4 in this order. In the exterior material 10 for an electrical storage device, the base material layer 1 is an outermost layer side, and the heat-sealable resin layer 4 is an innermost layer. When an electrical storage device is assembled using the exterior material 10 for an electrical storage device and an electrical storage device element, the electrical storage device element is accommodated in a space formed by heat-sealing a peripheral part in a state where the heat-sealable resin layers 4 of the exterior material 10 for an electrical storage device face each other.

For example, as illustrated in FIG. 20 to FIG. 22, the exterior material 10 for an electrical storage device according to the Third Embodiment may have an adhesive agent layer 2 between the base material layer 1 and the barrier layer 3 as necessary for the purpose of, for example, improving bondability between these layers. For example, as illustrated in FIGS. 21 and 22, an adhesive layer 5 may be provided between the barrier layer 3 and the heat-sealable resin layer 4 as necessary for the purpose of, for example, improving bondability between these layers. As illustrated in FIG. 22, a surface coating layer 6 or the like may be provided on the outer side of the base material layer 1 (the side opposite to the heat-sealable resin layer 4 side) as necessary.

In the present disclosure, the thickness of the laminate constituting the exterior material 10 for an electrical storage device is not particularly limited, but it is, for example, about 190 μm or less, preferably about 180 μm or less, about 155 μm or less, or about 120 μm or less from the viewpoint of cost reduction, energy density improvement, and the like. Furthermore, the thickness of the laminate constituting the exterior material 10 for an electrical storage device is preferably about 35 μm or more, about 45 μm or more, or about 60 μm or more for maintaining a function of the exterior material for an electrical storage device of protecting an electrical storage device element. Furthermore, preferable ranges of the laminated body constituting the exterior material 10 for an electrical storage device include, for example, about 35 to 190 μm, about 35 to 180 μm, about 35 to 155 μm, about 35 to 120 μm, about 45 to 190 μm, about 45 to 180 μm, about 45 to 155 μm, about 45 to 120 μm, about 60 to 190 μm, about 60 to 180 μm, about 60 to 155 μm, and about 60 to 120 μm, and particularly preferably about 60 to 155 μm.

In the exterior material 10 for an electrical storage device according to the First Embodiment of the present disclosure, a ratio of a total thickness of the base material layer 1, the adhesive agent layer 2 provided as necessary, the barrier layer 3, the inner layer (adhesive layer 5 and heat-sealable resin layer 4), and the surface coating layer 6 provided as necessary to a thickness (total thickness) of the laminate constituting the exterior material 10 for an electrical storage device is preferably 90% or more, more preferably 95% or more, and still more preferably 98% or more. As a specific example, when the exterior material 10 for an electrical storage device according to the First Embodiment of the present disclosure includes a base material layer 1, an adhesive agent layer 2, a barrier layer 3, and an inner layer (adhesive layer 5 and heat-sealable resin layer 4), a ratio of a total thickness of these layers to a thickness (total thickness) of a laminate constituting the exterior material 10 for an electrical storage device is preferably 90% or more, more preferably 95% or more, and still more preferably 98% or more.

Furthermore, in the exterior material 10 for an electrical storage device according to the Second Embodiment of the present disclosure, the ratio of the total thickness of the base material layer 1, the adhesive agent layer 2 provided as necessary, the barrier layer 3, the adhesive layer 5, the heat-sealable resin layer 4, and the surface coating layer 6 provided as necessary to the thickness (total thickness) of the laminate constituting the exterior material 10 for an electrical storage device is preferably 90% or more, more preferably 95% or more, and still more preferably 98% or more. As a specific example, when the exterior material 10 for an electrical storage device according to the Second Embodiment of the present disclosure includes the base material layer 1, the adhesive agent layer 2, the barrier layer 3, the adhesive layer 5 and the heat-sealable resin layer 4, a ratio of a total thickness of these layers to a thickness (total thickness) of a laminate constituting the exterior material 10 for an electrical storage device is preferably 90% or more, more preferably 95% or more, and still more preferably 98% or more.

In the exterior material 10 for an electrical storage device according to the Third Embodiment of the present disclosure, a ratio of a total thickness of the base material layer 1, the adhesive agent layer 2 provided as necessary, the barrier layer 3, the adhesive layer 5 provided as necessary, the heat-sealable resin layer 4, and the surface coating layer 6 provided as necessary to a thickness (total thickness) of a laminate constituting the exterior material 10 for an electrical storage device is preferably 90% or more, more preferably 95% or more, and still more preferably 98% or more. As a specific example, when the exterior material 10 for an electrical storage device according to the Third Embodiment of the present disclosure includes the base material layer 1, the adhesive agent layer 2, the barrier layer 3, the adhesive layer 5, and the heat-sealable resin layer 4, the ratio of the total thickness of these layers to the thickness (total thickness) of the laminate constituting the exterior material 10 for an electrical storage device is preferably 90% or more, more preferably 95% or more, and still more preferably 98% or more.

In the exterior material 10 for an electrical storage device according to the First Embodiment of the present disclosure, when dynamic viscoelasticity measurement by tension is performed on the inner layer, an elongation rate at 80° C. is 8.0% or less. The measurement method of the elongation rate by the dynamic viscoelasticity measurement is as follows. As the elongation rate measured by the dynamic viscoelasticity measurement is lower, the crystallinity of the inner layer (adhesive layer 5 and heat-sealable resin layer 4) is higher, and softening of the inner layer is suppressed, so that the sealability against internal stress in a high-temperature environment is improved.

<Dynamic Viscoelasticity (DMA) Measurement>

With respect to the exterior material for an electrical storage device, a sample is prepared from the inner layer, and dynamic viscoelasticity measurement is performed. Specifically, the barrier layer is dissolved by immersing the exterior material for an electrical storage device in a 10% aqueous hydrochloric acid solution for 24 hours to obtain the inner side layer (laminate of adhesive layer and heat-sealable resin layer). The inner side layer is a laminate formed only of the adhesive layer 5 and the heat-sealable resin layer 4, in which a layer (that is, the barrier layer 3, the adhesive agent layer 2 provided as necessary, the base material layer 1, the surface coating layer 6 provided as necessary, and the like) on a side of the barrier layer with respect to the adhesive layer of the exterior material for an electrical storage device is removed. Next, this inner layer is washed with water, dried, and cut into a width of 5 mm and a length of 10 mm to obtain a sample. Next, the obtained sample is subjected to dynamic viscoelasticity measurement under the following measurement conditions using a dynamic viscoelasticity measuring device (for example, Rheogel-E4000 manufactured by UBM Co., Ltd.).

(Measurement Conditions)

Sample width: 5 mm
Start temperature 30° C.
End temperature 160° C.
Heating rate 2° C./min
Static load 50 g
Length between test holders (distance between chucks) 10 mm
Chuck tension
Software used for measurement: RheoStation (ver 7)

Step temperature 1° C.

Waveform: sine wave, 10 Hz, strain 10 μm, strain control (automatic adjustment)

Measuring jig: pulling

In order to prevent the sample from being broken and unmeasurable, the load is controlled to be constant up to the elongation of 10%, the load control is stopped after the elongation of 10%, and thereafter, the sample is stretched by 20 μm at every 1° C.

The elongation rate at 80° C. may be 8.0% or less, but is preferably about 7.0% or less, more preferably about 6.0% or less, and still more preferably about 5.5% or less from the viewpoint of further improving the sealability of the exterior material for an electrical storage device in a high-temperature environment. The elongation at 80° C. may be, for example, about 0.0% or more, about 1.0% or more, or about 2.0% or more. Preferable ranges of the elongation rate at 80° C. are about 0.0 to 8.0%, about 0.0 to 7.0%, about 0.0 to 6.0%, about 0.0 to 5.5%, about 1.0 to 8.0%, about 1.0 to 7.0%, about 1.0 to 6.0%, about 1.0 to 5.5%, about 2.0 to 8.0%, about 2.0 to 7.0%, about 2.0 to 6.0%, about 2.0 to 5.5%, and about 3.7 to 4.7%.

In the exterior material for an electrical storage device according to the First Embodiment of the present disclosure, as one example suitable for setting the elongation rate at 80° C. in dynamic viscoelasticity measurement by pulling of the inner layer to 8.0% or less, there is an increase in crystallinity of the adhesive layer and the heat-sealable resin layer. Specifically, when an exterior material for an electrical storage device is produced, a method is employed in which an adhesive layer and a heat-sealable resin layer are formed by melt extrusion molding, cooled, and then post-heated again to a temperature higher than or equal to the melting points of the adhesive layer and the heat-sealable resin layer, and cooled. Moreover, the cooling rate after the post-heating is such that the temperature decrease from the start of cooling to 3 seconds is preferably 60° C. or lower, more preferably 50° C. or lower, and still more preferably 45° C. or lower, and the initial cooling conditions are controlled to very slow cooling conditions to promote the crystal growth of the resin of the adhesive layer and the heat-sealable resin layer. For example, by adopting such a method to form the adhesive layer and the heat-sealable resin layer, the crystallinity of the adhesive layer and the heat-sealable resin layer is enhanced, and the sealability in a high-temperature environment is improved.

Furthermore, the elongation rate of the inner layer at 110° C. as measured by the dynamic viscoelasticity measurement is not particularly limited, but is preferably about 15.0% or less, more preferably about 14.0% or less, and still more preferably 13.5% or less from the viewpoint of further improving the sealability of the exterior material for an electrical storage device in a high-temperature environment. The elongation at 110° C. may be, for example, about 5.0% or more, about 6.0% or more, about 7.0% or more, or about 8.0% or more. Preferable ranges of the elongation rate at 110° C. are about 5.0 to 15.0%, about 5.0 to 14.0%, about 5.0 to 13.5%, about 6.0 to 15.0%, about 6.0 to 14.0%, about 6.0 to 13.5%, about 7.0 to 15.0%, about 7.0 to 14.0%, about 7.0 to 13.5%, about 8.0 to 15.0%, about 8.0 to 14.0%, about 8.0 to 13.5%, and about 10.0 to 13.0%.

In the exterior material for an electrical storage device according to the First Embodiment of the present disclosure, as a method for setting the elongation rate at 110° C. in the dynamic viscoelasticity measurement by pulling of the inner layer to 15.0% or less, a method for setting the elongation rate at 80° C. in the dynamic viscoelasticity measurement by pulling described above to 8.0% or less (that is, very slow cooling conditions immediately after the post-heating step described above) can be adopted.

Furthermore, in the exterior material for an electrical storage device according to the First Embodiment of the present disclosure, in the graph illustrating the relationship between the elongation rate (%) and the temperature (° C.) obtained by the dynamic viscoelasticity measurement, the temperature at the elongation rate of 10% is not particularly limited, but is preferably 85° C. or higher, more preferably 90° C. or higher, still more preferably 100° C. or higher, and particularly preferably 105° C. or higher from the viewpoint of further improving the sealability of the exterior material for an electrical storage device in a high temperature environment. The temperature is, for example, 30° C. or lower, 120° C. or lower, 110° C. or lower, or the like. Preferable ranges of the temperature are about 85 to 130° C., about 85 to 120° C., about 85 to 110° C., about 90 to 130° C., about 90 to 120° C., about 90 to 110° C., about 100 to 130° C., about 100 to 120° C., about 100 to 110° C., about 105 to 130° C., about 105 to 120° C., and about 105 to 110° C. Note that the temperature at the elongation of 10% is, for example, the temperature at a position I in the schematic diagram of FIG. 7, and the graph becomes a straight line at a temperature higher than the position I.

In the exterior material for an electrical storage device according to the First Embodiment of the present disclosure, as a method of setting the temperature to 85° C. or higher, a method of setting the elongation rate at 80° C. in the dynamic viscoelasticity measurement by tension described above to 8.0% or less (that is, very slow cooling conditions immediately after the post-heating step described above) can be adopted.

2. Layers Forming Exterior Material for Electrical Storage Device

[Base Material Layer 1]

In the present disclosure, the base material layer 1 is a layer provided for the purpose of, for example, exhibiting a function as a base material of an exterior material for an electrical storage device. The base material layer 1 is positioned on an outer layer side of the exterior material for an electrical storage device.

The material for forming the base material layer 1 is not particularly limited as long as it has a function as a base material, that is, at least insulation quality. The base material layer 1 can be formed using, for example, a resin, and the resin may contain an additive described later.

In a case where the base material layer 1 is formed of a resin, the base material layer 1 may be, for example, a resin film formed of a resin, or may be formed by applying a resin. The resin film may be an unstretched film or a stretched film. Examples of the stretched film include a uniaxially stretched film and a biaxially stretched film, and a biaxially stretched film is preferable. Examples of the stretching method of forming the biaxially stretched film include a sequential biaxial stretching method, an inflation method, and a simultaneous biaxial stretching method. Examples of the method of applying the resin include a roll coating method, a gravure coating method, and an extrusion coating method.

Examples of the resin that forms the base material layer 1 include resins such as polyester, polyamide, polyolefin, epoxy resin, acrylic resin, fluororesin, polyurethane, silicone resin, and phenol resin, and modified products of these resins. Furthermore, the resin forming the base material layer 1 may be a copolymer of these resins or a modified product of the copolymer. Moreover, a mixture of these resins may be used.

Among these resins, preferred examples of the resin that forms the base material layer 1 include polyester and polyamide.

Specific examples of the polyester include polyethylene terephthalate, polybutylene terephthalate, polyethylene naphthalate, polybutylene naphthalate, polyethylene isophthalate, and copolymerized polyester. Furthermore, examples of the copolymerized polyester include copolymerized polyesters having ethylene terephthalate as a main repeating unit. Specific examples thereof include copolymer polyesters that are polymerized with ethylene isophthalate using ethylene terephthalate as a main repeating unit (Hereinafter, abbreviated according to polyethylene (terephthalate/isophthalate)), polyethylene (terephthalate/adipate), polyethylene (terephthalate/sodium sulfoisophthalate), polyethylene (terephthalate/sodium isophthalate), polyethylene (terephthalate/phenyl-dicarboxylate), and polyethylene (terephthalate/decane dicarboxylate). These polyesters may be used alone, or may be used in combination of two or more thereof.

Furthermore, specific examples of the polyamide include aliphatic polyamides such as nylon 6, nylon 66, nylon 610, nylon 12, nylon 46, and a copolymer of nylon 6 and nylon 66. Hexamethylenediamine-isophthalic acid-terephthalic acid copolymerized polyamides such as nylon 6I, nylon 6T, nylon 6IT, and nylon 6I6T (I represents isophthalic acid and T represents terephthalic acid.) containing a structural unit derived from terephthalic acid and/or isophthalic acid, and aromatic-containing polyamides such as polyamide MXD6 (polymethaxylylene adipamide); alicyclic polyamide such as polyamide PACM6 (polybis (4-aminocyclohexyl) methane adipamide); Furthermore, a polyamide obtained by copolymerizing a lactam component or an isocyanate component such as 4,4'-diphenylmethane-diisocyanate, or a polyester amide copolymer or a polyether ester amide copolymer which is a copolymer of a copolymerized polyamide and a polyester or a polyalkylene ether glycol. Examples thereof include polyamides such as copolymers thereof. These polyamides may be used alone, or may be used in combination of two or more thereof.

The base material layer 1 preferably contains at least one of a polyester film, a polyamide film, and a polyolefin film, preferably contains at least one of a stretched polyester film, a stretched polyamide film, and a stretched polyolefin film, further preferably contains at least one of a stretched polyethylene terephthalate film, a stretched polybutylene terephthalate film, a stretched nylon film, and a stretched polypropylene film, and further preferably contains at least one of a biaxially stretched polyethylene terephthalate film, a biaxially stretched polybutylene terephthalate film, a biaxially stretched nylon film, and a biaxially stretched polypropylene film.

The base material layer 1 may be a single layer or may be composed of two or more layers. In a case where the base material layer 1 is composed of two or more layers, the base material layer 1 may be a laminate obtained by laminating a resin film with an adhesive or the like, or may be a laminate of a resin film obtained by co-extruding a resin into two or more layers. Furthermore, a laminate of two or more resin films formed by co-extruding a resin may be used as the base material layer 1 in an unstretched state, or may be used as the base material layer 1 by uniaxial stretching or biaxial stretching.

Specific examples of the laminate of two or more layers of resin films in the base material layer 1 include a laminate of a polyester film and a nylon film, a laminate of two or more layers of nylon films, and a laminate of two or more layers of polyester films. Preferably, a laminate of a stretched nylon film and a stretched polyester film, a laminate of two or more layers of stretched nylon films, and a laminate of two or more layers of stretched polyester films are preferred. For example, in a case where the base material layer 1 is a laminate of two layers of resin films, a laminate of a polyester resin film and a polyester resin film, a laminate of a polyamide resin film and a polyamide resin film, or a laminate of a polyester resin film and a polyamide resin film is preferable, and a laminate of a polyethylene terephthalate film and a polyethylene terephthalate film, a laminate of a nylon film and a nylon film, or a laminate of a polyethylene terephthalate film and a nylon film is more preferable. Furthermore, when the base material layer 1 is a laminate of two or more resin films, it is preferable that the polyester resin film is located at the outermost layer of the base material layer 1, because the polyester resin is hardly discolored, for example, when the electrolytic solution adheres to the surface.

In a case where the base material layer 1 is a laminate of two or more resin films, the two or more resin films may be laminated with an adhesive interposed therebetween. Preferable examples of the adhesive include the same as the adhesive exemplified in the adhesive agent layer 2 described later. Note that the method of laminating two or more resin films is not particularly limited, and a known method can be employed, and examples thereof include a dry lamination method, a sandwich lamination method, an extrusion lamination method, a thermal lamination method, and the like, and a dry lamination method is preferable. In a case where lamination is performed by the dry lamination method, a polyurethane adhesive is preferably used as the adhesive. At this time, a thickness of the adhesive is, for example, about 2 to 5 μm. Furthermore, an anchor coat layer may be formed and laminated on a resin film. Examples of the anchor coat layer include those similar to the adhesive exemplified in the adhesive agent layer 2 described later. At this time, the thickness of the anchor coat layer is, for example, about 0.01 to 1.0 μm.

Furthermore, additives such as a slipping agent, a flame retardant, an antiblocking agent, an antioxidant, a light stabilizer, a tackifier, and an antistatic agent may be present on at least one of the surface and the inside of the base material layer 1. The additive may be used singly or in combination of two or more kinds thereof.

In the present disclosure, it is preferable that a slipping agent exists on the surface of the base material layer 1 from the viewpoint of enhancing the moldability of the exterior material for an electrical storage device. The slipping agent is not particularly limited, but an amide-based slipping agent is preferable. Specific examples of the amide-based slipping agent include saturated fatty acid amides, unsaturated fatty acid amides, substituted amides, methylol amides, saturated fatty acid bisamides, unsaturated fatty acid bisamides, fatty acid ester amides, and aromatic bisamides. Specific examples of the saturated fatty acid amide include lauric acid amide, palmitic acid amide, stearic acid amide, behenic acid amide, and hydroxystearic acid amide. Specific examples of the unsaturated fatty acid amide include oleic acid amide and erucic acid amide. Specific examples of the substituted amide include N-oleyl palmitic acid amide, N-stearyl stearic acid amide, N-stearyl oleic acid amide, N-oleyl stearic acid amide, and N-stearyl erucic acid amide. Furthermore, specific examples of the methylol amide include methylol stearic acid amide. Specific examples of the saturated fatty acid bis-amide include methylene bis-stearic acid amide, ethylene bis-capric acid amide, ethylene bis-lauric acid amide, ethylene bis-stearic acid amide, ethylene bis-hydroxystearic acid amide, ethylene bis-behenic acid amide, hexamethylene bis-stearic acid amide, hexamethylene bis-behenic acid amide, hexamethylene hydroxystearic acid amide, N,N'-distearyl adipic acid amide, and N,N'-distearyl sebacic acid amide. Specific examples of the unsaturated fatty acid bisamide include ethylene bis-oleic acid amide, ethylene bis-erucic acid amide, hexamethylene bis-oleic acid amide, N,N'-dioleyl adipic acid amide, and N,N'-dioleyl sebacic acid amide. Specific examples of the fatty acid ester amide include stearamide ethyl stearate. Furthermore, specific examples of the aromatic bisamide include m-xylylene bisstearic acid amide, m-xylylene bis-hydroxystearic acid amide, and N,N'-distearyl isophthalic acid amide. The slipping agent may be used alone, or may be used in combination of two or more thereof.

In a case where the slipping agent is present on the surface of the base material layer 1, an amount of the slipping agent present is not particularly limited, but is preferably about 3 $mg/m^2$ or more, more preferably about 4 to 15 $mg/m^2$, still more preferably about 5 to 14 $mg/m^2$.

The slipping agent present on the surface of the base material layer 1 may be obtained by exuding the slipping agent contained in the resin constituting the base material layer 1, or may be obtained by applying the slipping agent to the surface of the base material layer 1.

A thickness of the base material layer 1 is not particularly limited as long as a function as a base material is exhibited, and it is, for example, about 3 to 50 μm, preferably about 10 to 35 μm. In a case where the base material layer 1 is a laminate of two or more resin films, the thickness of each resin film constituting each layer is preferably about 2 to 25 μm.

[Adhesive Agent Layer 2]

In the exterior material for an electrical storage device of the present disclosure, the adhesive agent layer 2 is a layer provided between the base material layer 1 and the barrier layer 3 as necessary for the purpose of improving bondability between the base material layer 1 and the barrier layer 3.

The adhesive agent layer 2 is formed of an adhesive agent capable of bonding the base material layer 1 and the barrier layer 3. The adhesive agent used for forming the adhesive agent layer 2 is not limited, and may be any of a chemical reaction type, a solvent volatilization type, a heat melting type, a heat pressing type, and the like. Furthermore, the adhesive agent may be a two-liquid curable adhesive agent (two-liquid adhesive agent), a one-liquid curable adhesive agent (one-liquid adhesive agent), or a resin that does not undergo a curing reaction. Furthermore, the adhesive agent layer 2 may be a single layer or a multilayer.

Specific examples of the adhesive component contained in the adhesive agent include polyesters such as polyethylene terephthalate, polybutylene terephthalate, polyethylene naphthalate, polybutylene naphthalate, polyethylene isophthalate and copolymerized polyester; polyether; polyurethane; epoxy resin; phenol resin; polyamides such as nylon 6, nylon 66, nylon 12, and copolymerized polyamide; polyolefin-based resin such as polyolefin, cyclic polyolefin, acid-modified polyolefin, or acid-modified cyclic polyolefin; polyvinyl acetate; cellulose; (meth) acrylic resin; polyimide; polycarbonate; amino resins such as urea resin and melamine resin; rubber such as chloroprene rubber, nitrile rubber, and styrene-butadiene rubber; silicone resins and the like. These adhesive components may be used alone, or may be used in combination of two or more thereof. Among these adhesive components, a polyurethane adhesive agent is preferable. Furthermore, these resins as adhesive components can increase the adhesive strength by using an appropriate curing agent in combination. The curing agent is appropriately selected from a polyisocyanate, a polyfunctional epoxy resin, an oxazoline group-containing polymer, a polyamine resin, an acid anhydride, and the like according to the functional group of the adhesive component.

Examples of the polyurethane adhesive include a polyurethane adhesive containing a main component containing a polyol compound and a curing agent containing an isocyanate compound. Preferable examples thereof include two-liquid curable polyurethane adhesives containing a polyol such as a polyester polyol, a polyether polyol, or an acrylic polyol as a main component and an aromatic or aliphatic polyisocyanate as a curing agent. Furthermore, as the polyol compound, it is preferable to use a polyester polyol having a hydroxyl group in the side chain in addition to the hydroxyl group at the terminal of the repeating unit. Examples of the curing agent include aliphatic, alicyclic, aromatic, and araliphatic isocyanate-based compounds. Examples of the isocyanate-based compound include hexamethylene diisocyanate (HDI), xylylene diisocyanate (XDI), isophorone diisocyanate (IPDI), hydrogenated XDI (H6XDI), hydrogenated MDI (H12MDI), tolylene diisocyanate (TDI), diphenylmethane diisocyanate (MDI), and naphthalene diisocyanate (NDI). Furthermore, a polyfunctional isocyanate-modified product of one or two or more of these diisocyanates can be mentioned. Furthermore, as the polyisocyanate compound, a multimer (for example, a trimer) can also be used. Examples of such a multimer include adducts, biurets, and nurates. Since the adhesive agent layer 2 is formed of a polyurethane adhesive agent, excellent electrolytic solution resistance is imparted to the exterior material for an electrical storage device, and peeling of the base material layer 1 is suppressed even if the electrolytic solution adheres to the side surface.

Furthermore, the adhesive agent layer 2 allows addition of other components as long as bondability is not inhibited, and may contain a colorant, a thermoplastic elastomer, a tackifier, a filler, and the like. Since the adhesive agent layer 2 contains a colorant, the exterior material for an electrical storage device can be colored. As the colorant, known colorants such as pigments and dyes can be used. Furthermore, the colorant may be used singly or in combination of two or more kinds thereof.

The type of pigment is not particularly limited as long as the bondability of the adhesive agent layer 2 is not impaired. Examples of the organic pigment include azo-based, phthalocyanine-based, quinacridone-based, anthraquinone-based, dioxazine-based, indigothioindigo-based, perinone-perylene-based, isoindolenine-based, and benzimidazolone-based pigments. Examples of the inorganic pigment include carbon-black-based, titanium-based, cadmium-based, lead-based, chromium-based, and iron-based pigments. In addition, examples of the inorganic pigment include fine powder of mica (mica) and fish scale foil.

Among the colorants, for example, carbon black is preferable in order to make the appearance of the exterior material for an electrical storage device black.

An average particle diameter of the pigment is not particularly limited, and is, for example, about 0.05 to 5 μm, preferably about 0.08 to 2 μm. Note that the average particle diameter of the pigment is a median diameter measured by a laser diffraction/scattering particle diameter distribution measuring device.

The content of the pigment in the adhesive agent layer 2 is not particularly limited as long as the exterior material for an electrical storage device is colored, and is, for example, about 5 to 60 mass %, preferably 10 to 40 mass %.

A thickness of the adhesive agent layer 2 is not particularly limited as long as the base material layer 1 and the barrier layer 3 can be adhered to each other, and is, for example, about 1 μm or more and about 2 μm or more. Furthermore, the thickness of the adhesive agent layer 2 is, for example, about 10 μm or less and about 5 μm or less. Furthermore, preferable ranges of the thickness of the adhesive agent layer 2 include about 1 to 10 μm, about 1 to 5 μm, about 2 to 10 μm, and about 2 to 5 μm.

[Colored Layer]

A colored layer is a layer provided between the base material layer 1 and the barrier layer 3 as necessary (illustration is omitted). In a case where the adhesive agent layer 2 is provided, a colored layer may be provided between the base material layer 1 and the adhesive agent layer 2 and between the adhesive agent layer 2 and the barrier layer 3. Furthermore, a colored layer may be provided outside the base material layer 1. By providing the colored layer, the exterior material for an electrical storage device can be colored.

The colored layer can be formed, for example, by applying an ink containing a colorant to the surface of the base material layer 1 or the surface of the barrier layer 3. As the colorant, known colorants such as pigments and dyes can be used. Furthermore, the colorant may be used singly or in combination of two or more kinds thereof.

Specific examples of the colorant contained in the colored layer include the same colorants as those exemplified in the section of [Adhesive agent layer 2].

[Barrier Layer 3]

In the exterior material for an electrical storage device, the barrier layer 3 is a layer that suppresses at least infiltration of moisture.

Examples of the barrier layer 3 include a metal foil having a barrier property, a deposited film, and a resin layer. Examples of the deposited film include a metal deposited film, an inorganic oxide deposited film, and a carbon-containing inorganic oxide deposited film, and examples of the resin layer include fluorine-containing resins such as polymers mainly composed of polyvinylidene chloride, chlorotrifluoroethylene (CTFE), polymers mainly composed of tetrafluoroethylene (TFE), polymers having a fluoroalkyl group, and polymers mainly composed of a fluoroalkyl unit, and ethylene vinyl alcohol copolymers. Examples of the barrier layer 3 include a resin film provided with at least one of the deposited film and the resin layer. A plurality of the barrier layers 3 may be provided. The barrier layer 3 preferably includes a layer made of a metal material. Specific examples of the metal material constituting the barrier layer 3 include an aluminum alloy, stainless steel, titanium steel, and a steel plate. In a case where the metal material is used as a metal foil, the metal material preferably includes at least one of an aluminum alloy foil and a stainless steel foil.

From the viewpoint of improving the moldability of the exterior material for an electrical storage device, the aluminum alloy foil is more preferably, for example, a soft aluminum alloy foil composed of an annealed aluminum alloy or the like, and from the viewpoint of further improving the moldability, the aluminum alloy foil is preferably an iron-containing aluminum alloy foil. In the aluminum alloy foil containing iron (100 mass %), the content of iron is preferably 0.1 to 9.0 mass %, and more preferably 0.5 to 2.0 mass %. In a case where the content of iron is 0.1 mass % or more, an exterior material for an electrical storage device having more excellent moldability can be obtained. In a case where the content of iron is 9.0 mass % or less, it is possible to obtain an exterior material for an electrical storage device having more excellent flexibility. Examples of the soft aluminum alloy foil include an aluminum alloy foil having a composition specified in JIS H4160:1994 A8021H-O, JIS H4160:1994 A8079H-O, JIS H4000:2014 A8021P-O, or JIS H4000:2014 A8079P-O. Furthermore, if necessary, silicon, magnesium, copper, manganese, or the like may be added. Furthermore, softening can be performed by an annealing treatment or the like.

Furthermore, examples of the stainless steel foil include austenitic, ferritic, austenitic and ferritic, martensitic, and precipitation hardening stainless steel foils. Moreover, from the viewpoint of providing an exterior material for an electrical storage device having excellent moldability, the stainless steel foil is preferably made of austenitic stainless steel.

Specific examples of the austenitic stainless steel constituting the stainless steel foil include SUS304, SUS301, and SUS316L, and among these, SUS304 is particularly preferable.

In the case of a metal foil, a thickness of the barrier layer 3 may be, for example, about 9 to 200 μm as long as it exhibits a function as a barrier layer that suppresses at least infiltration of moisture. The thickness of the barrier layer 3 is preferably about 85 μm or less, more preferably about 50 μm or less, still more preferably about 40 μm or less, and particularly preferably about 35 μm or less. Furthermore, the thickness of the barrier layer 3 is preferably about 10 μm or more, more preferably about 20 μm or more, and more preferably about 25 μm or more. Furthermore, preferable ranges of the thickness of the barrier layer 3 include about 10 to 85 μm, about 10 to 50 μm, about 10 to 40 μm, about 10 to 35 μm, about 20 to 85 μm, about 20 to 50 μm, about 20 to 40 μm, about 20 to 35 μm, about 25 to 85 μm, about 25 to 50 μm, about 25 to 40 μm, and about 25 to 35 μm. In a case where the barrier layer 3 is made of an aluminum alloy foil, the above-mentioned range is particularly preferable. Furthermore, in a case where the barrier layer 3 is formed of an aluminum alloy foil, from the viewpoint of imparting high moldability and high rigidity to the exterior material 10 for an electrical storage device, the thickness of the barrier layer 3 is preferably about 45 μm or more, more preferably about 50 μm or more, and more preferably about 55 μm or more, and preferably about 80 μm or less, more preferably 75 μm or less, and still more preferably 70 μm or less. As a preferable range, the thickness is about 45 to 80 μm, about 45 to 75 μm, about 45 to 70 μm, about 50 to 80 μm, about 50 to 75 μm, about 50 to 70 μm, about 55 to 80 μm, about 55 to 75 μm, or about 55 to 70 μm. When the exterior material 10 for an electrical storage device has high moldability, deep drawing can be easily performed, which can contribute to an increase in capacity of the electrical storage device. Furthermore, when the capacity of the electrical storage device is increased, the weight of the electrical storage device increases, but the rigidity of the exterior material 10 for an electrical storage device is increased, which can contribute to high sealability of the electrical storage device.

Furthermore, in particular in a case where the barrier layer 3 is constituted by a stainless steel foil, the thickness of the stainless steel foil is preferably about 60 μm or less, more preferably about 50 μm or less, still more preferably about 40 μm or less, still more preferably about 30 μm or less, and particularly preferably about 25 μm or less. Furthermore, the thickness of the stainless steel foil is preferably about 10 μm or more, more preferably about 15 μm or more. Furthermore, preferable ranges of the thickness of the stainless steel foil include about 10 to 60 μm, about 10 to 50 μm, about 10 to 40 μm, about 10 to 30 μm, about 10 to 25 μm, about 15 to 60 μm, about 15 to 50 μm, about 15 to 40 μm, about 15 to 30 μm, and about 15 to 25 μm.

Furthermore, in a case where the barrier layer 3 is a metal foil, a corrosion-resistant film is preferably provided at least on a surface opposite to the base material layer in order to prevent dissolution and corrosion. The barrier layer 3 may be provided with a corrosion-resistant film on both surfaces. Here, the corrosion-resistant film refers to a thin film that is obtained by subjecting the surface of the barrier layer to, for example, a hydrothermal denaturation treatment such as a boehmite treatment, a chemical conversion treatment, an anodization treatment, a plating treatment with nickel, chromium or the like, or a corrosion prevention treatment by applying a coating agent, and imparts corrosion resistance (for example, acid resistance, alkali resistance, and the like) to the barrier layer. Specifically, the corrosion-resistant coating film means a coating film that improves the acid resistance of the barrier layer (acid-resistant coating film), a coating film that improves the alkali resistance of the barrier layer (alkali-resistant coating film), and the like. The treatment for forming the corrosion-resistant coating film may be performed singly or in combination of two or more kinds thereof. Furthermore, not only one layer but also multiple layers can be formed. Moreover, among these treatments, the hydrothermal denaturation treatment and the anodization treatment are treatments in which the surface of the metal foil is dissolved with a treatment agent to form a metal compound excellent in corrosion resistance. Note that these treatments may be included in the definition of the chemical conversion treatment. Furthermore, in a case where the barrier layer 3 includes the corrosion-resistant coating, the corrosion-resistant coating is included in the barrier layer 3.

The corrosion-resistant coating film prevents delamination between a barrier layer (for example, aluminum alloy foil) and a base material layer at the time of molding an exterior material for an electrical storage device, prevents dissolution and corrosion of a surface of the barrier layer, particularly, dissolution and corrosion of aluminum oxide present on the surface of the barrier layer when the barrier layer is an aluminum alloy foil by hydrogen fluoride generated by a reaction between an electrolyte and moisture, and improves bondability (wettability) of the surface of the barrier layer, and exhibits effects of preventing delamination between the base material layer and the barrier layer at the time of heat sealing and preventing delamination between the base material layer and the barrier layer at the time of molding.

Various corrosion resistant films formed by the chemical conversion treatment are known, and examples thereof include mainly corrosion resistant films containing at least one of a phosphate, a chromate, a fluoride, a triazine thiol compound, and a rare earth oxide. Examples of the chemical conversion treatment using a phosphate or a chromate include a chromic acid chromate treatment, a phosphoric acid chromate treatment, a phosphoric acid-chromate treatment and a chromate treatment, and examples of the chromium compound used in these treatments include chromium nitrate, chromium fluoride, chromium sulfate, chromium acetate, chromium oxalate, chromium biphosphate, acetylacetate chromate, chromium chloride and chromium potassium sulfate. Furthermore, examples of the phosphorus compound used for these treatments include sodium phosphate, potassium phosphate, ammonium phosphate, and polyphosphoric acid. Furthermore, examples of the chromate treatment include an etching chromate treatment, an electrolytic chromate treatment, and a coating type chromate treatment, and the coating type chromate treatment is preferable. This coating type chromate treatment is a treatment in which at least the inner layer-side surface of the barrier layer (for example, aluminum alloy foil) is first subjected to a degreasing treatment by a well-known treatment method such as an alkali immersion method, an electrolytic cleaning method, an acid cleaning method, an electrolytic acid cleaning method, or an acid activation method, and then the degreased surface is coated with a treatment liquid containing, as a main component, a metal phosphate such as Cr (chromium) phosphate, a Ti (titanium) phosphate, a Zr (zirconium) phosphate, or a Zn (zinc) phosphate and a mixture of these metal salts, a treatment liquid containing, as a main component, a non-metal phosphate and a mixture of these non-metal salts, or a treatment liquid including a mixture of these and a synthetic resin or the like by a well-known coating method such as a roll coating method, a gravure printing method, or an immersion method, and dried. As the treatment liquid, for example, various solvents such as water, an alcohol-based solvent, a hydrocarbon-based solvent, a ketone-based solvent, an ester-based solvent, and an ether-based solvent can be used, and water is preferable. Furthermore, examples of the resin component used at this time include polymers such as phenolic resins and acrylic resins, and examples thereof include a chromate treatment using an aminated phenol polymer having repeating units represented by the following general formulas (1) to (4). Note that, in the aminated phenol polymer, the repeating units represented by the following general formulas (1) to (4) may be contained alone or in any combination of two or more thereof. The acrylic resin is preferably polyacrylic acid, an acrylic acid methacrylic acid ester copolymer, an acrylic acid maleic acid copolymer, an acrylic acid styrene copolymer, or a derivative such as a sodium salt, an ammonium salt, or an amine salt thereof. In particular, derivatives of polyacrylic acid such as an ammonium salt, a sodium salt, or an amine salt of polyacrylic acid are preferable. In the present disclosure, polyacrylic acid means a polymer of acrylic acid. Furthermore, the acrylic resin is also preferably a copolymer of acrylic acid and a dicarboxylic acid or a dicarboxylic anhydride, and is also preferably an ammonium salt, a sodium salt, or an amine salt of a copolymer of acrylic acid and a dicarboxylic acid or a dicarboxylic anhydride. Only one acrylic resin may be used, or two or more acrylic resins may be used in combination.

[Chemical Formula 1]

(1)

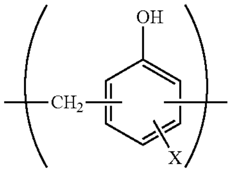

-continued

[Chemical Formula 2]

(2)

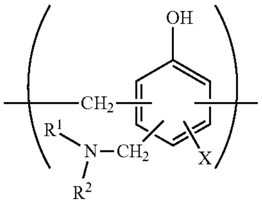

[Chemical Formula 3]

(3)

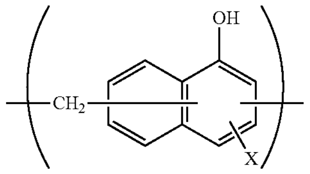

[Chemical Formula 4]

(4)

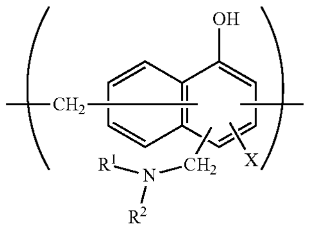

In the general formulas (1) to (4), X represents a hydrogen atom, a hydroxy group, an alkyl group, a hydroxyalkyl group, an allyl group, or a benzyl group. Furthermore, $R^1$ and $R^2$ are the same or different and each represent a hydroxy group, an alkyl group, or a hydroxyalkyl group. In the general formulas (1) to (4), examples of the alkyl group represented by X, $R^1$, and $R^2$ include linear or branched alkyl groups having 1 to 4 carbon atoms such as a methyl group, an ethyl group, a n-propyl group, an isopropyl group, a n-butyl group, an isobutyl group, and a tert-butyl group. Furthermore, examples of the hydroxyalkyl group represented by X, $R^1$, and $R^2$ include linear or branched alkyl groups having 1 to 4 carbon atoms in which one hydroxy group is substituted, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group, and a 4-hydroxybutyl group. In the general formulas (1) to (4), the alkyl group and the hydroxyalkyl group represented by X, $R^1$, and $R^2$ may be the same or different. In the general formulas (1) to (4), X is preferably a hydrogen atom, a hydroxy group, or a hydroxyalkyl group. The number average molecular weight of the aminated phenol polymer having repeating units represented by the general formulas (1) to (4) is, for example, preferably about 500 to 1,000,000, more preferably about 1,000 to 20.000. The aminated phenol polymer is produced, for example, by polycondensating a phenol compound or a naphthol compound with formaldehyde to produce a polymer composed of repeating units represented by the general formula (1) or the general formula (3), and then introducing a functional group ($—CH_2NR^1R^2$) into the polymer obtained above using formaldehyde and an amine ($R^1R^2NH$). The aminated phenol polymer is used singly or in combination of two or more kinds thereof.

Other examples of the corrosion resistance film include a thin film formed by a coating type corrosion preventing treatment in which a coating agent containing at least one selected from the group consisting of a rare earth element oxide sol, an anionic polymer, and a cationic polymer is applied. The coating agent may further contain phosphoric acid or a phosphate, and a crosslinking agent for crosslinking the polymer. In the rare earth element oxide sol, fine particles of a rare earth element oxide (for example, particles having an average particle diameter of 100 nm or less) are dispersed in a liquid dispersion medium. Examples of the rare earth element oxide include cerium oxide, yttrium oxide, neodymium oxide, and lanthanum oxide, and cerium oxide is preferable from the viewpoint of further improving adhesion. The rare earth element oxides contained in the corrosion resistance film can be used singly or in combination of two or more kinds thereof. As the liquid dispersion medium of the rare earth element oxide sol, for example, various solvents such as water, an alcohol-based solvent, a hydrocarbon-based solvent, a ketone-based solvent, an ester-based solvent, and an ether-based solvent can be used, and water is preferable. As the cationic polymer, for example, polyethyleneimine, an ionic polymer complex composed of a polymer having polyethyleneimine and a carboxylic acid, a primary amine-grafted acrylic resin obtained by graft-polymerizing a primary amine to an acrylic main skeleton, polyallylamine or a derivative thereof, aminated phenol, and the like are preferable. Furthermore, the anionic polymer is preferably poly (meth) acrylic acid or a salt thereof, or a copolymer containing (meth) acrylic acid or a salt thereof as a main component. Furthermore, the crosslinking agent is preferably at least one selected from the group consisting of a compound having any functional group of an isocyanate group, a glycidyl group, a carboxyl group, and an oxazoline group, and a silane coupling agent. Furthermore, the phosphoric acid or phosphate is preferably condensed phosphoric acid or condensed phosphate.

An example of the corrosion resistance film is a film formed by applying a dispersion of fine particles of a metal oxide such as aluminum oxide, titanium oxide, cerium oxide or tin oxide or barium sulfate in phosphoric acid on the surface of the barrier layer and performing a baking treatment at 150° C. or higher.

The corrosion resistance film may have a laminated structure in which at least one of a cationic polymer and an anionic polymer is further laminated as necessary. Examples of the cationic polymer and the anionic polymer include those described above.

Note that the composition of the corrosion-resistant coating can be analyzed using, for example, time-of-flight secondary ion mass spectrometry.

An amount of the corrosion-resistant film to be formed on the surface of the barrier layer 3 in the chemical conversion treatment is not particularly limited, but for example, in the case of performing a coating type chromate treatment, it is desirable that the chromic acid compound is contained in an amount of, for example, about 0.5 to 50 mg, preferably about 1.0 to 40 mg, in terms of chromium, the phosphorus compound is contained in an amount of, for example, about 0.5 to 50 mg, preferably about 1.0 to 40 mg, in terms of phosphorus, and the aminated phenol polymer is contained in an amount of, for example, about 1.0 to 200 mg, preferably about 5.0 to 150 mg, per 1 $m^2$ of the surface of the barrier layer 3.

A thickness of the corrosion-resistant coating film is not particularly limited, but it is preferably about 1 nm to 20 μm, more preferably about 1 nm to 100 nm, and still more preferably about 1 nm to 50 nm from the viewpoint of the cohesive force of the coating film and the adhesive force with the barrier layer and the heat-sealable resin layer. Note that the thickness of the corrosion-resistant coating film can be measured by observation with a transmission electron microscope or a combination of observation with a transmission electron microscope and energy dispersive X-ray spectroscopy or electron beam energy loss spectroscopy. By analyzing the composition of the corrosion-resistant coating film using time-of-flight secondary ion mass spectrometry, peaks derived from, for example, secondary ions composed of Ce, P, and O (for example, at least one of $Ce_2PO_4^+$, $CePO_4^-$, and the like), and secondary ions composed of, for example, Cr, P, and O (for example, at least one of $CrPO_2^+$, $CrPO_4^-$, and the like) are detected.

The chemical conversion treatment is performed by applying a solution containing a compound to be used for formation of the corrosion-resistant film to the surface of the barrier layer by a bar coating method, a roll coating method, a gravure coating method, an immersion method or the like, and then heating the barrier layer so that the temperature of the barrier layer is about 70 to 200° C. Furthermore, before the barrier layer is subjected to the chemical conversion treatment, the barrier layer may be subjected to a degreasing treatment by an alkali immersion method, an electrolytic cleaning method, an acid cleaning method, an electrolytic acid cleaning method, or the like in advance. By performing the degreasing treatment in this manner, the chemical conversion treatment of the surface of the barrier layer can be more efficiently performed. Furthermore, by using an acid degreasing agent in which a fluorine-containing compound is dissolved with an inorganic acid for the degreasing treatment, it is possible to form not only the degreasing effect of the metal foil but also a passivation metal fluoride. In such a case, only the degreasing treatment may be performed.

[Heat-Sealable Resin Layer 4]

In the exterior material for an electrical storage device of the present disclosure, the heat-sealable resin layer 4 included in the inner layer corresponds to the innermost layer, and is a layer (sealant layer) that exerts a function of sealing the electrical storage device element by heat-sealing the heat-sealable resin layers at the time of assembling the electrical storage device.

In the First Embodiment, the resin constituting the heat-sealable resin layer 4 is not particularly limited as long as it can be heat-sealed, and when the inner layer is subjected to dynamic viscoelasticity measurement by tension, the elongation rate at 80° C. is 8.0% or less, but a resin containing a polyolefin backbone such as a polyolefin or an acid-modified polyolefin is preferable. Furthermore, in the Second Embodiment, the resin constituting the heat-sealable resin layer 4 is not particularly limited as long as it can be heat-sealed, but a resin containing a polyolefin backbone such as a polyolefin or an acid-modified polyolefin is preferable.

In the present disclosure, the fact that the resin constituting the heat-sealable resin layer 4 contains a polyolefin backbone can be analyzed by, for example, infrared spectroscopy, gas chromatography mass spectrometry, or the like. Furthermore, when the resin constituting the heat-sealable resin layer 4 is analyzed by infrared spectroscopy, a peak derived from maleic anhydride is preferably detected. For example, when maleic anhydride-modified polyolefin is measured by infrared spectroscopy, peaks derived from maleic anhydride are detected in the vicinity of a wave number of 1760 $cm^{-1}$ and in the vicinity of a wave number of 1780 $cm^{-1}$. In a case where the heat-sealable resin layer 4 is a layer composed of a maleic anhydride-modified polyolefin, a peak derived from maleic anhydride is detected as measured by infrared spectroscopy. However, when the acid modification degree is low, the peak becomes small and may not be detected. In that case, it can be analyzed by nuclear magnetic resonance spectroscopy.

In the present disclosure, the polyolefin is specifically polyethylene such as low-density polyethylene, medium-density polyethylene, high-density polyethylene, and linear low-density polyethylene; ethylene-α-olefin copolymer; Polypropylene, such as homopolypropylene, block copolymers of polypropylene (for example, a block copolymer of propylene and ethylene), random copolymers of polypropylene (for example, a random copolymer of propylene and ethylene); propylene-α-olefin copolymer; terpolymers of ethylene-butene-propylene. Among them, polypropylene is preferable. The polyolefin resin in the case of a copolymer may be a block copolymer or a random copolymer. These polyolefin-based resins may be used alone or in combination of two or more thereof.

Furthermore, in the present disclosure, the polyolefin may be a cyclic polyolefin. The cyclic polyolefin is a copolymer of an olefin and a cyclic monomer, and examples of the olefin as a constituent monomer of the cyclic polyolefin include ethylene, propylene, 4-methyl-1-pentene, styrene, butadiene, and isoprene. Furthermore, examples of the cyclic monomer as a constituent monomer of the cyclic polyolefin include cyclic alkenes such as norbornene: examples thereof include cyclic dienes such as cyclopentadiene, dicyclopentadiene, cyclohexadiene and norbornadiene. Among them, cyclic alkenes are preferable, and norbornene is more preferable.

In the present disclosure, the acid-modified polyolefin is a polymer obtained by modifying a polyolefin by block polymerization or graft polymerization with an acid component. As the polyolefin to be acid-modified, the above-mentioned polyolefin, a copolymer obtained by copolymerizing polar molecules such as acrylic acid or methacrylic acid with the above-mentioned polyolefin, a polymer such as a crosslinked polyolefin, or the like can also be used. Furthermore, examples of the acid component used for the acid modification include carboxylic acids such as maleic acid, acrylic acid, itaconic acid, crotonic acid, maleic anhydride, and itaconic anhydride, and anhydrides thereof.

In the present disclosure, the acid-modified polyolefin may be an acid-modified cyclic polyolefin. The acid-modified cyclic polyolefin is a polymer obtained by copolymerizing a part of monomers constituting the cyclic polyolefin in place of an acid component, or by block-polymerizing or graft-polymerizing an acid component with respect to the cyclic polyolefin. The cyclic polyolefin to be acid-modified is the same as described above. Furthermore, the acid component used for the acid modification is the same as the acid component used for the modification of the polyolefin.

In the present disclosure, preferred examples of the acid-modified polyolefin include a polyolefin modified with a carboxylic acid or an anhydride thereof, a polypropylene modified with a carboxylic acid or an anhydride thereof, a maleic anhydride-modified polyolefin, and a maleic anhydride-modified polypropylene.

In the present disclosure, the heat-sealable resin layer 4 may be formed of one type of resin alone, or may be formed of a blend polymer obtained by combining two or more types of resins. Moreover, the heat-sealable resin layer 4 may be formed of only one layer, or may be formed of two or more layers of the same or different resins.

Furthermore, in the present disclosure, heat-sealable resin layer 4 may contain a slipping agent or the like as necessary. When the heat-sealable resin layer 4 contains a slipping agent, moldability of the exterior material for an electrical storage device can be enhanced. The slipping agent is not particularly limited, and a known slipping agent can be used. The slipping agent may be used alone, or may be used in combination of two or more thereof.

The slipping agent is not particularly limited, but an amide-based slipping agent is preferable. Specific examples of the slipping agent include those exemplified for the base material layer 1. The slipping agent may be used alone, or may be used in combination of two or more thereof.

In the present disclosure, when the slipping agent is present on the surface of the heat-sealable resin layer 4, the amount of the slipping agent present is not particularly limited, but is preferably about 10 to 50 $mg/m^2$, more preferably about 15 to 40 $mg/m^2$ for improving moldability of an exterior material for an electrical storage device.

In the present disclosure, the slipping agent present on the surface of the heat-sealable resin layer 4 may be one obtained by exuding the slipping agent contained in the resin constituting the heat-sealable resin layer 4, or one obtained by applying the slipping agent to the surface of the heat-sealable resin layer 4.

Furthermore, in the present disclosure, the thickness of the heat-sealable resin layer 4 is not particularly limited as long as the heat-sealable resin layers are heat-sealed with each other to exhibit a function of sealing the electrical storage device element, and is, for example, about 100 μm or less, preferably about 85 μm or less, more preferably about 15 to 85 μm. Note that, in the present disclosure, for example, when the thickness of the later-described adhesive layer 5 is 10 μm or more, the thickness of the heat-sealable resin layer 4 is preferably about 85 μm or less, more preferably about 15 to 45 μm, and for example, when the thickness of the later-described adhesive layer 5 is less than 10 μm or when the adhesive layer 5 is not provided, the thickness of the heat-sealable resin layer 4 is preferably about 20 μm or more, more preferably about 35 to 85 μm.

As described above, in the exterior material for an electrical storage device according to the First Embodiment of the present disclosure, as a preferable example for setting the elongation rate at 80° C. in dynamic viscoelasticity measurement by pulling of the inner layer to 8.0% or less, it is mentioned to enhance the crystallinity of the adhesive layer and the heat-sealable resin layer, and it is desirable to control the initial cooling condition after post-heating to a very slow cooling condition to promote the crystal growth of the resin of the adhesive layer and the heat-sealable resin layer. For example, by adopting such a method to form the heat-sealable resin layer, the crystallinity of the adhesive layer and the heat-sealable resin layer is enhanced, and the sealability in a high-temperature environment is improved.

In the Third Embodiment, the heat-sealable resin layer 4 contains polypropylene and polyethylene. In the exterior material for an electrical storage device according to the Third Embodiment of the present disclosure, a sea-island structure is observed in a cross-sectional image acquired using a scanning electron microscope for a cross section of the heat-sealable resin layer 4 in a direction parallel to TD and in the thickness direction y. For example, as illustrated in the schematic diagram of FIG. 21, the cross-sectional image is a cross-sectional image acquired within a range (region surrounded by a broken line in FIG. 21) from a surface of the heat-sealable resin layer 4 on a side opposite to a side of the barrier layer 3 to a portion having a thickness of 12.5% in a case where the total thickness of the layers located inside the barrier layer 3 is 100%. The surface of the heat-sealable resin layer 4 on the side opposite to the side of the barrier layer 3 has a thickness of 0%. Describing with a specific example, for example, as in Examples 1 and 2 described later, in the case of an exterior material for an electrical storage device in which a base material layer (thickness of 30 μm including an adhesive)/an adhesive agent layer (3 μm)/a barrier layer (40 μm)/an adhesive layer (40 μm)/a heat-sealable resin layer (40 μm) are laminated in this order, the layers located inside the barrier layer 3 are an adhesive layer (40 μm) and a heat-sealable resin layer (40 μm), and the total thickness of 80 μm of these layers is 100%. Furthermore, the position of the surface of the heat-sealable resin layer 4 on the side opposite to the side of the barrier layer 3 is, that is, the inner surface (inner surface) of the exterior material 10 for an electrical storage device, and the thickness at this position is 0%. Then, a cross-sectional image is acquired using a scanning electron microscope within a range from the surface (thickness 0%) to a position of thickness 12.5% (That is, assuming that the total thickness of 80 μm is 100%, the position of the thickness of 12.5% is a position where the thickness is 10 μm from the surface of the heat-sealable resin layer 4 on the side opposite to the side of the barrier layer 3 toward the side of the barrier layer 3.).

The fact that the sea-island structure is observed in the cross-sectional image means that a sea portion (sea portion) and an island portion (island portion) are observed in the cross-sectional image. As described above, when a small amount of polyethylene is added to polypropylene and a heat-sealable resin layer is formed by melt extrusion molding, a sea-island structure in which an island portion of polyethylene is dispersed in a sea portion of polypropylene is formed. That is, the island portion contains polyethylene. In order to observe the sea-island structure, as described later, a cross section of the heat-sealable resin layer is dyed with ruthenium tetroxide or the like, and a cross-sectional image is acquired and observed using a scanning electron microscope.

In the exterior material for an electrical storage device according to the Third Embodiment, in the cross-sectional image of the heat-sealable resin layer 4, the ratio of the total number of island portions having an area of 0.02 $μm^2$ or less to the total number of island portions having a sea-island structure is 80.0% or more. Since the exterior material for an electrical storage device of the Third Embodiment has such a characteristic, whitening of the heat-sealable resin layer due to cold molding of the exterior material for an electrical storage device and deterioration of insulation quality of the exterior material for an electrical storage device are suppressed. That is, it is considered that in the exterior material for an electrical storage device according to the Third Embodiment of the present disclosure, in the heat-sealable resin layer 4 containing polypropylene and polyethylene, the ratio of very fine island portions having an area of 0.02 $μm^2$ or less in all the island portions is set to be high, so that generation of fine cracks at the interface between the polypropylene portion and the polyethylene portion of the heat-sealable resin layer is effectively suppressed, and as a result, whitening of the heat-sealable resin layer 4 due to cold molding of the exterior material for an electrical storage device and deterioration in insulation quality of the exterior material for an electrical storage device are suppressed.

In the cross-sectional image of the heat-sealable resin layer 4 of the Third Embodiment, the ratio of the total number of island portions having an area of 0.02 $μm^2$ or less to the total number of island portions having a sea-island structure (the total number of island portions having an area of 0.02 $\mu m^2$ or less/the total number of all island portions) may be 80.0% or more, but the ratio is preferably 90.0% or more, more preferably 95.0% or more from the viewpoint of more effectively suppressing whitening and deterioration of insulation quality described above. Note that the ratio of the total number is, for example, 100.0% or less, 99.0% or less, or 98.0% or less. Preferable ranges of the ratio of the total number include, for example, about 80.0 to 100.0/o, about 80.0 to 99.0%, about 80.0 to 98.0%, about 90.0 to 100.0%, about 90.0 to 99.0%, about 90.0 to 98.0%, about 95.0 to 100.0%, about 95.0 to 99.0%, and about 95.0 to 98.0%.

Furthermore, in the cross-sectional image of the heat-sealable resin layer 4 of the Third Embodiment, the ratio of the total number of island portions having an area of 0.01 $\mu m^2$ or less to the total number of island portions having a sea-island structure (the total number of island portions having an area of 0.01 $\mu m^2$ or less/the total number of all island portions) is preferably 50.0% or more, more preferably 55.0% or more, and still more preferably 60.0% or more, from the viewpoint of more effectively suppressing the whitening and the decrease in insulation quality described above. Note that the ratio of the total number is, for example, 80.0% or less, 75.0% or less, or 70.0% or less. Preferable ranges of the ratio of the total number include, for example, about 50.0 to 80.0%, about 50.0 to 75.0%, about 50.0 to 70.0%, about 55.0 to 80.0%, about 55.0 to 75.0%, about 55.0 to 70.0%, about 60.0 to 80.0%, about 60.0 to 75.0%, and about 60.0 to 70.0%.

Furthermore, in the cross-sectional image of the heat-sealable resin layer 4 of the Third Embodiment, the ratio of the total number of island portions having an area of 0.03 $\mu m^2$ or less to the total number of island portions having a sea-island structure (the total number of island portions having an area of 0.03 $\mu m^2$ or less/the total number of all island portions) is preferably 90.0% or more, more preferably 95.0% or more, and still more preferably 97.0% or more, from the viewpoint of more effectively suppressing the whitening and the decrease in insulation quality described above. Note that the ratio of the total number is, for example, 100.0% or less, 99.0% or less, or 98.0% or less. Preferable ranges of the ratio of the total number include, for example, about 90.0 to 100.0%, about 90.0 to 99.0%, about 90.0 to 98.0%, about 95.0 to 100.0%, about 95.0 to 99.0%, about 95.0 to 98.0%, about 97.0 to 100.0%, about 97.0 to 99.0%, and about 97.0 to 98.0%.

Furthermore, in the cross-sectional image of the heat-sealable resin layer 4 of the Third Embodiment, the ratio of the total number of island portions having an area of 0.30 $\mu m^2$ or more to the total number of island portions having a sea-island structure (the total number of island portions of 0.30 $\mu m^2$ or more/the total number of all island portions) is preferably 1.0% or less, more preferably 0.5% or less, and still more preferably 0.1% or less, from the viewpoint of more effectively suppressing the whitening and the decrease in insulation quality described above. Note that the ratio of the total number is, for example, 0.0% or more.

Furthermore, from the viewpoint of more effectively suppressing the whitening and the decrease in insulation quality described above, in the cross-sectional image of the heat-sealable resin layer 4 of the Third Embodiment, the ratio of the total number of island portions having an area of 0.15 $\mu m^2$ or more to the total number of island portions having a sea-island structure (the total number of island portions of 0.15 $\mu m^2$ or more/the total number of all island portions) is preferably 1.0% or less, more preferably 0.5% or less, and still more preferably 0.1% or less. Note that the ratio of the total number is, for example, 0.0% or more.

Furthermore, in the cross-sectional image of the heat-sealable resin layer 4 of the Third Embodiment, the ratio of the total area of the island portions having the sea-island structure to the area of the measurement range of the cross-sectional image (the total area of the island portions/the area of the measurement range of the cross-sectional image) is preferably 12.0% or less, more preferably 5.0% or less, and still more preferably 1.0% or less, from the viewpoint of more effectively suppressing the whitening and the decrease in insulation quality described above. The ratio of the total area is, for example, 0.1% or more. Preferable ranges of the ratio of the total area include, for example, about 0.1 to 12.0%, about 0.1 to 5.0%, and about 0.1 to 1.0%.

In the Third Embodiment, the ratio of the total area of the island portions in each of the areas can be set to the above-mentioned value by further adjusting conditions for forming the heat-sealable resin layer 4 in addition to the blending ratio of polypropylene and polyethylene contained in the heat-sealable resin layer 4 (For example, as described later, when the heat-sealable resin layer 4 is formed by melt extrusion molding or the like, a cooling condition of the heat-sealable resin layer by a cooling roll is set to a rapid cooling condition (For example, the difference in surface temperature between the melt-extruded heat-sealable resin layer and the cooling roll is set to 70° C. or higher.) to suppress crystal growth of polyethylene in polypropylene.). Furthermore, the type, content, and the like of at least one of an antioxidant and a radical scavenger contained in the heat-sealable resin layer 4 can also be used as one of means for adjusting the ratio of the total area of the island portions of each area.

In the Third Embodiment, a method of measuring the ratio of the area of the island portion in the sea-island structure in the cross-sectional image of the heat-sealable resin layer 4 is as follows.

<Measurement of Ratio of Area and Number of Island Portions in Sea-Island Structure>

An exterior material for an electrical storage device is embedded in a thermosetting epoxy resin and cured. Using a commercially available rotary microtome (for example, EM UC6 manufactured by LEICA) and a glass knife, a cross section in a direction parallel to the TD and in the thickness direction y is prepared, and at that time, the cross section is prepared with a room-temperature microtome. The heat-sealable resin layer of the exterior material for an electrical storage device together with the embedded resin is dyed with ruthenium tetroxide for 3 hours. When the resin is dyed, the resin expands, and the sea-island structure cannot be confirmed near the cross section. Therefore, the expanded portion is trimmed with the microtome. Then, a stained section having a thickness of about 100 nm collected from the cross section after being cut from about 1 μm to 2 μm using a diamond knife is observed as follows. Cross-sectional images of the stained sections are acquired using a field emission scanning electron microscope (for example, S-4800 manufactured by Hitachi High-Technologies Corporation). Note that, as described above, the cross-sectional image is a cross-sectional image acquired within a range from the surface of the heat-sealable resin layer on the side opposite to the barrier layer side to a portion having a thickness of 12.5% when the total thickness of the layers located inside the barrier layer is 100%. When, for example, S-4800 manufactured by Hitachi High-Technologies Corporation is used as the field emission type scanning electron microscope, measurement conditions are as follows: acceleration voltage: 30 kV, emission current: 10 ρA, detector: transmission detector, inclination: none (0°), observation magnification: 5,000 times. Next, using image processing software (for example, image analysis software attached to the Keyence electron Microscope VHX-5000) capable of binarizing the cross-sectional image, the island portion and the sea portion of the sea-island structure were binarized for the cross-sectional image. For example, in the case of using the image analysis software attached to the Keyence electron Microscope VHX-5000 as the image processing software, specifically, the measurement is started under the condition of the luminance (standard) of the image analysis software, the extraction region (measurement range) is set to a rectangular shape (length: 7 μm, width: 13 μm), the imaging size is set to standard (1600×1200), the inclination angle is set to 0 degree, the imaging mode is set to normal imaging, and the extraction target is set to a "dark region". Furthermore, the extraction missing part and the extra extraction part are corrected by automatic measurement, and the total area and the total number of extracted parts (island parts) are measured. At this time, the area and the number of all the island portions existing in the extraction region are each measured. Using the acquired data, the ratio of the total area of all the island portions to the area of the measurement range of the cross-sectional image (total area of island portions/area of measurement range of cross-sectional image), and among all island portions, the ratio of the total number of island portions having an area of 0.01 $\mu m^2$ or less (total number of island portions of 0.01 $\mu m^2$ or less/total number of all island portions), the ratio of the total number of island portions having an area of 0.02 $\mu m^2$ or less (total number of island portions of 0.02 $\mu m^2$ or less/total number of all island portions), the ratio of the total number of island portions of 0.03 $\mu m^2$ or less (total number of island portions of 0.03 $\mu m^2$ or less/total number of all island portions), the ratio of the total number of island portions of 0.30 $\mu m^2$ or more (total number of island portions of 0.30 $\mu m^2$ or more/total number of all island portions), and the ratio of the total number of island portions of 0.15 $\mu m^2$ or more (the total number of island portions of 0.15 $\mu m^2$ or more/the total number of all island portions) are calculated.

In the Third Embodiment, examples of the polypropylene include homopolypropylene, block copolymers of polypropylene (for example, block copolymers of propylene and ethylene, block copolymers of propylene and butene, block copolymers of propylene, ethylene and butene, preferably block copolymers of propylene and ethylene.), random copolymers of polypropylene (for example, random copolymers of propylene and ethylene, random copolymers of propylene and butene, random copolymers of propylene, ethylene and butene, preferably random copolymers of propylene and ethylene.), and propylene-α-olefin copolymers. Furthermore, examples of the polyethylene include low-density polyethylene, medium-density polyethylene, high-density polyethylene, linear low-density polyethylene, and an ethylene-α-olefin copolymer. Each of the polypropylene and the polyethylene contained in the heat-sealable resin layer 4 may be one kind or two or more kinds.

The heat-sealable resin layer 4 of the Third Embodiment is preferably formed of a polypropylene resin composition containing 45 mass % or less of polyethylene. The content of polyethylene in the heat-sealable resin layer 4 is adjusted such that the ratio of the total number of island portions having an area of 0.02 $\mu m^2$ or less to the total number of island portions having a sea-island structure in the cross-sectional image is 80.0% or more. The content of the polyethylene is, for example, about 45 mass % or less, preferably about 30 mass % or less, more preferably about 20 mass % or less, and preferably about 5 mass % or more, more preferably about 10 mass % or more. Preferable ranges include about 5 to 45 mass %, about 5 to 30 mass %, about 5 to 20 mass %, about 10 to 45 mass %, about 10 to 30 mass %, and about 10 to 20 mass %. Furthermore, the content of polypropylene is, for example, 95 mass % or less or 90 mass % or less. The content of polypropylene is, for example, 55 mass % or more, 70 mass % or more, or 80 mass % or more. Preferable ranges of the content of the polypropylene include about 55 to 95 mass %, about 70 to 95 mass %, about 80 to 95 mass %, about 55 to 90 mass %, about 70 to 90 mass %, and about 80 to 90 mass %. Furthermore, the mass ratio of the polypropylene to the polyethylene in the polypropylene resin composition is preferably about 5 to 80 parts by mass, more preferably about 5 to 45 parts by mass, still more preferably about 10 to 30 parts by mass for 100 parts by mass of the polypropylene.

The heat-sealable resin layer 4 of the Third Embodiment may contain other resins in addition to polypropylene and polyethylene. Examples of the other resin include the acid-modified polyolefin described above.

In the Third Embodiment, the heat-sealable resin layer 4 may be formed of only one layer, or may be formed of two or more layers of the same or different resins.

Furthermore, a thickness of the heat-sealable resin layer 4 is not particularly limited as long as the heat-sealable resin layers are heat-sealed with each other to exhibit a function of sealing the electrical storage device element, and is, for example, about 100 μm or less, preferably about 85 μm or less, more preferably about 15 to 85 μm. Note that, for example, in a case where the thickness of the adhesive layer 5 to be described later is 10 μm or more, the thickness of the heat-sealable resin layer 4 is preferably about 85 μm or less, more preferably about 15 to 45 μm, and for example, in a case where the thickness of the adhesive layer 5 to be described later is less than 10 μm or in a case where the adhesive layer 5 is not provided, the thickness of the heat-sealable resin layer 4 is preferably about 20 μm or more, more preferably about 35 to 85 NM.

The heat-sealable resin layer 4 of the Third Embodiment is preferably formed by melt extrusion molding. When an adhesive layer 5 described later is provided, the adhesive layer 5 and the heat-sealable resin layer 4 are preferably formed by melt coextrusion molding. In the Third Embodiment of the present disclosure, it is preferable to suppress the crystal growth of polyethylene in polypropylene by setting the cooling condition of the molten resin forming the heat-sealable resin layer 4 to the rapid cooling condition, and thereby, in the cross-sectional image, the ratio of the total number of island portions having an area of 0.02 $\mu m^2$ or less to the total number of island portions having a sea-island structure can be adjusted to 80.0% or more. For example, as described above, when the heat-sealable resin layer 4 is formed by melt extrusion molding or the like while the blending ratio of polypropylene and polyethylene contained in the heat-sealable resin layer 4 is appropriately adjusted, the cooling condition of the molten resin (the molten resin that forms the heat-sealable resin layer) by the cooling roll (a roll that cools a sheet formed of a molten resin while conveying the sheet) is set to the rapid cooling condition (For example, the difference in surface temperature between the melt-extruded heat-sealable resin layer and the cooling roll is set to 70° C. or higher.) to suppress the crystal growth of polyethylene in polypropylene, so that the ratio of the total number of island portions having an area of 0.02 $\mu m^2$ or less to the total number of island portions having a sea-island structure in the cross-sectional image can be adjusted to 80.0% or more. Moreover, as described above, the type, content, and the like of at least one of the antioxidant and the radical scavenger contained in the heat-sealable resin layer 4 can also be used as one of means for adjusting the ratio of the total area of the island portions of each area. When the adhesive layer 5 and the heat-sealable resin layer 4 are formed by melt coextrusion molding, the thickness of the adhesive layer 5 is preferably 15 to 45 μm, and the thickness of the heat-sealable resin layer 4 is preferably 15 to 45 μm.

[Adhesive Layer 5]

In the exterior material for an electrical storage device of the present disclosure, the adhesive layer 5 included in the inner layer is a layer provided between the barrier layer 3 (or the corrosion-resistant film) and the heat-sealable resin layer 4 in order to firmly adhere the barrier layer 3 and the heat-sealable resin layer 4 to each other.

In the First Embodiment of the present disclosure, the adhesive layer 5 is formed of a resin capable of bonding the barrier layer 3 and the heat-sealable resin layer 4, and having an elongation rate at 80° C. of 8.0% or less when dynamic viscoelasticity measurement by tension is performed on the inner layer. As the resin used for forming the adhesive layer 5, a thermoplastic resin can be suitably used. The resin used for forming the adhesive layer 5 preferably contains a polyolefin backbone, and examples thereof include the polyolefins and acid-modified polyolefins exemplified for the heat-sealable resin layer 4 described above. On the other hand, from the viewpoint of firmly bonding the barrier layer 3 and the adhesive layer 5, the adhesive layer 5 preferably contains an acid-modified polyolefin. Examples of the acid-modifying component include dicarboxylic acids such as maleic acid, itaconic acid, succinic acid, and adipic acid, anhydrides thereof, acrylic acid, methacrylic acid, and the like, and maleic anhydride is most preferable from the viewpoint of ease of modification, general-purpose property, and the like. Furthermore, from the viewpoint of the heat resistance of the exterior material for an electrical storage device, the olefin component is preferably a polypropylene-based resin, and the adhesive layer 5 most preferably contains maleic anhydride-modified polypropylene.

In the present disclosure, the fact that the resin constituting the adhesive layer 5 contains a polyolefin backbone can be analyzed by, for example, infrared spectroscopy, gas chromatography mass spectrometry, or the like, and the analysis method is not particularly limited. Furthermore, the fact that the resin constituting the adhesive layer 5 contains an acid-modified polyolefin means that, for example, when a maleic anhydride-modified polyolefin is measured by infrared spectroscopy, peaks derived from maleic anhydride are detected in the vicinity of a wave number of 1760 $cm^{-1}$ and in the vicinity of a wave number of 1780 $cm^{-1}$. However, when the acid modification degree is low, the peak becomes small and may not be detected. In that case, it can be analyzed by nuclear magnetic resonance spectroscopy.

In the First Embodiment of the present disclosure, the thickness of the adhesive layer 5 is preferably about 60 μm or less, about 50 μm or less, or about 45 μm or less. Furthermore, the thickness of the adhesive layer 5 is preferably about 10 μm or more, about 20 μm or more, about 25 μm or more, or about 30 μm or more. Furthermore, a range of the thickness of the adhesive layer 5 is preferably about 10 to 60 μm, about 10 to 50 μm, about 10 to 45 μm, about 20 to 60 μm, about 20 to 50 μm, about 20 to 45 μm, about 25 to 60 μm, about 25 to 50 μm, about 25 to 45 μm, about 30 to 60 μm, about 30 to 50 μm, or about 30 to 45 μm. The adhesive layer 5 can be formed by, for example, extrusion molding of the heat-sealable resin layer 4 and the adhesive layer 5.

In the First Embodiment of the present disclosure, the ratio of the thickness of the heat-sealable resin layer to the thickness of the adhesive layer 5 (the thickness of the heat-sealable resin layer 4/the thickness of the adhesive layer 5) is preferably about 0.3 or more, and more preferably about 0.4 or more from the viewpoint of further improving the sealability of the exterior material for an electrical storage device in a high-temperature environment. Furthermore, from the same viewpoint, the thickness ratio is preferably about 2.0 or less, and more preferably about 1.5 or less. Preferable ranges of the thickness ratio are about 0.3 to 2.0, about 0.3 to 1.5, about 0.4 to 2.0, about 0.4 to 1.5, and about 1.2 to 1.4.

Furthermore, as described above, in the exterior material for an electrical storage device according to the First Embodiment of the present disclosure, as a preferable example of setting the elongation rate at 80° C. in the dynamic viscoelasticity measurement by pulling of the inner layer to 8.0% or less, crystallinity of the adhesive layer and the heat-sealable resin layer is enhanced, and it is desirable to control the initial cooling condition after post-heating to a very slow cooling condition to promote crystal growth of the resin of the adhesive layer and the heat-sealable resin layer. For example, by adopting such a method to form the heat-sealable resin layer, the crystallinity of the adhesive layer and the heat-sealable resin layer is enhanced, and the sealability in a high-temperature environment is improved.

Furthermore, in the Second Embodiment of the present disclosure, the adhesive layer 5 contains a polypropylene-based resin and polyethylene. In the exterior material for an electrical storage device of the Second Embodiment, a sea-island structure is observed in a cross-sectional image acquired using a scanning electron microscope for a cross section of the adhesive layer 5 in a direction parallel to the TD and in the thickness direction y. For example, as illustrated in the schematic diagram of FIG. 12, the cross-sectional image is a cross-sectional image acquired within a range (region surrounded by a broken line in FIG. 12) from the surface of the adhesive layer 5 on the barrier layer 3 side to a portion having a thickness of 25% when the total thickness of the adhesive layer 5 is 100%. The surface of the adhesive layer 5 on a side of the barrier layer 3 has a thickness of 0%. Describing with a specific example, for example, as in Examples 1B to 3B described later, in the case of an exterior material for an electrical storage device in which a base material layer (thickness of 30 μm including an adhesive)/an adhesive agent layer (3 μm)/a barrier layer (40 μm)/an adhesive layer (40 μm)/a heat-sealable resin layer (40 μm) are laminated in this order, the thickness of the adhesive layer 5 of 40 μm is 100%. Furthermore, the position of the surface of the adhesive layer 5 on the side of the barrier layer 3 is, that is, the position of the interface at which the barrier layer 3 and the adhesive layer 5 are in contact with each other in FIG. 12, and the thickness at this position is set to 0%. Then, a cross-sectional image is acquired using a scanning electron microscope within a range from the surface (thickness 0%) to a position of thickness 25% (That is, assuming that the thickness of the adhesive layer 5 is 40 μm as 100%, the position of the thickness of 25% is a position where the thickness is 10 μm from the surface of the adhesive layer 5 on the side of the barrier layer 3 toward the side of the heat-sealable resin layer 4.).

The fact that the sea-island structure is observed in the cross-sectional image means that a sea portion (sea portion) and an island portion (island portion) are observed in the cross-sectional image. As described above, when a small amount of polyethylene is added to the polypropylene-based resin and the adhesive layer is formed by melt extrusion molding, a sea-island structure in which an island portion of polyethylene is dispersed in a sea portion of the polypropylene-based resin is formed. That is, the island portion contains polyethylene. Note that, in order to observe the sea-island structure, as described later, the cross section of the adhesive layer 5 is dyed with ruthenium tetroxide or the like, and a cross-sectional image is acquired and observed using a scanning electron microscope.

In the cross-sectional image of the adhesive layer 5 of the exterior material for an electrical storage device of the Second Embodiment, a ratio of a total number of island portions having an area of less than 0.25 $\mu m^2$ to a total number of island portions of the sea-island structure is 40% or more. Since the exterior material for an electrical storage device of the Second Embodiment has such a characteristic, the sealability of the exterior material for an electrical storage device in a high-temperature environment is improved. That is, in the exterior material for an electrical storage device according to the Second Embodiment of the present disclosure, in the adhesive layer 5 containing a polypropylene-based resin and polyethylene, the ratio of the total number of fine island portions having an area of less than 0.25 $\mu m^2$ to the total number of all island portions is set high, so that fine islands of a polyethylene portion are dispersed in the sea of the polypropylene-based resin of the adhesive layer 5, and separation of the polypropylene-based resin and the polyethylene is suppressed. As a result, it can be considered that the sealability is maintained even when the electrical storage device is placed in a high-temperature environment, the internal pressure increases, and a large stress is applied to the exterior material for an electrical storage device.

From the viewpoint of more suitably achieving the effect of the invention of the Second Embodiment, in the cross-sectional image of the adhesive layer 5, the ratio of the total number of island portions having an area of less than 0.25 $\mu m^2$ to the total number of island portions having a sea-island structure (the total number of island portions having an area of less than 0.25 $\mu m^2$/the total number of all island portions) is preferably about 41% or more, more preferably about 50% or more, still more preferably about 55% or more, still more preferably about 65% or more, still more preferably about 75% or more. Note that the ratio of the total number is, for example, about 100% or less, about 99% or less, about 98% or less, about 90% or less, about 85% or less, or the like. Preferable ranges of the ratio of the total number include, for example, about 40 to 100%, about 40 to 99%, about 40 to 98%, about 40 to 90%, about 40 to 85%, about 41 to 100%, about 41 to 99%, about 41 to 98%, about 41 to 90%, about 41 to 85%, about 50 to 100%, about 50 to 99%, about 50 to 98%, about 50 to 90%, about 50 to 85%, about 55 to 100%, about 55 to 99%, about 55 to 98%, about 55 to 90%, about 55 to 85%, about 65 to 100%, about 65 to 99%, about 65 to 98%, about 65 to 90%, about 65 to 85%, about 75 to 100%, about 75 to 99%, about 75 to 98%, about 75 to 90%, and about 75 to 85%.

Furthermore, from the viewpoint of more suitably achieving the effect of the invention of the Second Embodiment, in the cross-sectional image of the adhesive layer 5, the ratio of the total number of island portions having an area of less than 0.15 $\mu m^2$ to the total number of island portions of the sea-island structure (the total number of island portions having an area of less than 0.15 $\mu m^2$/the total number of all island portions) is preferably about 10% or more, more preferably about 20% or more, still more preferably about 25% or more, still more preferably about 30% or more, still more preferably about 40% or more, still more preferably about 50% or more, still more preferably about 60% or more. Note that the ratio of the total number is, for example, about 85% or less, about 80% or less, or the like. Preferable ranges of the ratio of the total number include, for example, about 10 to 85%, about 10 to 80%, about 20 to 85%, about 20 to 80%, about 25 to 85%, about 25 to 80%, about 30 to 85%, about 30 to 80%, about 40 to 85%, about 40 to 80%, about 50 to 85%, about 50 to 80%, about 60 to 85%, and about 60 to 80%.

Furthermore, from the viewpoint of more suitably achieving the effect of the invention of the Second Embodiment, in the cross-sectional image of the adhesive layer 5, the ratio of the total number of island portions having an area of less than 0.10 $\mu m^2$ to the total number of island portions of the sea-island structure (the total number of island portions having an area of less than 0.10 $\mu m^2$/the total number of all island portions) is preferably about 10% or more, more preferably about 15% or more, still more preferably about 20% or more, still more preferably about 30% or more, still more preferably about 40% or more, still more preferably about 50% or more. Note that the ratio of the total number is, for example, about 80% or less, about 75% or less, or the like. Preferable ranges of the ratio of the total number include, for example, about 10 to 60%, about 10 to 50%, about 15 to 60%, about 15 to 50%, about 20 to 60%, about 20 to 50%, about 30 to 60%, and about 30 to 50%.

Furthermore, from the viewpoint of more suitably achieving the effect of the invention of the Second Embodiment, in the cross-sectional image of the adhesive layer 5, the ratio of the total number of island portions having an area of 1.50 $\mu m^2$ or more to the total number of island portions having a sea-island structure (the total number of island portions having an area of 1.50 $\mu m^2$ or more/the total number of all island portions) is preferably about 10% or less, more preferably about 9% or less, still more preferably about 8% or less, further still more preferably about 5% or less. Note that the ratio of the total number is, for example, about 0% or more, about 1% or more, or the like. Preferable ranges of the ratio of the total number include, for example, about 0 to 10%, about 0 to 9%, about 0 to 8%, about 0 to 5%, about 1 to 10%, about 1 to 9%, about 1 to 8%, and about 1 to 5%.

The ratio of the total number of the island portions in each area described above can be set to the above value by further adjusting the conditions for forming the adhesive layer 5 in addition to the blending ratio of the polypropylene-based resin and polyethylene contained in the adhesive layer 5. For example, as described later, by setting a temperature at which pellets in which polyethylene is highly uniformly dispersed in a polypropylene-based resin are formed into a film by melt extrusion molding (a temperature at which pellets are melt-kneaded and melted by a twin-screw extruder) as a low temperature condition and shortening a time (retention time) from melting of a resin to forming into a film, aggregation of polyethylene in the polypropylene-based resin is suppressed, and generation of an island portion of 0.25 μm) or more is suppressed. Furthermore, the ratio of the total number of the island portions in each area described above can also be adjusted by including at least one selected from the group consisting of an antioxidant and a radical scavenger in the adhesive layer 5. Moreover, the content of the antioxidant or the radical scavenger can be adjusted to the above value by appropriately adjusting the type or content of the antioxidant or the radical scavenger.

A method of measuring the total number of island portions of each area in the sea-island structure for the cross-sectional image of the adhesive layer 5 is as follows.

<Measurement of Ratio of Area and Number of Island Portions in Sea-Island Structure>

An exterior material for an electrical storage device is embedded in a thermosetting epoxy resin and cured. Using a commercially available rotary microtome (for example, EM UC6 manufactured by LEICA) and a glass knife, a cross section in a direction parallel to the TD and in the thickness direction y is prepared, and at that time, the cross section is prepared with a room-temperature microtome. The adhesive layer of the exterior material for an electrical storage device together with the embedded resin is dyed with ruthenium tetroxide for 3 hours. When the resin is dyed, the resin expands, and the sea-island structure cannot be confirmed near the cross section. Therefore, the expanded portion is trimmed with the microtome. Then, a stained section having a thickness of about 100 nm collected from the cross section after being cut from about 1 μm to 2 μm using a diamond knife is observed as follows. Cross-sectional images of the stained sections are acquired using a field emission scanning electron microscope (for example, S-4800 manufactured by Hitachi High-Technologies Corporation). As described above, the cross-sectional image is a cross-sectional image acquired within a range from the surface of the adhesive layer on the barrier layer side to a portion having a thickness of 25% when the total thickness of the adhesive layer is 100%. When, for example, S-4800 manufactured by Hitachi High-Technologies Corporation is used as the field emission type scanning electron microscope, measurement conditions are as follows: acceleration voltage: 30 kV, emission current: 10 ρA, detector: transmission detector, inclination: none (0°), observation magnification: 5,000 times. Next, using image processing software (for example, image analysis software attached to the Keyence electron Microscope VHX-5000) capable of binarizing the cross-sectional image, the island portion and the sea portion of the sea-island structure are binarized for the cross-sectional image. For example, in the case of using the image analysis software attached to the Keyence electron Microscope VHX-5000 as the image processing software, specifically, the measurement is started under the condition of the luminance (standard) of the image analysis software, the extraction region (measurement range) is set to a rectangular shape (length: 7 μm, width: 13 μm), the imaging size is set to standard (1600×1200), the inclination angle is set to 0 degree, the imaging mode is set to normal imaging, and the extraction target is set to a "dark region". Furthermore, the extraction missing part and the extra extraction part are corrected by automatic measurement, and the total area and the total number of extracted parts (island parts) are measured. At this time, the area and the number of all the island portions existing in the extraction region are each measured. Using the acquired data, the relationship (for example, the above (total number of island portions of less than 0.25 $\mu m^2$/total number of all island portions), (total number of island portions of less than 0.20 $\mu m^2$/total number of all island portions), (total number of island portions of less than 0.10 $\mu m^2$/total number of all island portions), and the like) between the area ($\mu m^2$) of the island portions and the ratio (%) of the number of the island portions to the total number of all the island portions is obtained.

In the Second Embodiment, the polypropylene-based resin is preferably acid-modified polypropylene because it is excellent in adhesion to the barrier layer 3 and the heat-sealable resin layer. The acid-modified polypropylene is a polymer obtained by modifying polypropylene by block polymerization or graft polymerization with an acid component.

In the Second Embodiment, the acid-modified polypropylene is specifically polypropylene such as homopolypropylene, a block copolymer of polypropylene (for example, a block copolymer of propylene and ethylene), and a random copolymer of polypropylene (for example, a random copolymer of propylene and ethylene).; propylene-α-olefin copolymer; terpolymers of ethylene-butene-propylene. The polyolefin resin in the case of a copolymer may be a block copolymer or a random copolymer. These polyolefin-based resins may be used alone or in combination of two or more thereof.

Furthermore, in the Second Embodiment, as the acid-modified polypropylene, a copolymer obtained by copolymerizing a polar molecule such as acrylic acid or methacrylic acid with the polypropylene, a polymer such as crosslinked polypropylene, or the like can also be used. Furthermore, examples of the acid component used for the acid modification include carboxylic acids such as maleic acid, acrylic acid, itaconic acid, crotonic acid, maleic anhydride, and itaconic anhydride, and anhydrides thereof.

In the Second Embodiment, the acid-modified polypropylene may be an acid-modified cyclic polypropylene. The acid-modified cyclic polypropylene is a polymer obtained by copolymerizing a part of monomers constituting the cyclic polypropylene in place of an acid component, or by block-polymerizing or graft-polymerizing an acid component with respect to the cyclic polypropylene. The cyclic polyolefin to be acid-modified is the same as described above. Furthermore, the acid component used for the acid modification is the same as the acid component used for the modification of polypropylene described above.

In the Second Embodiment, examples of the acid-modified polypropylene preferably include polypropylene modified with a carboxylic acid or an anhydride thereof, and more preferably include maleic anhydride-modified polypropylene.

Furthermore, in the Second Embodiment, examples of the polyethylene include low-density polyethylene, medium-density polyethylene, high-density polyethylene, linear low-density polyethylene, and an ethylene-α-olefin copolymer.

In the Second Embodiment, the adhesive layer 5 is preferably formed of a polypropylene-based resin composition containing a polypropylene-based resin and 45 mass % or less of polyethylene. Preferred polypropylene-based resins are as described above. The content of polyethylene in the adhesive layer 5 is adjusted such that a ratio of the total number of island portions having an area of less than 0.25 $\mu m^2$ among the island portions to the total number of island portions of the sea-island structure is 40% or more in the cross-sectional image. The content of polyethylene in the resin composition for forming the adhesive layer is, for example, about 45 mass % or less, preferably about 30 mass % or less, and preferably about 5 mass % or more, more preferably about 10 mass % or more, still more preferably about 15 mass % or more, and still more preferably 20 mass % or more. Preferable ranges include about 5 to 45 mass %, about 5 to 30 mass %, about 10 to 45 mass %, about 10 to 30 mass %, about 15 to 45 mass %, about 15 to 30 mass %, about 20 to 45 mass %, and about 20 to 30 mass %. Furthermore, the content of the polypropylene-based resin is, for example, 95 mass % or less, 90 mass % or less, 85 mass % or less, or 80 mass % or less. The content of the polypropylene-based resin is, for example, 55 mass % or more or 70 mass % or more. Preferable ranges of the content of the polypropylene resin include about 55 to 95 mass %, about 55 to 90 mass %, about 55 to 85 mass %, about 55 to 80 mass %, about 70 to 95 mass %, about 70 to 90 mass %, about 70 to 85 mass %, and about 70 to 80 mass %. Furthermore, as the mass ratio of the polypropylene-based resin and the polyethylene in the polypropylene-based resin composition that forms the adhesive layer 5, the polyethylene is preferably about 5 to 80 parts by mass, more preferably about 5 to 45 parts by mass, further preferably about 10 to 30 parts by mass based on 100 parts by mass of the polypropylene-based resin.

In the Second Embodiment, the adhesive layer 5 may contain another resin in addition to the polypropylene-based resin and polyethylene. However, the total ratio of the polypropylene-based resin and the polyethylene in the resin contained in the adhesive layer 5 is preferably 80 mass % or more, more preferably 85 mass % or more, still more preferably 90 mass % or more, and still more preferably 95 mass % or more. In particular, the total ratio of acid-modified polypropylene and polyethylene in the resin contained in the adhesive layer 5 is preferably 80 mass % or more, more preferably 85 mass % or more, still more preferably 90 mass % or more, and still more preferably 95 mass % or more.

In the Second Embodiment, the adhesive layer 5 is usually provided so as to be in contact with the barrier layer 3 (or the corrosion-resistant coating), and is a single layer.

In the Second Embodiment, the thickness of the adhesive layer 5 is preferably about 80 μm or less, about 60 μm or less, or about 50 μm or less. Furthermore, the thickness of the adhesive laver 5 is preferably about 5 μm or more, about 10 μm or more, about 20 μm or more, or about 30 μm or more. The range of the thickness is preferably about 5 to 80 μm, about 5 to 60 μm, about 5 to 50 μm, about 10 to 80 μm, about 10 to 60 μm, about 10 to 50 μm, about 20 to 80 μm, about 20 to 60 μm, about 20 to 50 μm, about 30 to 80 μm, about 30 to 60 μm, about 30 to 50 μm, or the like.

(Antioxidant and Radical Scavenger)

In the exterior material 10 for an electrical storage device of the Second Embodiment, it is preferable that at least one selected from the group consisting of an antioxidant and a radical scavenger is contained in at least one layer among the layers on the inner side of the barrier layer 3 from the viewpoint of further enhancing the sealability in a high-temperature environment. Examples of the layer inside the barrier layer 3 (Hereinafter, it may be referred to as an "inner layer".) include the heat-sealable resin layer 4 and the adhesive layer 5. At least one selected from the group consisting of an antioxidant and a radical scavenger is preferably contained in at least one of the heat-sealable resin layer 4 and the adhesive layer 5. That is, at least one selected from the group consisting of an antioxidant and a radical scavenger may be contained in both the heat-sealable resin layer 4 and the adhesive layer 5, may be contained only in the heat-sealable resin layer 4, or may be contained only in the adhesive layer 5. In the Second Embodiment, an antioxidant may be blended in order to suppress oxidation of the layer in a high temperature environment at the time of forming the inner layer. Furthermore, in the Second Embodiment, a radical scavenger may be blended in order to scavenge radicals generated in the layer in a high temperature environment when the inner layer is formed.

In the Second Embodiment, the antioxidant is not particularly limited as long as the effect of the Second Embodiment is not impaired. Specific examples of the antioxidant include phosphorus-based antioxidants such as tris (2,4-di-t-butylphenoxy) phosphine, 2,2-methylenebis (4,6-di-t-butylphenyl)-2-ethylhexyl phosphite, 4,4'-butylidene-bis (3-methyl-6-t-butylphenylditridecyl) phosphite, 6-[3-(3-t-butyl-4-hydroxy-5-methylphenyl) propoxy]-2,4,8,10-tetra-t-butyldibenz[d,f][1,3,2]dioxaphosphepine), tetrakis (2,4-di-t-butylphenyl)-4,4'-bisphenyldiphosphonite, bis (2,4-dicumylphenyl) pentaerythritol diphosphite, bis (2,6-di-t-butyl-4-methylphenyl) pentaerythritol diphosphite, phenol-based antioxidants such as tetrakis (methylene-3-(3,5-di-t-butyl-4-hydroxyphenyl) propionate) methane, 1,3,5-tris [[3,5-bis (1,1-dimethylethyl)-4-hydroxyphenyl]methyl]-1,3,5-triazine-2,4,6 (1H,3H,5H)-trione, octadecyl-3-(3,5-di-t-butyl-4-hydroxyphenyl) propionate, 3,9-bis (2-(3-(3-t-butyl-4-hydroxy-5-methylphenyl) propionyloxy)-1,1-dimethylethyl)-2,4,8,10-tetraoxaspiro (5,5) undecane, sulfur-based antioxidants such as tetrakis [methylene-3-(laurylthio) propionate]methane, dilauryl-3,3'-thiodipropionate, dimyristyl-3,3'-thiodipropionate and distearyl-3,3'-thiodipropionate. The antioxidant contained in the layer inside the barrier layer 3 may be one kind or two or more kinds.

In the Second Embodiment, as the phosphorus-based antioxidant, a compound represented by the following general formula (A) is preferably exemplified.

[Chemical Formula 5]

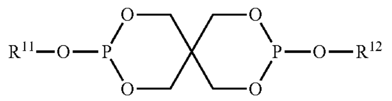

(A)

The inclusion of the compound represented by the general formula (A) in the inner layer can be confirmed using various analysis methods such as NMR In the general formula (A), $R^{11}$ and $R^{12}$ are each independently an alkyl group having 1 to 18 carbon atoms or a phenyl group optionally having a substituent. Among these, $R^{11}$ and $R^{12}$ are each independently preferably a phenyl group optionally having a substituent. The compound represented by the general formula (A) contained in the inner layer may be one kind or two or more kinds.

In the general formula (A), it is preferable that the phenyl groups of $R^{11}$ and $R^{12}$ each independently have, as a substituent, at least one kind of group selected from the group consisting of an alkyl group having 1 to 9 carbon atoms, a cycloalkyl group having 5 to 8 carbon atoms, an alkylcycloalkyl group having 6 to 12 carbon atoms, and an aralkyl group having 7 to 12 carbon atoms. Among these groups, the phenyl group preferably has at least one of an alkyl group having 1 to 9 carbon atoms and an aralkyl group having 7 to 12 carbon atoms as a substituent. Moreover, the number of substituents of the phenyl group in each of $R^{11}$ and $R^{12}$ may be 1 to 5, but is preferably 2 to 3.

Preferred specific examples of the compound represented by the general formula (A) include a compound represented by the following formula (A1) (bis (2,4-dicumylphenyl) pentaerythritol diphosphite) and a compound represented by the following formula (A2) (bis (2,6-di-t-butyl-4-methylphenyl) pentaerythritol diphosphite).

[Chemical Formula 6]

(A1)

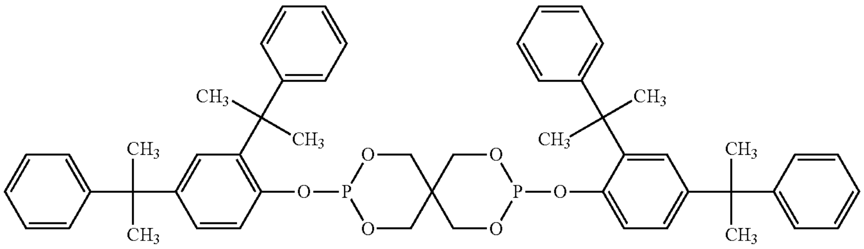

(A2)

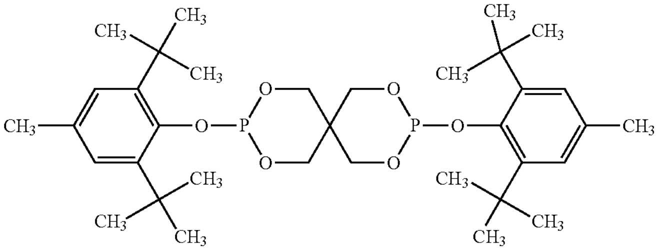

In the Second Embodiment, the inner layer particularly preferably contains the compound represented by the formula (A1) as the compound represented by the general formula (A).

As described above, in the Second Embodiment, each of the heat-sealable resin layer 4 and the adhesive layer 5 may be a single layer or a multiple layer. When the heat-sealable resin layer 4 and the adhesive layer 5 each have multiple layers, at least one of the layers may contain a compound represented by the general formula (A). For example, the compound represented by the general formula (A) may be contained in both the heat-sealable resin layer 4 and the adhesive layer 5, may be contained only in the heat-sealable resin layer 4, or may be contained only in the adhesive layer 5. Since at least one of the layers constituting the inner layer contains the compound represented by the general formula (A), the resin for forming the layer is heated to a higher temperature (for example, 300° C. or higher) than before to form a layer, so that the lead time can be shortened. Furthermore, deterioration of the layer due to high temperature is suppressed, and high insulation quality can be exhibited.

In the electrical storage device, since the inner layer is in contact with the electrolytic solution, there is a concern about an adverse effect due to elution of the antioxidant contained in the inner layer into the electrolytic solution, but the compound represented by formula (A1) has low solubility in the electrolytic solution solvent, and an effect of having a small adverse effect on the characteristics of the electrical storage device is also expected even when the added amount is large for improving the insulation quality. Note that, examples of the solvent of the electrolytic solution of the electrical storage device include cyclic carbonates such as ethylene carbonate (EC), propylene carbonate (PC), butylene carbonate (BC), and vinylene carbonate (VC); chain carbonates such as dimethyl carbonate (DMC), diethyl carbonate (DEC), ethyl methyl carbonate (EMC), and dipropyl carbonate (DPC); aliphatic carboxylic acid esters such as methyl formate, methyl acetate, methyl propionate, and ethyl propionate; γ-lactones such as γ-butyrolactone; chain ethers such as 1,2-dimethoxyethane (DME), 1,2-diethoxyethane (DEE), and ethoxymethoxyethane (EME); cyclic ethers such as tetrahydrofuran and 2-methyltetrahydrofuran; dimethylsulfoxide, formamide, acetamide, dimethylformamide, dimethylacetamide, dioxolane, acetonitrile, trimethoxymethane, and dioxolane derivatives, sulfolane, methylsulfolane, propylene carbonate derivatives, tetrahydrofuran derivatives, dimethyl sulfoxide, and the like can be mentioned. These are used singly or in combination of two or more kinds thereof. Among them, at least one of cyclic carbonates, chain carbonates, and aliphatic carboxylic acid esters is preferably used, and in particular, a mixed system of cyclic carbonates and chain carbonates, or a mixed system of cyclic carbonates, chain carbonates, and aliphatic carboxylic acid esters is preferably used.

In the inner layer, the content of the antioxidant in the layer containing the antioxidant is not particularly limited as long as the effect of the Second Embodiment is exhibited, but is preferably about 0.01 mass % or more, more preferably about 0.03 mass % or more, and still more preferably about 0.05 mass % or more. Furthermore, the content is preferably about 2% by mass or less, more preferably about 1% by mass or less, and still more preferably about 0.5% by mass or less. Preferable ranges of the content include about 0.01 to 2 mass %, about 0.01 to 1 mass %, about 0.01 to 0.5 mass %, about 0.03 to 2 mass %, about 0.03 to 1 mass %, and about 0.03 to 0.5 mass %.

Furthermore, in the Second Embodiment, the inner layer may contain a radical scavenger. The radical scavenger is not particularly limited, and examples thereof include an alkyl radical scavenger, an alkoxy radical scavenger, and a peroxy radical scavenger. Examples of the alkyl radical scavenger include a compound having an acrylate group and a phenolic hydroxyl group in the same molecule, and specific examples thereof include 1'-hydroxy [2,2'-ethylidenebis [4,6-bis (1,1-dimethylpropyl) benzene]]-1-yl acrylate, 2-t-butyl-4-methyl-6-(2-hydroxy-3-t-butyl-5-methylbenzyl) phenyl acrylate, and the like. When the radical scavenger is contained in the inner layer, the radical scavenger may be one kind or two or more kinds.

When the radical scavenger is contained in the inner layer, the content of the radical scavenger in the layer containing the radical scavenger in the inner layer is not particularly limited as long as the effect of the Second Embodiment described above is exhibited, but is preferably about 0.01 mass % or more, and more preferably about 0.03 mass % or more from the viewpoint of more suitably exhibiting the effect of the Second Embodiment. Furthermore, the content is preferably about 0.5 mass % or less, more preferably about 0.3 mass % or less, and still more preferably about 0.2 mass % or less. Preferable ranges of the content include about 0.01 to 0.5 mass %, about 0.01 to 0.3 mass %, about 0.01 to 0.2 mass %, about 0.03 to 0.5 mass %, about 0.03 to 0.3 mass %, and about 0.03 to 0.2 mass %.

In the Third Embodiment, the adhesive layer 5 is formed of a resin capable of bonding the barrier layer 3 and the heat-sealable resin layer 4. As the resin used for forming the adhesive layer 5, for example, the same resin as the adhesive exemplified for the adhesive agent layer 2 can be used. Note that the resin used for forming the adhesive layer 5 preferably contains a polyolefin backbone, and examples thereof include the polyolefins and acid-modified polyolefins exemplified for the heat-sealable resin layer 4 described above. Whether the resin constituting the adhesive layer 5 contains a polyolefin backbone can be analyzed by, for example, infrared spectroscopy, gas chromatography mass spectrometry, or the like, and the analysis method is not particularly limited. Furthermore, when the resin constituting the adhesive layer 5 is analyzed by infrared spectroscopy, a peak derived from maleic anhydride is preferably detected. For example, when maleic anhydride-modified polyolefin is measured by infrared spectroscopy, peaks derived from maleic anhydride are detected in the vicinity of a wave number of 1760 $cm^{-1}$ and in the vicinity of a wave number of 1780 $cm^{-1}$. However, when the acid modification degree is low, the peak becomes small and may not be detected. In that case, it can be analyzed by nuclear magnetic resonance spectroscopy.

In the Third Embodiment, from the viewpoint of firmly bonding the barrier layer 3 and the heat-sealable resin layer 4, the adhesive layer 5 preferably contains an acid-modified polyolefin. As the acid-modified polyolefin, a polyolefin modified with a carboxylic acid or an anhydride thereof, a polypropylene modified with a carboxylic acid or an anhydride thereof, a maleic anhydride-modified polyolefin, and a maleic anhydride-modified polypropylene are particularly preferable.

Moreover, in the Third Embodiment, the adhesive layer 5 is more preferably a cured product of a resin composition containing an acid-modified polyolefin and a curing agent from the viewpoint of reducing the thickness of the exterior material for an electrical storage device and obtaining an exterior material for an electrical storage device excellent in shape stability after molding. Preferable examples of the acid-modified polyolefin include those described above.

In the Third Embodiment, the adhesive layer 5 is preferably a cured product of a resin composition containing an acid-modified polyolefin and at least one selected from the group consisting of a compound having an isocyanate group, a compound having an oxazoline group, and a compound having an epoxy group, and particularly preferably a cured product of a resin composition containing an acid-modified polyolefin and at least one selected from the group consisting of a compound having an isocyanate group and a compound having an epoxy group. Furthermore, the adhesive layer 5 preferably contains at least one selected from the group consisting of polyurethane, polyester, and epoxy resin, and more preferably contains polyurethane and epoxy resin. As the polyester, for example, an amide ester resin is preferable. The amide ester resin is generally produced by a reaction between a carboxyl group and an oxazoline group. The adhesive layer 5 is more preferably a cured product of a resin composition containing at least one of these resins and the acid-modified polyolefin. When an unreacted substance of a curing agent such as a compound having an isocyanate group, a compound having an oxazoline group, or an epoxy resin remains in the adhesive layer 5, the presence of the unreacted substance can be confirmed by a method selected from infrared spectroscopy, Raman spectroscopy, time-of-flight secondary ion mass spectrometry (TOF-SIMS), and the like.

Furthermore, in the Third Embodiment, from the viewpoint of further enhancing the adhesion between the barrier layer 3 and the adhesive layer 5, the adhesive layer 5 is preferably a cured product of a resin composition containing a curing agent having at least one selected from the group consisting of an oxygen atom, a heterocyclic ring, a C═N bond, and a C—O—C bond. Examples of the curing agent having a heterocyclic ring include a curing agent having an oxazoline group and a curing agent having an epoxy group. Furthermore, examples of the curing agent having a C═N bond include a curing agent having an oxazoline group and a curing agent having an isocyanate group. Examples of the curing agent having a C—O—C bond include a curing agent having an oxazoline group, a curing agent having an epoxy group, and polyurethane. Whether the adhesive layer 5 is a cured product of a resin composition containing these curing agents can be confirmed by, for example, a method such as gas chromatography-mass spectrometry (GCMS), infrared spectroscopy (IR), time-of-flight secondary ion mass spectrometry (TOF-SIMS), or X-ray photoelectron spectroscopy (XPS).

In the Third Embodiment, the compound having an isocyanate group is not particularly limited, but a polyfunctional isocyanate compound is preferable from the viewpoint of effectively enhancing the adhesion between the barrier layer 3 and the adhesive layer 5. The polyfunctional isocyanate compound is not particularly limited as long as it is a compound having two or more isocyanate groups. Specific examples of the polyfunctional isocyanate-based curing agent include pentane diisocyanate (PDI), isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymers thereof with other polymers. Examples thereof include an adduct form, a biuret form, and an isocyanurate form.

In the Third Embodiment, the content of the compound having an isocyanate group in the adhesive layer 5 is preferably in the range of 0.1 to 50 mass %, and more preferably in the range of 0.5 to 40 mass % in the resin composition constituting the adhesive layer 5. Accordingly, adhesion between the barrier layer 3 and the adhesive layer 5 can be effectively enhanced.

In the Third Embodiment, the compound having an oxazoline group is not particularly limited as long as it is a compound having an oxazoline skeleton. Specific examples of the compound having an oxazoline group include compounds having a polystyrene main chain and compounds having an acrylic main chain. Examples of the commercially available product include EPOCROS series manufactured by Nippon Shokubai Co., Ltd.

In the Third Embodiment, the ratio of the compound having an oxazoline group in the adhesive layer 5 is preferably in the range of 0.1 to 50 mass %, and more preferably in the range of 0.5 to 40 mass % in the resin composition constituting the adhesive layer 5. Accordingly, adhesion between the barrier layer 3 and the adhesive layer 5 can be effectively enhanced.

In the Third Embodiment, examples of the compound having an epoxy group include an epoxy resin. The epoxy resin is not particularly limited as long as it is a resin capable of forming a crosslinked structure by an epoxy group present in the molecule, and a known epoxy resin can be used. The weight average molecular weight of the epoxy resin is preferably about 50 to 2,000, more preferably about 100 to 1,000, and still more preferably about 200 to 800. In the first disclosure, the weight average molecular weight of the epoxy resin is a value measured by gel permeation chromatography (GPC) under the condition of using polystyrene as a standard sample.

In the Third Embodiment, specific examples of the epoxy resin include glycidyl ether derivatives of trimethylolpropane, bisphenol A diglycidyl ether, modified bisphenol A diglycidyl ether, novolac glycidyl ether, glycerin polyglycidyl ether, and polyglycerin polyglycidyl ether. The epoxy resins may be used alone, or may be used in combination of two or more thereof.

In the Third Embodiment, the ratio of the epoxy resin in the adhesive layer 5 is preferably in the range of 0.1 to 50 mass %, more preferably in the range of 0.5 to 40 mass % in the resin composition constituting the adhesive layer 5. Accordingly, adhesion between the barrier layer 3 and the adhesive layer 5 can be effectively enhanced.

In the Third Embodiment, the polyurethane is not particularly limited, and a known polyurethane can be used. The adhesive layer 5 may be, for example, a cured product of two-liquid curable polyurethane.

In the Third Embodiment, the ratio of polyurethane in the adhesive layer 5 is preferably in the range of 0.1 to 50 mass %, more preferably in the range of 0.5 to 40 mass % in the resin composition constituting the adhesive layer 5. As a result, adhesion between the barrier layer 3 and the adhesive layer 5 in an atmosphere in which a component that induces corrosion of the barrier layer such as an electrolytic solution is present can be effectively enhanced.

In the Third Embodiment, when the adhesive layer 5 is a cured product of a resin composition containing at least one selected from the group consisting of a compound having an isocyanate group, a compound having an oxazoline group, and an epoxy resin, and the acid-modified polyolefin, the acid-modified polyolefin functions as a main component, and the compound having an isocyanate group, the compound having an oxazoline group, and the compound having an epoxy group each function as a curing agent.

In the Third Embodiment, the thickness of the adhesive layer 5 is preferably about 50 μm or less, about 45 μm or less, about 30 μm or less, about 20 μm or less, or about 5 μm or less. Furthermore, the thickness of the adhesive layer 5 is preferably about 0.1 μm or more, about 0.5 μm or more, about 5 μm or more, about 10 μm or more, or about 15 μm or more. The range of the thickness is preferably about 0.1 to 50 μm, about 0.1 to 45 μm, about 0.1 to 30 μm, about 0.1 to 20 μm, about 0.1 to 5 μm, about 0.5 to 50 μm, about 0.5 to 45 μm, about 0.5 to 30 μm, about 0.5 to 20 μm, about 0.5 to 5 μm, about 5 to 50 μm, about 5 to 45 μm, about 5 to 30 μm, about 5 to 20 μm, about 10 to 50 μm, about 10 to 45 μm, about 10 to 30 μm, about 10 to 20 μm, about 15 to 50 μm, about 15 to 45 μm, about 15 to 30 μm, or about 15 to 20 μm.

More specifically, in the Third Embodiment, the thickness is preferably about 1 to 10 μm, more preferably about 1 to 5 μm particularly in the case of the adhesive exemplified for the adhesive agent layer 2 or a cured product of an acid-modified polyolefin and a curing agent. In particular, when the resin (acid-modified polyolefin or the like) exemplified for the heat-sealable resin layer 4 is used, the thickness is preferably about 5 to 50 μm, about 5 to 45 μm, about 10 to 50 μm, about 10 to 45 μm, about 15 to 50 μm, or about 15 to 45 μm. When the adhesive layer 5 is the adhesive exemplified for the adhesive agent layer 2 or a cured product of a resin composition containing an acid-modified polyolefin and a curing agent, for example, the adhesive layer 5 can be formed by applying the resin composition and curing the resin composition by heating or the like. Furthermore, when the resin exemplified for the heat-sealable resin layer 4 is used, for example, the resin can be suitably formed by melt co-extrusion molding of the heat-sealable resin layer 4 and the adhesive layer 5.

(Antioxidant and Radical Scavenger)

In the exterior material 10 for an electrical storage device of the Third Embodiment, at least one of an antioxidant and a radical scavenger is contained in at least one of the layers on the inner side of the barrier layer 3. Examples of the layer inside the barrier layer 3 (Hereinafter, it may be referred to as an "inner layer".) include the heat-sealable resin layer 4 and the adhesive layer 5. At least one of the antioxidant and the radical scavenger is preferably contained in at least one of the heat-sealable resin layer 4 and the adhesive layer 5. That is, each of the antioxidant and the radical scavenger may be contained in both the heat-sealable resin layer 4 and the adhesive layer 5, may be contained only in the heat-sealable resin layer 4, or may be contained only in the adhesive layer 5. In the Third Embodiment, the antioxidant is blended in order to suppress oxidation of the layer in a high-temperature environment when forming the inner layer. Furthermore, in the Third Embodiment, the radical scavenger is blended to scavenge radicals generated in the layer in a high temperature environment at the time of forming the inner layer.

In the Third Embodiment, the antioxidant is not particularly limited as long as the effect of the Third Embodiment is not impaired. Specific examples of the antioxidant include phosphorus-based antioxidants such as tris (2,4-di-t-butylphenoxy) phosphine, 2,2-methylenebis (4,6-di-t-butylphenyl)-2-ethylhexyl phosphite, 4,4'-butylidene-bis (3-methyl-6-t-butylphenylditridecyl) phosphite, 6-[3-(3-t-butyl-4-hydroxy-5-methylphenyl) propoxy]-2,4,8,10-tetra-t-butyldibenz[d,f][1,3,2]dioxaphosphepine), tetrakis (2,4-di-t-butylphenyl)-4,4'-bisphenyldiphosphonite, bis (2,4-dicumylphenyl) pentaerythritol diphosphite, bis (2,6-di-t-butyl-4-methylphenyl) pentaerythritol diphosphite, phenol-based antioxidants such as tetrakis (methylene-3-(3,5-di-t-butyl-4-hydroxyphenyl) propionate) methane, 1,3,5-tris [[3,5-bis (1,1-dimethylethyl)-4-hydroxyphenyl]methyl]-1,3,5-triazine-2,4,6 (1H,3H,5H)-trione, octadecyl-3-(3,5-di-t-butyl-4-hydroxyphenyl) propionate, 3,9-bis (2-(3-(3-t-butyl-4-hydroxy-5-methylphenyl) propionyloxy)-1,1-dimethylethyl)-2,4,8,10-tetraoxaspiro (5,5) undecane, sulfur-based antioxidants such as tetrakis [methylene-3-(laurylthio) propionate]methane, dilauryl-3,3'-thiodipropionate, dimyristyl-3,3'-thiodipropionate and distearyl-3,3'-thiodipropionate. The antioxidant contained in the layer inside the barrier layer 3 may be one kind or two or more kinds.

In the Third Embodiment, as the phosphorus-based antioxidant, a compound represented by the following general formula (A) is preferably exemplified.

[Chemical Formula 7]

(A)

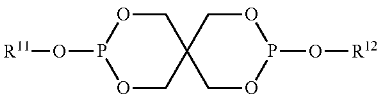

The inclusion of the compound represented by the general formula (A) in the inner layer can be confirmed using various analysis methods such as NMR.

In the general formula (A), $R^{11}$ and $R^{12}$ are each independently an alkyl group having 1 to 18 carbon atoms or a phenyl group optionally having a substituent. Among these, $R^{11}$ and $R^{12}$ are each independently preferably a phenyl group optionally having a substituent. The compound represented by the general formula (A) contained in the inner layer may be one kind or two or more kinds.

In the general formula (A), it is preferable that the phenyl groups of $R^{11}$ and $R^{12}$ each independently have, as a substituent, at least one kind of group selected from the group consisting of an alkyl group having 1 to 9 carbon atoms, a cycloalkyl group having 5 to 8 carbon atoms, an alkylcycloalkyl group having 6 to 12 carbon atoms, and an aralkyl group having 7 to 12 carbon atoms. Among these groups, the phenyl group preferably has at least one of an alkyl group having 1 to 9 carbon atoms and an aralkyl group having 7 to 12 carbon atoms as a substituent. Moreover, the number of substituents of the phenyl group in each of $R^{11}$ and $R^{12}$ may be 1 to 5, but is preferably 2 to 3.

Preferred specific examples of the compound represented by the general formula (A) include a compound represented by the following formula (A1) (bis (2,4-dicumylphenyl) pentaerythritol diphosphite) and a compound represented by the following formula (A2) (bis (2,6-di-t-butyl-4-methylphenyl) pentaerythritol diphosphite).

inner layer is a multiple layer, at least one layer included in the inner layer may contain the compound represented by the general formula (A). For example, the compound represented by the general formula (A) may be contained in both the heat-sealable resin layer 4 and the adhesive layer 5, may be contained only in the heat-sealable resin layer 4, or may be contained only in the adhesive layer 5. Since at least one of the layers constituting the inner layer contains the compound represented by the general formula (A), the resin for forming the layer is heated to a higher temperature (for example, 300° C. or higher) than before to form a layer, so that the lead time can be shortened. Furthermore, deterioration of the layer due to high temperature is suppressed, and high insulation quality can be exhibited.

In the electrical storage device, since the inner layer is in contact with the electrolytic solution, there is a concern about an adverse effect due to elution of the antioxidant contained in the inner layer into the electrolytic solution. However, in the Third Embodiment, the compound represented by formula (A1) has low solubility in the electrolytic solution solvent, and an effect of having a small adverse effect on the characteristics of the electrical storage device is also expected even when the added amount is large for improving the insulation quality. Note that, examples of the solvent of the electrolytic solution of the electrical storage device include cyclic carbonates such as ethylene carbonate (EC), propylene carbonate (PC), butylene carbonate (BC), and vinylene carbonate (VC); chain carbonates such as dimethyl carbonate (DMC), diethyl carbonate (DEC), ethyl methyl carbonate (EMC), and dipropyl carbonate (DPC); aliphatic carboxylic acid esters such as methyl formate, methyl acetate, methyl propionate, and ethyl propionate; γ-lactones such as γ-butyrolactone; chain ethers such as 1,2-dimethoxyethane (DME), 1,2-diethoxyethane (DEE), and ethoxymethoxyethane (EME); cyclic ethers such as

[Chemical Formula 8]

(A1)

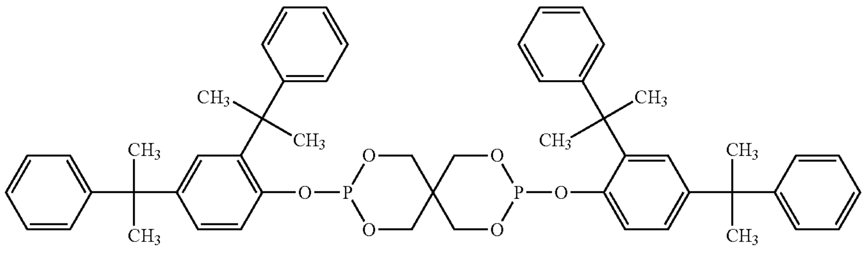

(A2)

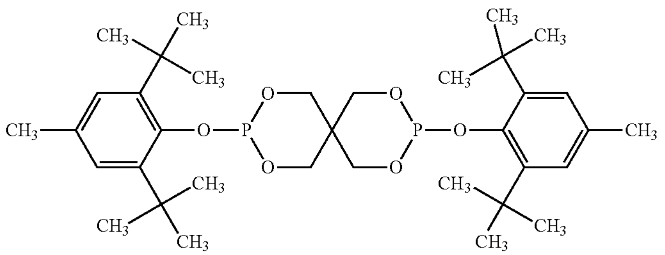

In the Third Embodiment, the inner layer particularly preferably contains the compound represented by the formula (A1) as the compound represented by the general formula (A).

As described above, in the Third Embodiment, the inner layer may be a single layer or a multiple layer. When the tetrahydrofuran and 2-methyltetrahydrofuran; dimethylsulfoxide, formamide, acetamide, dimethylformamide, dimethylacetamide, dioxolane, acetonitrile, trimethoxymethane, and dioxolane derivatives, sulfolane, methylsulfolane, propylene carbonate derivatives, tetrahydrofuran derivatives, dimethyl sulfoxide, and the like can be mentioned. These are used singly or in combination of two or more kinds thereof. Among them, at least one of cyclic carbonates, chain carbonates, and aliphatic carboxylic acid esters is preferably used, and in particular, a mixed system of cyclic carbonates and chain carbonates or a mixed system of cyclic carbonates, chain carbonates, and aliphatic carboxylic acid esters is preferably used.

In the inner layer, the content of the antioxidant in the layer containing the antioxidant is not particularly limited as long as the effect of the Third Embodiment is exhibited, but is preferably about 0.01 mass % or more, more preferably about 0.03 mass % or more, and still more preferably about 0.05 mass % or more. Furthermore, the content is preferably about 2% by mass or less, more preferably about 1% by mass or less, and still more preferably about 0.5% by mass or less. Preferable ranges of the content include about 0.01 to 2 mass %, about 0.01 to 1 mass %, about 0.01 to 0.5 mass %, about 0.03 to 2 mass %, about 0.03 to 1 mass %, and about 0.03 to 0.5 mass %.

Furthermore, in the Third Embodiment, the inner layer may contain a radical scavenger. The radical scavenger is not particularly limited, and examples thereof include an alkyl radical scavenger, an alkoxy radical scavenger, and a peroxy radical scavenger. Examples of the alkyl radical scavenger include a compound having an acrylate group and a phenolic hydroxyl group in the same molecule, and specific examples thereof include 1'-hydroxy [2,2'-ethylidenebis [4,6-bis (1,1-dimethylpropyl) benzene]]-1-yl acrylate, 2-t-butyl-4-methyl-6-(2-hydroxy-3-t-butyl-5-methylbenzyl) phenyl acrylate, and the like. When the radical scavenger is contained in the inner layer, the radical scavenger may be one kind or two or more kinds.

When the radical scavenger is contained in the inner layer, the content of the radical scavenger in the layer containing the radical scavenger in the inner layer is not particularly limited as long as the effect of the Third Embodiment described above is exhibited, but is preferably about 0.01 mass % or more, and more preferably about 0.03 mass % or more from the viewpoint of more suitably exhibiting the effect of the Third Embodiment. Furthermore, the content is preferably about 0.5 mass % or less, more preferably about 0.3 mass % or less, and still more preferably about 0.2 mass % or less. Preferable ranges of the content include about 0.01 to 0.5 mass %, about 0.01 to 0.3 mass %, about 0.01 to 0.2 mass %, about 0.03 to 0.5 mass %, about 0.03 to 0.3 mass %, and about 0.03 to 0.2 mass %.

[Surface Coating Layer 6]

The exterior material for an electrical storage device of the present disclosure may include a surface coating layer 6 on the base material layer 1 (a side of the base material layer 1 opposite to the barrier layer 3) as necessary for the purpose of improving at least one of designability, electrolytic solution resistance, scratch resistance, moldability, and the like. The surface coating layer 6 is a layer positioned on an outermost layer side of the exterior material for an electrical storage device when the electrical storage device is assembled using the exterior material for an electrical storage device.

The surface coating layer 6 can be formed of, for example, a resin such as polyvinylidene chloride, polyester, polyurethane, an acrylic resin, or an epoxy resin.

In a case where the resin forming the surface coating layer 6 is a curable resin, the resin may be either a one-liquid curable type or a two-liquid curable type, but is preferably a two-liquid curable type. Examples of the two-liquid curable resin include two-liquid curable polyurethane, two-liquid curable polyester, and two-liquid curable epoxy resin. Among them, two-liquid curable polyurethane is preferable.

Examples of the two-component curable polyurethane include polyurethane containing a main component containing a polyol compound and a curing agent containing an isocyanate compound. Preferable examples thereof include two-liquid curable polyurethanes in which a polyol such as a polyester polyol, a polyether polyol, or an acrylic polyol is used as a main component and an aromatic or aliphatic polyisocyanate is used as a curing agent. Furthermore, as the polyol compound, it is preferable to use a polyester polyol having a hydroxyl group in the side chain in addition to the hydroxyl group at the terminal of the repeating unit. Examples of the curing agent include aliphatic, alicyclic, aromatic, and araliphatic isocyanate-based compounds. Examples of the isocyanate-based compound include hexamethylene diisocyanate (HDI), xylylene diisocyanate (XDI), isophorone diisocyanate (IPDI), hydrogenated XDI (H6XDI), hydrogenated MDI (H12MDI), tolylene diisocyanate (TDI), diphenylmethane diisocyanate (MDI), and naphthalene diisocyanate (NDI). Furthermore, a polyfunctional isocyanate-modified product of one or two or more of these diisocyanates can be mentioned. Furthermore, as the polyisocyanate compound, a multimer (for example, a trimer) can also be used. Examples of such a multimer include adducts, biurets, and nurates. Note that the aliphatic isocyanate-based compound refers to an isocyanate having an aliphatic group and having no aromatic ring, the alicyclic isocyanate-based compound refers to an isocyanate having an alicyclic hydrocarbon group, and the aromatic isocyanate-based compound refers to an isocyanate having an aromatic ring. Since the surface coating layer 6 is formed of polyurethane, excellent electrolytic solution resistance is imparted to an exterior material for an electrical storage device.

The surface coating layer 6 may contain additives such as the above-described slipping agent, an anti-blocking agent, a matting agent, a flame retardant, an antioxidant, a tackifier, and an anti-static agent on at least one of the surface and the inside of the surface coating layer 6 as necessary according to the surface coating layer 6, the functionality to be provided to the surface thereof, and the like. Examples of the additive include fine particles having an average particle diameter of about 0.5 nm to 5 μm. An average particle diameter of the additive is a median diameter measured by a laser diffraction/scattering particle diameter distribution measuring apparatus.

The additive may be either an inorganic substance or an organic substance. Furthermore, a shape of the additive is not particularly limited, and examples thereof include a spherical shape, a fibrous shape, a plate shape, an amorphous shape, and a scaly shape.

Specific examples of the additive include talc, silica, graphite, kaolin, montmorillonite, mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotube, high melting point nylon, acrylate resin, crosslinked acrylic, crosslinked styrene, crosslinked polyethylene, benzoguanamine, gold, aluminum, copper, nickel, and the like. The additives may be used alone, or may be used in combination of two or more thereof. Among these additives, silica, barium sulfate, and titanium oxide are preferable from the viewpoint of dispersion stability, cost, and the like. Furthermore, the surface of the additive may be subjected to various surface treatments such as an insulation treatment and a dispersibility enhancing treatment.

A method of forming the surface coating layer 6 is not particularly limited, and examples thereof include a method of applying a resin for forming the surface coating layer 6. In a case where an additive is blended in the surface coating layer 6, a resin mixed with the additive may be applied.

A thickness of the surface coating layer 6 is not particularly limited as long as the function as the surface coating layer 6 is performed, and is, for example, about 0.5 to 10 μm, preferably about 1 to 5 μm.

3. Method of Manufacturing Exterior Material for Electrical Storage Device

A method of manufacturing an exterior material for an electrical storage device is not particularly limited as long as a laminate in which the layers included in the exterior material for an electrical storage device of the present disclosure are laminated can be obtained, and examples thereof include a method including a step of laminating at least the base material layer 1, the barrier layer 3, and the inner layer (the adhesive layer 5 and the heat-sealable resin layer 4) in this order.

That is, the method of manufacturing an exterior material for an electrical storage device according to the First Embodiment includes a step of obtaining a laminate by laminating at least a base material layer, a barrier layer, and an inner layer (an adhesive layer and a heat-sealable resin layer) in this order, and when dynamic viscoelasticity measurement is performed on the inner layer, an elongation rate at 80° C. is 8.0% or less.

Furthermore, a method of manufacturing an exterior material for an electrical storage device according to a Second Embodiment includes a step of obtaining a laminate by laminating at least a base material laver, a barrier layer, an adhesive layer, and a heat-sealable resin layer in this order, in which the adhesive layer contains a polypropylene-based resin and polyethylene, a sea-island structure is observed in a cross-sectional image acquired using a scanning electron microscope for a cross section of the adhesive layer in a direction parallel to TD and in a thickness direction, the cross-sectional image is a cross-sectional image acquired within a range from a surface of the adhesive layer on a side of the barrier layer to a portion having a thickness of 25% when the thickness of the adhesive layer is 100%, and in the cross-sectional image, a ratio of a total number of island portions having an area of less than 0.25 $\mu m^2$ in the island portions to a total number of island portions of the sea-island structure is 40% or more.

Furthermore, a method of manufacturing an exterior material for an electrical storage device according to a Third Embodiment includes a step of obtaining a laminate by laminating at least a base material layer, a barrier layer, and a heat-sealable resin layer in this order, in which the heat-sealable resin layer contains polypropylene and polyethylene, a sea-island structure is observed in a cross-sectional image acquired using a scanning electron microscope with respect to a cross section of the heat-sealable resin layer in a direction parallel to TD and in a thickness direction y, in the cross-sectional image, a ratio of a total number of island portions having an area of 0.02 $\mu m^2$ or less among the island portions to the total number of island portions of the sea-island structure is 80.0% or more, and at least one of an antioxidant and a radical scavenger is contained in at least one of layers inner than the barrier layer.

An example of a method of manufacturing the exterior material for an electrical storage device of the present disclosure is as follows. First, a laminate (Hereinafter, it may be referred to as a "laminate A".) in which the base material layer 1, the adhesive agent layer 2, and the barrier layer 3 are laminated in this order is formed. Specifically, the laminate A can be formed by a dry lamination method in which an adhesive used for forming the adhesive agent layer 2 is applied onto the base material layer 1 or the barrier layer 3 whose surface is subjected to a chemical conversion treatment as necessary by a coating method such as a gravure coating method or a roll coating method, dried, and then the barrier layer 3 or the base material layer 1 is laminated to cure the adhesive agent layer 2.

Next, the adhesive layer 5 and the heat-sealable resin layer 4 are laminated on the barrier layer 3 of the laminate A. For example, (1) a method of laminating the adhesive layer 5 and the heat-sealable resin layer 4 on the barrier layer 3 of the laminate A by extruding the adhesive layer 5 and the heat-sealable resin layer 4 (co-extrusion lamination method, tandem lamination method). (2) a method of separately forming a laminate in which the adhesive layer 5 and the heat-sealable resin layer 4 are laminated and laminating the laminate on the barrier layer 3 of the laminate A by a thermal lamination method, or a method of forming a laminate in which the adhesive layer 5 is laminated on the barrier layer 3 of the laminate A and laminating the laminate on the heat-sealable resin layer 4 by a thermal lamination method, or (3) a method of laminating the laminate A and the heat-sealable resin layer 4 with the adhesive layer 5 interposed therebetween while pouring the melted adhesive layer 5 between the barrier layer 3 of the laminate A and the heat-sealable resin layer 4 previously formed in a sheet form (sandwich lamination method), (4) a method in which an adhesive for forming the adhesive layer 5 is applied by solution coating onto the barrier layer 3 of the laminate A and dried, or further laminated by a baking method or the like, and the heat-sealable resin layer 4 formed in a sheet form in advance is laminated on the adhesive layer 5.

As described above, in the exterior material for an electrical storage device according to the First Embodiment of the present disclosure, as a preferable example for setting the elongation rate at 80° C. in dynamic viscoelasticity measurement by pulling of the inner layer to 8.0% or less, there is an increase in crystallinity of the adhesive layer and the heat-sealable resin layer. For example, when an exterior material for an electrical storage device is produced, a method is employed in which an adhesive layer and a heat-sealable resin layer are formed by melt extrusion molding, cooled, and then post-heated again to a temperature equal to or higher than the melting points of the adhesive layer and the heat-sealable resin layer, and cooled. Furthermore, the cooling rate after the post-heating is such that the temperature decrease from the start of cooling to 3 seconds is preferably 60° C. or lower, more preferably 50° C. or lower, and still more preferably 45° C. or lower, and the initial cooling conditions are controlled to very slow cooling conditions to promote crystal growth of the adhesive layer and the heat-sealable resin layer. For example, by adopting such a method to form the adhesive layer 5 and the heat-sealable resin layer 4, the crystallinity of the adhesive layer and the heat-sealable resin layer is enhanced, and the sealability in a high-temperature environment is improved. As described above, as a method of setting the elongation rate at 110° C. in the dynamic viscoelasticity measurement by tension to 15.0% or less and a method of setting the temperature at the elongation rate of 10% to 85° C. or more, a method of similarly enhancing the crystallinity can be adopted.

In a case where the surface coating layer 6 is provided, the surface coating layer 6 is laminated on the surface of the base material layer 1 on a side opposite to the barrier layer 3. The surface coating layer 6 can be formed, for example, by applying the above-mentioned resin for forming the surface coating layer 6 to the surface of the base material layer 1. Note that the order of the step of laminating the barrier layer 3 on the surface of the base material layer 1 and the step of laminating the surface coating layer 6 on the surface of the base material layer 1 is not particularly limited. For example, after the surface coating layer 6 is formed on the surface of the base material layer 1, the barrier layer 3 may be formed on the surface of the base material layer 1 on the side opposite to the surface coating layer 6.

As described above, a laminate including the surface coating layer 6 provided as necessary, the base material layer 1, the adhesive agent layer 2 provided as necessary, the barrier layer 3, the adhesive layer 5 and the heat-sealable resin layer 4 in this order is formed, and the laminate may be further subjected to a heating treatment in order to strengthen the bondability of the adhesive agent layer 2 provided as necessary and the adhesive layer 5.

In the exterior material for an electrical storage device, each layer constituting the laminate may be subjected to a surface activation treatment such as a corona treatment, a blast treatment, an oxidation treatment, or an ozone treatment as necessary to improve processing suitability. For example, by applying a corona treatment to the surface of the base material layer 1 on a side opposite to the barrier layer 3, the printability of the ink to the surface of the base material layer 1 can be improved.

4. Application of Exterior Material for Electrical Storage Device

The exterior material for an electrical storage device of the present disclosure is used in a packaging for hermetically sealing and accommodating electrical storage device elements such as a positive electrode, a negative electrode, and an electrolyte. That is, an electrical storage device element including at least a positive electrode, a negative electrode and an electrolyte can be accommodated in a packaging formed of the exterior material for an electrical storage device of the present disclosure to form an electrical storage device.

Figure 6:
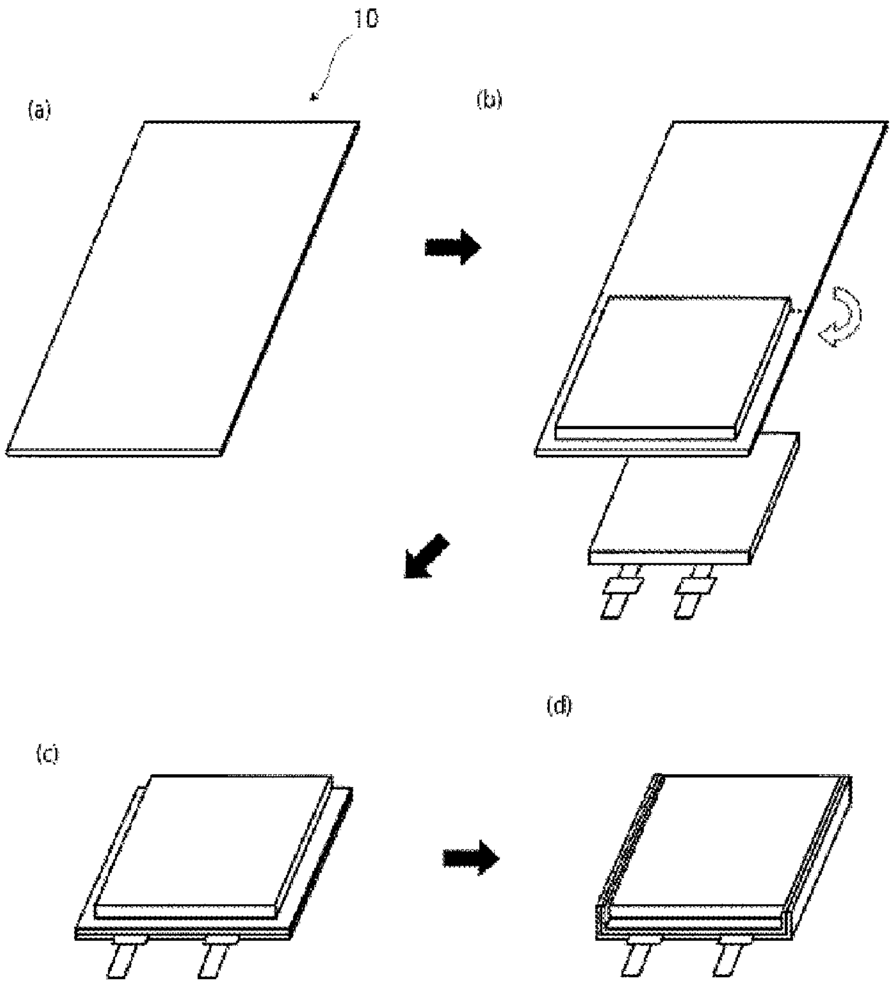
FIG. 6 is a schematic diagram for explaining a method of accommodating an electrical storage device element in a packaging formed of the exterior material for an electrical storage device of the present disclosure.

Specifically, an electrical storage device element including at least a positive electrode, a negative electrode, and an electrolyte is covered with the exterior material for an electrical storage device of the present disclosure such that a flange portion (a region where the heat-sealable resin layers are in contact with each other) can be formed on a peripheral edge of the electrical storage device element in a state where a metal terminal connected to each of the positive electrode and the negative electrode protrudes outward, and the heat-sealable resin layers of the flange portion are heat-sealed with each other to hermetically seal the electrical storage device element, thereby providing an electrical storage device using the exterior material for an electrical storage device. Note that in a case where the electrical storage device element is accommodated in the packaging formed of the exterior material for an electrical storage device of the present disclosure, the packaging is formed such that a part of the heat-sealable resin of the exterior material for an electrical storage device of the present disclosure is on an inner side (surface in contact with the electrical storage device element). The two heat-sealable resin layers of the exterior material for an electrical storage device may be overlapped with each other while facing each other, and the peripheral edge parts of the exterior material for an electrical storage device may be heat-sealed to form a packaging. Alternatively, as in the example illustrated in FIG. 6, one exterior material for an electrical storage device may be folded back and overlapped, and the peripheral edge parts may be heat-sealed to form a packaging. In the case of folding back and superimposing, as in the example illustrated in FIG. 6, the packaging may be formed by heat-sealing sides other than the folded side and a three-way seal, or may be folded back and sealed in four so that a flange portion can be formed. Furthermore, in the exterior material for an electrical storage device, a concave portion for accommodating the electrical storage device element may be formed by deep drawing molding or overhanging molding. As in the example illustrated in FIG. 6, a concave portion may be provided in one of the exterior materials for an electrical storage device, and a concave portion may not be provided in the other exterior material for an electrical storage device, and a concave portion may also be provided in the other exterior material for an electrical storage device.

The exterior material for an electrical storage device of the present disclosure can be suitably used for an electrical storage device such as a battery (includes a capacitor, and the like.). Furthermore, the exterior material for an electrical storage device of the present disclosure may be used for either a primary battery or a secondary battery, but is preferably used for a secondary battery. The type of the secondary battery to which the exterior material for an electrical storage device of the present disclosure is applied is not particularly limited, and examples thereof include a lithium ion battery, a lithium ion polymer battery, an all-solid-state battery, a lead-acid battery, a nickel-hydrogen storage battery, a nickel-cadmium storage battery, a nickel-iron storage battery, a nickel-zinc storage battery, a silver oxide-zinc storage battery, a metal-air battery, a multivalent cation battery, a capacitor, and a capacitor. Among these secondary batteries, preferred objects to which the exterior material for an electrical storage device of the present disclosure is applied include lithium ion batteries and lithium ion polymer batteries.

EXAMPLES

Hereinafter, the present disclosure will be described in detail with reference to Examples and Comparative Examples. However, the present disclosure is not limited to Examples.

The following Examples 1A to 4A and Comparative Examples 1A to 2A are experimental results relating to the First Embodiment of the present disclosure. Furthermore, the following Examples 1B to 10B and Comparative Example 1A are experimental results relating to the Second Embodiment of the present disclosure. Furthermore, the following Examples 1C to 10C and Comparative Examples 1C to 2C are experimental results regarding the Third Embodiment of the present disclosure.

<Manufacturing of Exterior Material for Electrical Storage Device>

Example 1A

A polyethylene terephthalate (PET) film (thickness: 12 μm) and a stretched nylon (ONy) film (thickness: 15 μm) were prepared as base material layers, and a two-liquid urethane adhesive (polyol compound and aromatic isocyanate-based compound) was applied to the PET film (3 μm) to bond the PET film to the ONy film. Furthermore, an aluminum foil (JIS H4160:1994 A8021H-O (thickness 40

μm)) was prepared as a barrier layer. Next, a two-liquid urethane adhesive (polyol compound and aromatic isocyanate-based compound) was applied to one surface of the aluminum foil to form an adhesive layer (thickness: 3 μm) on the barrier layer. Next, the adhesive agent layer on the barrier layer and the base material layer (ONy film side) were laminated by a dry lamination method, and an aging treatment was then performed to prepare a laminate of base material layer/adhesive agent layer/barrier layer. Both surfaces of the aluminum foil are subjected to a chemical conversion treatment. The chemical conversion treatment of the aluminum foil was performed by applying a treatment liquid containing a phenol resin, a chromium fluoride compound and phosphoric acid to both surfaces of the aluminum foil by a roll coating method in such a manner that the application amount of chromium was 10 $mg/m^2$ (dry mass), and baking the aluminum foil.

Next, on the barrier layer of each of the laminates obtained above, a maleic anhydride-modified polypropylene as an adhesive layer (thickness: 40 μm) and a random polypropylene as a heat-sealable resin layer (thickness: 40 μm) were laminated on the barrier layer to obtain an exterior material for an electrical storage device in which a base material layer (thickness: 30 μm including an adhesive)/an adhesive agent layer (3 μm)/a barrier layer (40 μm)/an inner layer (adhesive layer (40 μm)/a heat-sealable resin layer (40 μm)) was laminated in this order.

When the adhesive layer and the heat-sealable resin layer were laminated on the barrier layer, the respective resins constituting the adhesive layer and the heat-sealable resin layer were co-extruded onto the barrier layer in a molten state, cooled to about several tens ° C., and then post-heated again to a temperature (one hundred and several tens ° C.) equal to or higher than the melting points of the adhesive layer and the heat-sealable resin layer, and cooled. As for the cooling rate after post-heating, the temperature decrease from the start of cooling to 3 seconds was set to 42° C., and the initial cooling condition was controlled to a very slow cooling condition to promote the crystal growth of the adhesive layer and the heat-sealable resin layer.

Example 2A

An exterior material for an electrical storage device was obtained in the same manner as in Example 1A except that a resin having a melt mass flow rate (MFR) smaller than that of the resin used in Example 1A was used as the resin constituting the adhesive layer and the heat-sealable resin layer.

Example 3A

A polyethylene terephthalate (PET) film (thickness: 12 μm) and a stretched nylon (ONy) film (thickness: 25 μm) were prepared as base material layers, and a two-liquid urethane adhesive (polyol compound and aromatic isocyanate-based compound) was applied to the PET film (3 μm) to bond the PET film to the ONy film. Furthermore, an aluminum foil (JIS H 4160:1994 A8021H-O (thickness 60 μm)) was prepared as a barrier layer. Next, a two-liquid urethane adhesive (polyol compound and aromatic isocyanate-based compound) was applied to one surface of the aluminum foil to form an adhesive layer (thickness: 3 μm) on the barrier layer. Next, the adhesive agent layer on the barrier layer and the base material layer (ONy film side) were laminated by a dry lamination method, and an aging treatment was then performed to prepare a laminate of base material layer/adhesive agent layer/barrier layer. Both surfaces of the aluminum foil are subjected to a chemical conversion treatment. The chemical conversion treatment of the aluminum foil was performed by applying a treatment liquid containing a phenol resin, a chromium fluoride compound and phosphoric acid to both surfaces of the aluminum foil by a roll coating method in such a manner that the application amount of chromium was 10 $mg/m^2$ (dry mass), and baking the aluminum foil.

Next, on the barrier layer of each of the laminates obtained above, a maleic anhydride-modified polypropylene as an adhesive layer (thickness: 40 μm) and a random polypropylene as a heat-sealable resin layer (thickness: 40 μm) were laminated on the barrier layer to obtain an exterior material for an electrical storage device in which a base material layer (thickness: 40 μm including an adhesive)/an adhesive agent layer (3 μm)/a barrier laver (60 μm)/an inner layer (adhesive layer (40 μm)/a heat-sealable resin layer (40 μm)) was laminated in this order.

When the adhesive layer and the heat-sealable resin layer were laminated on the barrier layer, the respective resins constituting the adhesive layer and the heat-sealable resin layer were co-extruded onto the barrier layer in a molten state, cooled to about several tens ° C., and then post-heated again to a temperature (one hundred and several tens ° C.) equal to or higher than the melting points of the adhesive layer and the heat-sealable resin layer, and cooled. As for the cooling rate after post-heating, the temperature decrease from the start of cooling to 3 seconds was set to 42° C., and the initial cooling condition was controlled to a very slow cooling condition to promote the crystal growth of the adhesive layer and the heat-sealable resin layer.

Example 4A

Except that a resin having a melt mass flow rate (MFR) smaller than that of the resin used in Example 1A was used as a resin constituting the adhesive layer and the heat-sealable resin laver, a propylene resin having a melt mass flow rate (MFR) between the adhesive layer and the heat-sealable resin layer was used as an inner layer, and a propylene resin layer (second heat-sealable resin layer) was laminated between the adhesive layer (30 μm) and the heat-sealable resin layer (20 μm), the same procedure as in Example 1A was carried out to obtain an exterior material for an electrical storage device in which a base material layer (30 μm in thickness including an adhesive), an adhesive agent layer (3 μm), a barrier layer (40 μm) and an inner layer (adhesive layer (30 μm)/propylene resin layer (30 μm second heat-sealable resin layer)/heat-sealable resin layer (20 μm)) were laminated in this order.

Comparative Example 1A

An exterior material for an electrical storage device was obtained in the same manner as in Example 1A except that the post-heating and the subsequent cooling step were not provided when the adhesive layer and the heat-sealable resin layer were laminated on the barrier layer.

Comparative Example 2A

An exterior material for an electrical storage device was obtained in the same manner as in Example 1A except that when the adhesive layer and the heat-sealable resin layer were laminated on the barrier layer, the temperature decrease in 3 seconds from the start of cooling after post-heating was set to 90° C./3 seconds which can be generally said as a slow cooling condition.

<Dynamic Viscoelasticity (DMA) Measurement>

Figure 7:
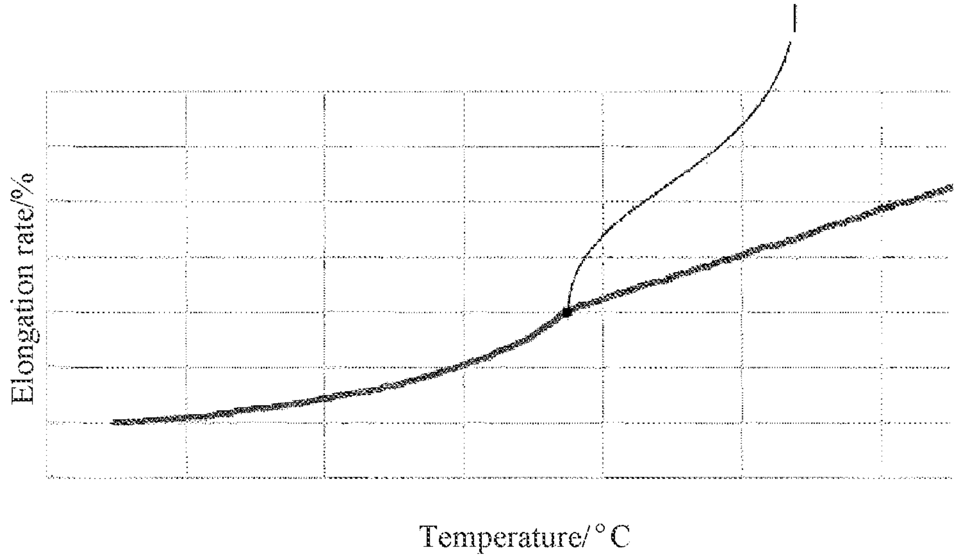
FIG. 7 is a schematic diagram of a graph illustrating a relationship between an elongation rate (%) and a temperature (° C.) obtained by dynamic viscoelasticity measurement.

For each of the outer packaging materials for an electrical storage device obtained in Examples and Comparative Examples, a sample was prepared from the inner layer, and dynamic viscoelasticity measurement was performed. Specifically, the barrier layer was dissolved by immersing each exterior material for an electrical storage device in a 10% aqueous hydrochloric acid solution for 24 hours to obtain an inner layer (two-layer configuration of an adhesive layer and a heat-sealable resin layer). Next, this inner layer was washed with water, dried, and cut into a width of 5 mm and a length of 10 mm to prepare a sample. Next, each of the obtained samples was subjected to dynamic viscoelasticity measurement under the following measurement conditions using a dynamic viscoelasticity measuring apparatus (trade name: Rheogel-E4000) manufactured by UBM Co., Ltd. The elongation rate (%) at a temperature of 80° C. and the elongation rate (%) at a temperature of 110° C. are illustrated in Table 1A. In the graph illustrating a relationship between the elongation rate and the temperature obtained by the dynamic viscoelasticity measurement, the temperature at 10% elongation is also illustrated in Table 1A. For reference, FIG. 7 illustrates a schematic diagram of a graph illustrating the relationship between the elongation rate and the temperature, which is obtained by dynamic viscoelasticity measurement in tension. I of FIG. 7 is a position where the elongation rate has reached 10%.

(Measurement Conditions)

Sample width: 5 mm

Start temperature 30° C.

End temperature 160° C.

Heating rate 2° C./min

Static load 50 g

Length between test holders (distance between chucks) 10 mm

Chuck tension

Software used for measurement: RheoStation (ver 7)

Step temperature 1° C.

Waveform: sine wave, 10 Hz

Strain 10 μm, strain control (automatic adjustment)

Measuring jig: pulling

The load was controlled to be constant until the elongation rate reached 10%, the load control was stopped after the elongation rate reached 10%, and the film was stretched by 20 μm at every 1° C. thereafter.

<Creep Test (Evaluation of Sealability in High-Temperature Environment)>

Figure 4:
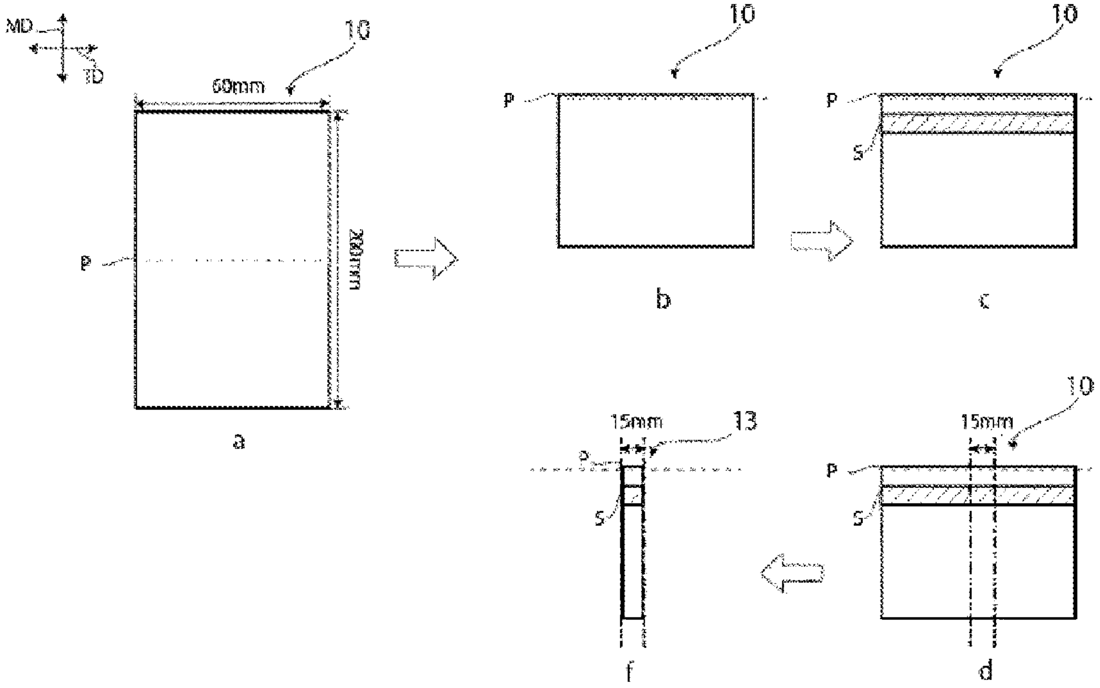
FIG. 4 is a schematic diagram for explaining a method of preparing a sample to be subjected to a creep test in Examples.
Figure 5:
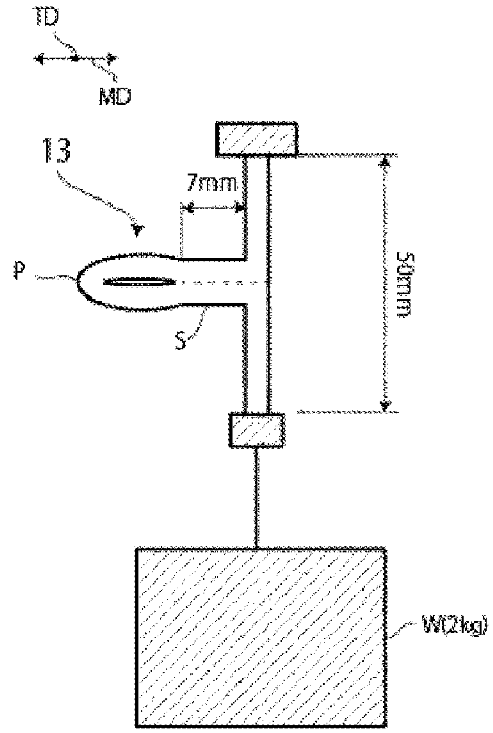
FIG. 5 is a schematic diagram for explaining a method of performing a creep test in Examples.

In accordance with the provision of JIS K7127:1999, a creep test of an exterior material for an electrical storage device in an environment of 80° C. was performed as follows. As a test piece, the exterior material for an electrical storage device which was cut into a strip shape having a width of 15 mm in the transverse direction was prepared. Specifically, as illustrated in FIG. 4, first, each exterior material for an electrical storage device was cut into a size of 60 mm (transverse direction)×200 mm (machine direction) (FIG. 4*a*). Next, the exterior material for an electrical storage device was folded in two in the machine direction at the position of the fold P (intermediate in the machine direction) such that the heat-sealable resin layers faced each other (FIG. 4*b*). The heat-sealable resin layers were heat-sealed on the inner side in the machine direction by about 10 mm from the fold P under the conditions of a seal width of 7 mm, a temperature of 190° C., a surface pressure of 0.6 MPa, and 3 seconds (FIG. 4*c*). In FIG. 4*c*, a shaded section S is a heat-sealed section (seal section S). Next, the test piece 13 was obtained by cutting in the machine direction (cutting at the position of the two-dot chain line in FIG. 4*d*) so that the width in the transverse direction was 15 mm (FIG. 4*f*). Next, using BE-501 manufactured by TESTER SANGYO CO., LTD., each obtained test piece 13 was fixed at the upper part in an environment of 80° C. as illustrated in the schematic diagram of FIG. 5, a weight W of 2 kg was hung at the lower part, and the time until the seal section S was broken was measured. The results are illustrated in Table 1A.

Figure 8:
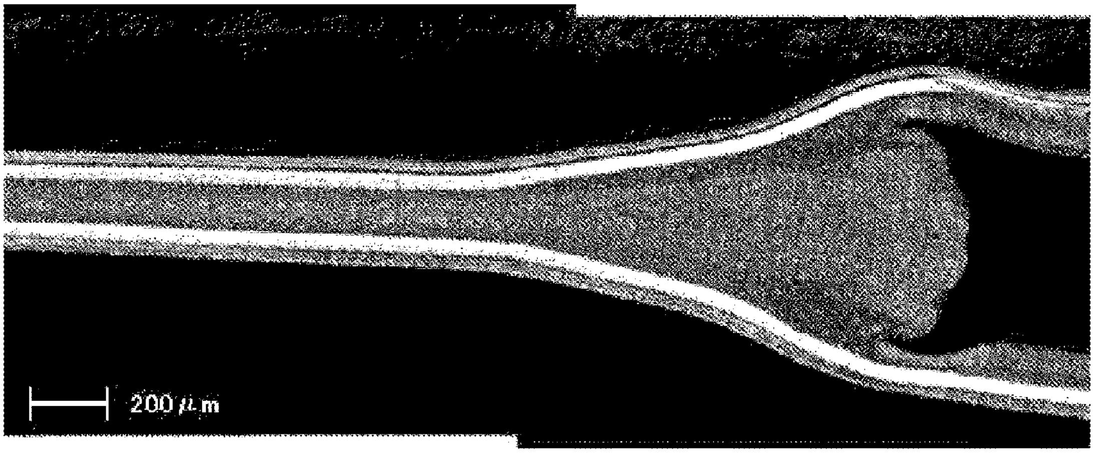
FIG. 8 is a cross-sectional image (SEM image) in a thickness direction after a creep test of an exterior material for an electrical storage device of Example 1A.
Figure 9:
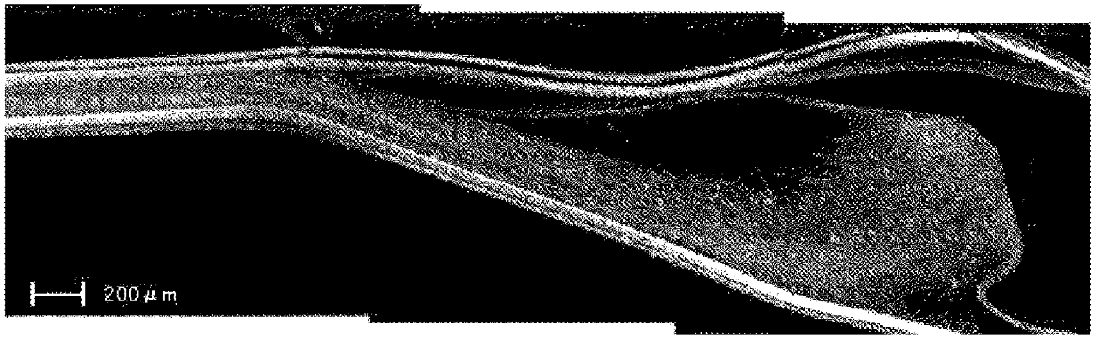
FIG. 9 is a cross-sectional image (SEM image) in a thickness direction after a creep test of an exterior material for an electrical storage device of Comparative Example 1A.

For reference, cross-sectional images (SEM images) in the thickness direction after the creep test of the exterior material for an electrical storage device of Example 1A and Comparative Example 1A are illustrated in FIG. 8 (Example 1A) and FIG. 9 (Comparative Example 1A), respectively. From the image of FIG. 9, it can be seen that in Comparative Example 1A, the adhesive layer undergoes cohesive fracture after the creep test. In Comparative Example 1A, it is considered that the adhesive layer was cohesive fractured due to insufficient crystal growth.

TABLE 1A

| | Presence or absence of post-heating of adhesive layer and heat-sealable resin layer | Cooling rate at the start of cooling after post-heating of adhesive layer and heat-scalable resin layer | Dynamic viscoelasticity measurement | | | Creep test (80° C.) |
|---|---|---|---|---|---|---|
| | | | Elongation rate at temperature of 80° C. | Elongation rate at temperature of 110° C. | Temperature at 10% elongation | Time until seal section is broken |
| Example 1A | Presence | 42° C./3 seconds | 5.2% | 13.1% | 95° C. | 70 hours |
| Example 2A | Presence | 42° C./3 seconds | 4.2% | 11.9% | 103° C. | 168 hours |
| Example 3A | Presence | 42° C./3 seconds | 5.3% | 13.5% | 94° C. | 72 hours |
| Example 4A | Presence | 42° C./3 seconds | 3.2% | 11.1% | 106° C. | 744 hours |
| Comparative Example 1A | Absence | None | 12.7% | 17.7% | 74° C. | 23 hours |
| Comparative Example 2A | Presence | 90° C./3 seconds | 10.8% | 16.5% | 79° C. | 43 hours |

As illustrated in Table 1A, in the exterior material for an electrical storage device of Example 1A to 4A, when dynamic viscoelasticity measurement is performed on the inner side layer, the elongation rate at 80° C. is 8.0% or less. The exterior material for an electrical storage device of Example 1A to 4A is evaluated to have a very long time until a seal portion between heat-sealable resin layers is broken in a creep test at 80° C., and to be excellent in sealability in a high-temperature environment.

Cooling of the exterior material for an electrical storage device of Comparative Example 2A was also started at a cooling rate of 90° C./3 seconds which can be generally said to be a slow cooling condition. Therefore, also in Comparative Example 2A, it is considered that the crystal growth of the adhesive layer and the heat-sealable resin layer proceeded, the time until the seal portion was broken in the creep test at 80° C. was as relatively long as 43 hours, and the sealability was improved as compared with Comparative Example 1A although it was not as long as in Example 1A to 4A.

<Manufacturing of Exterior Material for Electrical Storage Device>

Examples 1B and 2B and Comparative Example 1B

A polyethylene terephthalate (PET) film (thickness: 12 μm) and a stretched nylon (ONy) film (thickness: 15 μm) were prepared, and the PET film and the ONy film were bonded to each other with a two-liquid urethane adhesive (polyol compound and aromatic isocyanate-based compound) to form a base material layer. Furthermore, an aluminum alloy foil (JIS H4160:1994 A8021H-O (thickness 40 μm)) was prepared as a barrier layer. Next, an aluminum alloy foil and abase material layer (ONy film side) were laminated by a dry lamination method using a two-liquid urethane adhesive (Polyol compound and aromatic isocyanate-based compound, thickness after curing: 3 μm), and an aging treatment was then performed to prepare a laminate of base material layer/adhesive agent layer/barrier layer. Both surfaces of the aluminum alloy foil are subjected to a chemical conversion treatment. The chemical conversion treatment of the aluminum alloy foil was performed by applying a treatment liquid containing a phenol resin, a chromium fluoride compound and phosphoric acid to both surfaces of the aluminum alloy foil by a roll coating method in such a manner that the application amount of chromium was 10 $mg/m^2$ (dry mass), and baking.

Next, pellets of a maleic anhydride-modified polypropylene resin (a composition of maleic anhydride-modified polypropylene and polyethylene) as an adhesive layer (thickness: 40 μm) and pellets of a random polypropylene resin (a composition of random polypropylene and polyethylene) as a heat-sealable resin layer (thickness: 40 μm) were each molded into a film shape under the melt extrusion conditions described later (Specifically, pellets are melt-kneaded and melted by a twin-screw extruder and discharged from a T-die to be formed into a film shape.) on the barrier layer of each of the laminates obtained above to laminate an adhesive layer/a heat-sealable resin layer on the barrier layer, thereby obtaining an exterior material for an electrical storage device (total thickness: 153 μm) in which a base material layer (thickness: 30 μm including an adhesive), an adhesive agent layer (3 μm), a barrier layer (40 μm), an adhesive layer (40 μm) and a heat-sealable resin layer (40 μm) were laminated in this order.

In Examples 1B and 2B and Comparative Example 1B, the same material is used as the material constituting each layer, and the content of polyethylene in the adhesive layer is about 25 mass %.

Example 3B

An exterior material for an electrical storage device was obtained in the same manner as in Example 1B except that a resin having a melt mass flow rate (MFR) smaller than that of the resin used in Example 1B was used as the resin constituting the adhesive layer and the heat-sealable resin layer.

Example 4B

An exterior material for an electrical storage device was obtained in the same manner as in Example 1B except that a resin having a melt mass flow rate (MFR) smaller than that of the resin used in Example 1B was used as the resin constituting the adhesive layer and the heat-sealable resin layer, respectively, the thickness of the adhesive layer was 30 μm, and the thickness of the heat-sealable resin layer was 50 μm.

Example 5B

An exterior material for an electrical storage device was obtained in the same manner as in Example 1B except that a stretched nylon (ONy) film having a thickness of 25 μm was used as the base material laver and an aluminum alloy foil (JIS H4160:1994 A8021H-O (thickness 60 μm)) was used as the barrier layer.

Example 6B

A container material for an electrical storage device was obtained in the same manner as in Example 5B except that a melt extrusion condition B described later was adopted as a melt extrusion condition of a resin when an adhesive layer was formed.

Example 7B

An exterior material for an electrical storage device was obtained in the same manner as in Example 4B except that the heat-sealable resin layer had a two-layer structure, that the same resin as that of the adhesive layer of Example 4B was used as the resin constituting the adhesive layer, that the resin having a smaller elastic modulus than that of the heat-sealable resin laver of Example 4B was used as the resin constituting the heat-sealable resin layer in contact with the adhesive layer, and that the same resin as that of the heat-sealable resin layer of Example 4B was used as the resin constituting the heat-sealable resin layer of the innermost layer, after using those described later as the antioxidant and the radical scavenger for the adhesive layer and the heat-sealable resin layer.

Example 8B

An exterior material for an electrical storage device was obtained in the same manner as in Example 7B except that the later-described antioxidants and radical scavengers were used for the adhesive layer and the heat-sealable resin layer, and then the later-described melt extrusion condition B was adopted as the melt extrusion condition of the resin when the adhesive layer was formed.

Example 9B

An exterior material for an electrical storage device was obtained in the same manner as in Example 1B except that those described later were used as an antioxidant and a radical scavenger for the adhesive layer and the heat-sealable resin layer.

Example 10B

A container material for an electrical storage device was obtained in the same manner as in Example 9B except that a melt extrusion condition B described later was adopted as a melt extrusion condition of a resin when an adhesive layer was formed.

(Melt Extrusion Conditions)

The conditions for melt extrusion of the resin when the adhesive layer is formed by melt extrusion are as follows. The melt extrusion conditions employed in Examples and Comparative Examples are illustrated in Table 1B.

Melt extrusion conditions A: The temperature at the time of melt-kneading the resin is set to a low temperature (about 200 to 240° C.), and the time until the resin is discharged from the T die (residence time of the molten resin) is made shorter than that under general conditions.

Melt extrusion conditions B: The temperature at the time of melt-kneading the resin is set to a low temperature (about 240 to 260° C.), and the time until the resin is discharged from the T die (residence time of the molten resin) is set to be about the same as that under general conditions.

Melt extrusion conditions C: The temperature at the time of melt-kneading the resin is set to a high temperature (about 260 to 280° C.), and the time until the resin is discharged from the T die (residence time of the molten resin) is set to be about the same as that under general conditions.

Melt extrusion condition D: The temperature at the time of melting and kneading the resin is set to a high temperature (about 260 to 280° C.), and the time until the resin is discharged from the T die (residence time of the molten resin) is made shorter than that under general conditions.

<Measurement of Ratio of Area and Number of Island Portions in Sea-Island Structure>

An exterior material for an electrical storage device was embedded in a thermosetting epoxy resin and cured. A cross section in a direction parallel to TD and in a thickness direction was prepared using a commercially available rotary microtome (EM UC6 manufactured by LEICA) and a glass knife, and at that time, the cross section was prepared with a normal temperature microtome. The adhesive layer of the exterior material for an electrical storage device together with the embedded resin was dyed with ruthenium tetroxide for 3 hours. When the resin is dyed, the resin expands, and the sea-island structure cannot be confirmed near the cross section. Therefore, the expanded portion is trimmed with the microtome. Then, a stained section having a thickness of about 100 nm collected from a cross section after being cut from about 1 μm to 2 μm using a diamond knife was observed as follows. Cross-sectional images of the stained sections were acquired using a field emission scanning electron microscope (S-4800 manufactured by Hitachi High-Technologies Corporation). Note that the cross-sectional image is a cross-sectional image acquired within a range from the surface of the adhesive layer on the barrier layer side to a portion having a thickness of 25% when the thickness of the adhesive layer is 100%. The measurement conditions were acceleration voltage: 30 kV, emission current: 10 μA, detector: transmission detector, inclination: none (0°), and observation magnification: 5,000 times. Next, using image processing software (image analysis software attached to a Keyence electron Microscope VHX-5000) capable of binarizing the cross-sectional image, the island portion and the sea portion of the sea-island structure were binarized for the cross-sectional image. Specifically, measurement was started under the condition of luminance (standard) of image analysis software, the extraction region (measurement range) was set to a rectangular shape (length: 7 μm, width: 13 μm), the imaging size was set to standard (1600×1200), the inclination angle was set to 0 degree, the imaging mode was set to normal imaging, and the extraction target was set to a "dark region". Furthermore, the extraction missing part and the extra extraction part were corrected by automatic measurement, and the total area and the total number of extracted parts (island parts) were measured. At this time, the area and the number of all the island portions existing in the extraction region are each measured. Using the acquired data, the relationship between the area (μm,) of the island portion and the ratio (%) of the number of island portions to the total number of all island portions is illustrated in bar graphs of FIG. 14 (Example 1B), FIG. 15 (Example 2B), FIG. 16 (Example 3B), FIG. 17 (Example 4B), and FIG. 18 (Comparative Example 1B). In each bar graph of FIG. 14 to 18, for example, the ratio (%) of the number indicated at the position of an area of 0.1 $\mu m^2$ indicates the ratio (%) of the number of island portions having an area of less than 0.10 $\mu m^2$ where the number of all island portions is 100%. Furthermore, for example, the ratio (%) of the number indicated at the position of an area of 0.25 $\mu m^2$ indicates the ratio (%) of the number of island portions having an area of 0.20 $\mu m^2$ or more and less than 0.25 $\mu m^2$, where the number of all island portions is 100%. The ratio (%) of the number of island portions having an area of less than 0.10 $\mu m^2$, the ratio (%) of the number of island portions having an area of less than 0.15 $\mu m^2$, the ratio (%) of the number of island portions having an area of less than 0.25 $\mu m^2$, and the ratio (%) of the number of island portions having an area of 1.50 $\mu m^2$ or more are illustrated in Table 1B, respectively. Note that each bar graph in FIGS. 14 to 18 illustrates an area of less than 2 μm·

<Creep Test (Evaluation of Sealability in High-Temperature Environment)>

In accordance with the provision of JIS K7127:1999, a creep test of an exterior material for an electrical storage device in an environment of 80° C. was performed as follows. As a test piece, the exterior material for an electrical storage device which was cut into a strip shape having a width of 15 mm in the transverse direction was prepared. Specifically, as illustrated in FIG. 4, first, each exterior material for an electrical storage device was cut into a size of 60 mm (transverse direction)×200 mm (machine direction) (FIG. 4*a*). Next, the exterior material for an electrical storage device was folded in two in the machine direction at the position of the fold P (intermediate in the machine direction) such that the heat-sealable resin layers faced each other (FIG. 4*b*). The heat-sealable resin layers were heat-sealed on the inner side in the machine direction by about 10 mm from the fold P under the conditions of a seal width of 7 mm, a temperature of 190° C., a surface pressure of 0.6 MPa, and 3 seconds (FIG. 4*c*). In FIG. 4*c*, a shaded section S is a heat-sealed section (seal section S). Next, the test piece 13 was obtained by cutting in the machine direction (cutting at the position of the two-dot chain line in FIG. 4*d*) so that the width in the transverse direction was 15 mm (FIG. 4*e*). Next, using BE-501 manufactured by TESTER SANGYO CO., LTD., each obtained test piece 13 was fixed at the upper part in an environment of 80° C. as illustrated in the schematic diagram of FIG. 5, a weight W of 2 kg was hung at the lower part, and the time until the seal section S was broken was measured. The results are illustrated in Table 1B.

In Examples 7B to 10B, the types and contents of the antioxidant and the radical scavenger contained in the adhesive layer and the heat-sealable resin layer are as follows, respectively.

Examples 7B to 8B: The adhesive layer and the heat-sealable resin layer contain tris (2,4-di-t-butylphenoxy) phosphine and tetrakis (methylene-3-(3,5-di-t-butyl-4-hydroxyphenyl) propionate) methane in an amount of 0.4 mass % or less in total.

Examples 9B to 10B. The adhesive layer and the heat-sealable resin layer contain bis (2,4-dicumylphenyl) pentaerythritol diphosphite, tris (2,4-di-t-butylphenoxy) phosphine, tetrakis (methylene-3-3,5-di-t-butyl-4-hydroxyphenyl) propionate) methane, and 1'-hydroxy [2,2'-ethylidenebis [4,6-bis (1,1-dimethylpropyl) benzene]]1-yl acrylate in a total amount of 0.6 mass % or less.

Furthermore, an aluminum alloy foil (IS H4160:1994 A8021H-O (thickness 40 μm)) was prepared as a barrier layer. Next, a two-liquid urethane adhesive (polyol compound and aromatic isocyanate-based compound) was applied to one surface of the aluminum alloy foil to form an adhesive agent layer (thickness: 3 μm) on the barrier layer. Next, the adhesive agent layer on the barrier layer and the base material layer (ONy film side) were laminated by a dry lamination method, and an aging treatment was then performed to prepare a laminate of base material layer/adhesive agent layer/barrier layer. Both surfaces of the aluminum alloy foil are subjected to a chemical conversion treatment.

TABLE 1B

| | Adhesive layer | | | | | |
|---|---|---|---|---|---|---|
| | Ratio (%) of number of island portions with area of less than 0.10 $\mu m^2$ to 100% of all island portions | Ratio (%) of number of island portions with area of less than 0.15 $\mu m^2$ to 100% of all island portions | Ratio (%) of number of island portions with area of less than 0.25 $\mu m^2$ to 100% of all island portions | Ratio (%) of number of island portions with area of 1.50 $\mu m^2$ or more to 100% of all island portions | Melt extrusion conditions | Creep test Time until seal section is broken |
| Example 1B | 20 | 28 | 60 | 9 | A | 170 hours |
| Example 2B | 31 | 45 | 41 | 9 | B | 96 hours |
| Example 3B | 67 | 74 | 81 | 1 | A | 360 hours |
| Example 4B | 61 | 72 | 83 | 0 | A | 288 hours |
| Example 5B | 22 | 27 | 58 | 10 | A | 165 hours |
| Example 6B | 34 | 46 | 43 | 8 | B | 97 hours |
| Example 7B | 65 | 71 | 78 | 0 | A | 734 hours |
| Example 8B | 64 | 66 | 69 | 1 | B | 684 hours |
| Example 9B | 70 | 78 | 86 | 0 | A | 1003 hours |
| Example 10B | 71 | 75 | 80 | 5 | B | 146 hours |
| Comparative Example 1B | 18 | 25 | 34 | 10 | C | 20 hours |

As is apparent from the description in Table 1B, in the exterior materials for an electrical storage device of Examples 1B to 10B, the ratio of the total number of island portions having an area of less than 0.25 $\mu m^2$ to the total number of island portions having a sea-island structure in a cross-sectional image of an adhesive layer containing a polypropylene-based resin and polyethylene is 40% or more, and in the creep test at 80° C., the time until the seal portion is broken is very long, and the exterior materials are evaluated to be excellent in sealability in a high-temperature environment.

When the exterior material for an electrical storage device was produced in the same manner as in Examples 1B and 2B and Comparative Example 1B described above except that the melt extrusion condition D was adopted in the formation of the adhesive layer, the ratio of the total number of island portions having an area of less than 0.25 μm among the island portions to the total number of island portions having a sea-island structure in the cross-sectional image of the adhesive layer was less than 40%, and the time until the seal portion was broken in the creep test at 80° C. was shorter than those in Examples 1B to 10B.

<Manufacturing of Exterior Material for Electrical Storage Device>

Examples 1C and 2C and Comparative Examples 1C and 2C

A polyethylene terephthalate (PET) film (thickness: 12 μm) and a stretched nylon (ONy) film (thickness: 15 μm) were prepared, and a two-liquid urethane adhesive (a polyol compound and an aromatic isocyanate-based compound) was applied to the PET film (3 μm), and the PET film was adhered to the ONy film to obtain a base material layer. The chemical conversion treatment of the aluminum alloy foil was performed by applying a treatment liquid containing a phenol resin, a chromium fluoride compound and phosphoric acid to both surfaces of the aluminum alloy foil by a roll coating method in such a manner that the application amount of chromium was 10 $mg/m^2$ (dry mass), and baking.

Next, on the barrier layer of each laminate obtained as described above, maleic anhydride-modified polypropylene as an adhesive layer (thickness: 40 μm) and random polypropylene (composition of random polypropylene and polyethylene) as a heat-sealable resin layer (thickness: 40 μm) were melted and co-extruded, and the heat-sealable resin layer side was brought into contact with a cooling roll to be cooled (each of cooling conditions A and B to be described later), thereby laminating an adhesive layer/heat-sealable resin layer on the barrier layer to obtain an exterior material for an electrical storage device (total thickness: 153 μm) in which a base material layer (thickness: 30 μm including an adhesive)/an adhesive agent layer (3 μm)/a barrier layer (40 μm)/an adhesive layer (40 μm)/a heat-sealable resin layer (40 μm) were laminated in this order. In Example 2C, the content of polyethylene contained in the heat-sealable resin layer was reduced as compared with Example 1C. In Comparative Example 1C. the content of polyethylene contained in the heat-sealable resin layer was increased as compared with Example 1C. In Comparative Example 2C, the composition of the heat-sealable resin layer was the same as that in Example 1C, and the cooling condition B was adopted.

(Cooling Conditions)

Conditions for cooling by bringing the heat-sealable resin layer side into contact with a cooling roll are as follows. The cooling conditions employed in Examples and Comparative Examples are illustrated in Table 1C.

Cooling condition A: The difference between the temperature of the molten resin (the molten resin that forms the heat-sealable resin layer) that has been melted and co-extruded and the surface temperature of the cooling roll is set to 70° C. or more, and the molten resin is rapidly cooled to form a heat-sealable resin layer (the condition of suppressing the crystal growth of polyethylene).

Cooling condition B: The difference between the temperature of the molten coextruded molten resin (molten resin forming the heat-sealable resin layer) and the surface temperature of the cooling roll is set to 50° C. or less, and the molten resin is gently cooled to form the heat-sealable resin layer.

<Measurement of Ratio of Area and Number of Island Portions in Sea-Island Structure>

An exterior material for an electrical storage device was embedded in a thermosetting epoxy resin and cured. A cross section in a direction parallel to TD and in a thickness direction was prepared using a commercially available rotary microtome (EM UC6 manufactured by LEICA) and a glass knife, and at that time, the cross section was prepared with a normal temperature microtome. The heat-sealable resin layer of the exterior material for an electrical storage device together with the embedded resin was dyed with ruthenium tetroxide for 3 hours. When the resin is dyed, the resin expands, and the sea-island structure cannot be confirmed near the cross section. Therefore, the expanded portion is trimmed with the microtome. Then, a stained section having a thickness of about 100 nm collected from a cross section after being cut from about 1 μm to 2 μm using a diamond knife was observed as follows. Cross-sectional images of the stained sections were acquired using a field emission scanning electron microscope (S-4800 manufactured by Hitachi High-Technologies Corporation). Note that the cross-sectional image is a cross-sectional image acquired within a range from a surface on a side opposite to the side of the barrier layer of the heat-sealable resin layer to a portion having a thickness of 12.5% in a case where the total thickness of the layers located inside the barrier layer is 100%. The measurement conditions were acceleration voltage: 30 kV, emission current: 10 μA, detector: transmission detector, inclination: none (0°), and observation magnification: 5,000 times. Next, using image processing software (image analysis software attached to a Keyence electron Microscope VHX-5000) capable of binarizing the cross-sectional image, the island portion and the sea portion of the sea-island structure were binarized for the cross-sectional image. Specifically, measurement was started under the condition of luminance (standard) of image analysis software, the extraction region (measurement range) was set to a rectangular shape (length: 7 μm, width: 13 μm), the imaging size was set to standard (1600×1200), the inclination angle was set to 0 degree, the imaging mode was set to normal imaging, and the extraction target was set to a "dark region". Furthermore, the extraction missing part and the extra extraction part were corrected by automatic measurement, and the total area and the total number of extracted parts (island parts) were measured. At this time, the area and the number of all the island portions existing in the extraction region are each measured. Using the acquired data, the ratio of the total area of all the island portions to the area of the measurement range of the cross-sectional image (total area of island portions/area of measurement range of cross-sectional image), and among all island portions, the ratio of the total number of island portions having an area of 0.01 $\mu m^2$ or less (total number of island portions of 0.01 $\mu m^2$ or less/total number of all island portions), the ratio of the total number of island portions having an area of 0.02 $\mu m^2$ or less (total number of island portions of 0.02 $\mu m^2$ or less/total number of all island portions), the ratio of the total number of island portions of 0.03 $\mu m^2$ or less (total number of island portions of 0.03 $\mu m^2$ or less/total number of all island portions), the ratio of the total number of island portions of 0.30 $\mu m^2$ or more (total number of island portions of 0.30 $\mu m^2$ or more/total number of all island portions), and the ratio of the total number of island portions of 0.15 $\mu m^2$ or more (the total number of island portions of 0.15 $\mu m^2$ or more/the total number of all island portions) were calculated. The results are illustrated in Table 1C.

(Antioxidant)

In Examples and Comparative Examples, the types and contents of the antioxidants contained in the adhesive layer and the heat-sealable resin layer are as follows.

Example 1C: The adhesive layer and the heat-sealable resin layer contain tris (2,4-di-t-butylphenoxy) phosphine and tetrakis (methylene-3-(3,5-di-t-butyl-4-hydroxyphenyl) propionate) methane in an amount of 0.4 mass % or less in total.

Example 2C: The adhesive layer and the heat-sealable resin layer contain 0.4 mass % of tris (2,4-di-t-butylphenoxy) phosphine.

Comparative Example 1C: The adhesive layer and the heat-sealable resin layer contain tris (2,4-di-t-butylphenoxy) phosphine and tetrakis (methylene-3-(3,5-di-t-butyl-4-hydroxyphenyl) propionate) methane in a total amount of 0.4 mass % or less.

Comparative Example 2C: The adhesive layer and the heat-sealable resin layer contain tris (2,4-di-t-butylphenoxy) phosphine and tetrakis (methylene-3-(3,5-di-t-butyl-4-hydroxyphenyl) propionate) methane in an amount of 0.4 mass % or less in total.

<Whitening by Molding>

Each exterior material for an electrical storage device was cut into a rectangle having a length (MD: Machine Direction) of 90 mm×a width (TD) of 150 mm to prepare a test sample. The MD of the exterior material for an electrical storage device corresponds to the rolling direction (RD) of the aluminum alloy foil, and the TD of the exterior material for an electrical storage device corresponds to the TD of the aluminum alloy foil. Next, in an environment of 25° C., this test sample was cold-molded (draw molding in one stage) at a pressing pressure (surface pressure) of 0.1 MPa so as to obtain a molding depth of 6.0 mm using a rectangular molding die having a diameter of 31.6 mm (MD)×54.5 mm (TD) (female die, surface has a maximum height roughness (nominal value of $R_Z$) of 3.2 μm as specified in Table 2 of JIS B 0659-1.2002, Annex 1 (reference) comparative surface roughness standard piece, corner R of 2.0 mm, ridge R of 1.0 mm) and a molding die corresponding thereto (surfaces of the male die and the ridge portion have a maximum height roughness (nominal value of $R_Z$) of 1.6 μm as specified in Table 2 of JIS B 0659-1: 2002 Annex 1 (reference) comparative surface roughness standard piece, and surfaces other than the ridge portion have a maximum height roughness (nominal value of $R_Z$) of 3.2 μm as specified in Table 2 of JIS B 0659-1:2002 Annex 1 (reference) comparative surface roughness standard piece, corner R of 2.0 mm, ridge R of 1.0 mm). At this time, the test sample was placed on the female mold so that the heat-sealable resin layer side was positioned on the male mold side, and molding was performed. The male mold and the female mold had a clearance of 0.3 mm. The heat-sealable resin layer of the test sample after molding was visually observed to confirm the presence or absence of whitening. A sample without whitening was rated A, a sample with slight whitening was rated B, and a sample with clear whitening was rated C. The results are illustrated in Table 1C. The portion where whitening occurs is mainly around the side wall on the short side of the molded part.

<Insulation Quality>

The exterior material for an electrical storage device was cut into a sheet piece having a length (MD) of 160 mm×a width (TD) of 90 mm. Next, in an environment of 25° C., these sheet pieces were cold-molded (draw molding in one stage) at a pressing pressure (surface pressure) of 0.1 MPa so as to obtain a molding depth of 3.0 mm using a rectangular molding die having a diameter of 31.6 mm (MD)×54.5 mm (TD) (female die, surface has a maximum height roughness (nominal value of $R_Z$) of 3.2 μm as specified in Table 2 of JIS B 0659-1:2002, Annex 1 (reference) comparative surface roughness standard piece, corner R of 2.0 mm, ridge R of 1.0 mm) and a molding die corresponding thereto (surfaces of the male die and the ridge portion have a maximum height roughness (nominal value of $R_Z$) of 1.6 μm as specified in Table 2 of JIS B 0659-1: 2002 Annex 1 (reference) comparative surface roughness standard piece, and surfaces other than the ridge portion have a maximum height roughness (nominal value of $R_Z$) of 3.2 μm as specified in Table 2 of JIS B 0659-1:2002 Annex 1 (reference) comparative surface roughness standard piece, corner R of 2.0 mm, ridge R of 1.0 mm). Next, the molded sample piece was folded in two in the machine direction so that the heat-sealable resin layers faced each other, and cut so that the width of the end part on the MD side from the molded part was 3 mm to obtain a molded body. The position of the molded part was set such that the distance between the molded part and both end sides of the sheet piece in the TD was 25 mm and 32 mm, respectively.

Next, a polyethylene terephthalate plate (PET plate) having a thickness of 3.0 mm, a length (MD) of 30.0 mm, and a width (TD) of 52.5 mm, and an aluminum terminal having a thickness of 70 μm, a length (MD) of 55 mm, and a width (TD) of 5 mm were prepared. A tab film (formed of maleic anhydride-modified polypropylene) having a thickness of 100 μm and a width of 10 mm is wound around a central portion of the aluminum terminal. An aluminum terminal was attached to the end part of the MD of the PET plate using a paper tape, and the PET plate was inserted into the molded part of the molded body described above. At this time, the aluminum terminal protrudes from the molded part to the outside of the molded body, and the tab film is positioned between the heat-sealable resin layers of the molded body. In this state, the end side of the molded body from which the aluminum terminal protruded was heat-sealed under the conditions of a width of 3 mm, a surface pressure of 4.0 MPa, a sealing temperature of 170° C., and a sealing time of 3.0 seconds. Next, one end side orthogonal to the heat-sealed end side was heat-sealed under the conditions of a width of 3 mm, a surface pressure of 1.0 MPa, a sealing temperature of 170° C., and a sealing time of 3.0 seconds to form the molded body into a bag shape. Next, the bag-shaped molded body was stored in a dry room for 1 day, an electrolytic solution (Photosensitive component obtained by mixing lithium hexafluorophosphate in a solution in which ethylene carbonate, diethyl carbonate, and dimethyl carbonate were mixed at a volume ratio of 1:1:1 so that the lithium hexafluorophosphate was 1 mol/L.) was added from the remaining one open end side (opening), and the opening was heat-sealed under the conditions of a width of 3 mm, a surface pressure of 1.0 MPa, a sealing temperature of 170° C., and a sealing time of 3.0 seconds to seal the electrolytic solution in the molded body. Finally, the molded body was stored in an environment at 60° C. for 6 hours with the end side that was heat-sealed facing up. Next, the heat-sealable resin layers were heat-sealed along the molded part between the end side finally heat-sealed and the molded part under the conditions of a width of 3 mm, a surface pressure of 1.0 MPa, a sealing temperature of 170° C., and a sealing time of 3.0 seconds to obtain a test sample in which the electrolytic solution was sealed in the molded part.

Next, for the obtained test sample, the insulation quality between the barrier layer of the test sample and the aluminum terminal was evaluated using a tester (insulation resistance tester 3154 manufactured by HIOKI E.E. CORPORATION). First, 10 test samples were prepared. Next, one terminal of the tester was connected to the aluminum terminal of the test sample, and the other terminal was connected by an alligator clip so as to be in contact with the barrier layer of the exterior material for an electrical storage device. Next, a voltage of 25 V was applied between the testers, and a sample whose resistance value became 200 MΩ or more after 10 seconds was defined as pass (OK), a sample whose resistance value was less than 200 MCI after 10 seconds was defined as fail (NG), and the number of test samples of fail (NG) among the 10 test samples was illustrated in Table 1C.

TABLE 1C

| | Heat-sealable resin layer | | | | | | | | |
|---|---|---|---|---|---|---|---|---|---|
| | Ratio (%) of total area of island portions in sea-island structure | Ratio (%) of total number of island portions with area of 0.01 μm$^2$ or less to total number of island portions | Ratio (%) of total number of island portions with area of 0.02 μm$^2$ or less to total number of island portions | Ratio (%) of total number of island portions with area of 0.03 μm$^2$ or less to total number of island portions | Ratio (%) of total number of island portions with area of 0.15 μm$^2$ or more to total number of island portions | Ratio (%) of total number of island portions with area of 0.30 μm$^2$ or more to total number of island portions | Cooling conditions | Whitening by molding | Insulation quality (Number of NG out of 10) |
| Example 1C | 11.0 | 56.6 | 84.6 | 93.5 | 0.1 | 0.1 | A | B | 0/10 |
| Example 2C | 0.6 | 64.0 | 96.4 | 97.8 | 0.0 | 0.0 | A | A | 0/10 |
| Comparative Example 1C | 13.8 | 22.5 | 41.2 | 56.5 | 4.9 | 1.4 | A | C | 6/10 |
| Comparative Example 2C | 9.8 | 4.0 | 32.1 | 41.5 | 14.5 | 2.6 | B | C | 3/10 |

As is apparent from the description in Table 1C, in the exterior materials for an electrical storage device of Examples 1C and 2C, in the cross-sectional images of the heat-sealable resin layers containing polypropylene and polyethylene, the ratio of the total number of island portions having an area of 0.02 $\mu m^2$ or less to the total number of island portions having a sea-island structure is 80.0% or more, and whitening and deterioration of insulation quality due to molding are effectively suppressed.

As described above, the First Embodiment of the present disclosure provides the invention of the following aspects.

Item 1A. An exterior material for an electrical storage device, including a laminate that includes at least a base material layer, a barrier layer, and an inner layer in this order, in which the inner layer includes an adhesive layer and a heat-sealable resin layer from a side of the barrier layer, and when the inner layer is subjected to dynamic viscoelasticity measurement by tension, an elongation rate at 80° C. is 8.0% or less.

Item 2A. The exterior material for an electrical storage device according to item 1A, in which in a graph illustrating a relationship between an elongation rate and a temperature, the relationship being obtained by the dynamic viscoelasticity measurement, a temperature at an elongation rate of 10% is 85° C. or more.

Item 3A. The exterior material for an electrical storage device according to item 1A or 2A, in which an elongation rate at 110° C. is 15.0% or less in the dynamic viscoelasticity measurement for the inner layer.

Item 4A. The exterior material for an electrical storage device according to any one of item A1 to 3A, in which a ratio of a thickness of the heat-sealable resin layer to a thickness of the adhesive layer is 0.3 or more and 1.5 or less.

Item 5A. The exterior material for an electrical storage device according to any one of items 1A to 4A, in which the adhesive layer is made of a thermoplastic resin.

Item 6A. A method of manufacturing an exterior material for an electrical storage device, the method including a step of obtaining a laminate by laminating at least a base material layer, a barrier layer, and an inner layer in this order, in which the inner layer includes an adhesive layer and a heat-sealable resin layer from a side of the barrier layer, and when the inner layer is subjected to dynamic viscoelasticity measurement by tension, an elongation rate at 80° C. is 8.0% or less.

Item 7A. An electrical storage device in which an electrical storage device element including at least a positive electrode, a negative electrode and an electrolyte is accommodated in a packaging formed of the exterior material for an electrical storage device according to any one of items 1A to 5A.

Furthermore, the Second Embodiment of the present disclosure provides the invention of the following aspects.

Item 1B. An exterior material for an electrical storage device, including a laminate that includes at least a base material layer, a barrier layer, an adhesive layer, and a heat-sealable resin layer in this order, in which the adhesive layer contains a polypropylene-based resin and polyethylene, a sea-island structure is observed in a cross-sectional image acquired using a scanning electron microscope for a cross section of the adhesive layer in a direction parallel to a transverse direction (TD) and in a thickness direction, the cross-sectional image is a cross-sectional image acquired within a range from a surface of the adhesive layer on a side of the barrier layer to a portion having a thickness of 25% when a thickness of the adhesive layer is 100%, and in the cross-sectional image, a ratio of a total number of island portions having an area of less than 0.25 $\mu m^2$ to a total number of island portions of the sea-island structure is 40% or more.

Item 2B. The exterior material for an electrical storage device according to item 1, in which in the cross-sectional image of the adhesive layer, a ratio of a total number of island portions having an area of 1.50 $\mu m^2$ or more to a total number of island portions of the sea-island structure is 10% or less.

Item 3B. The exterior material for an electrical storage device according to item 1B or 2B, in which in the cross-sectional image of the adhesive layer, a ratio of a total number of island portions having an area of less than 0.15 $\mu m^2$ to a total number of island portions of the sea-island structure is 20% or more.

Item 4B. The exterior material for an electrical storage device according to item 1B or 2B, in which in the cross-sectional image of the adhesive layer, a ratio of a total number of island portions having an area of less than 0.10 $\mu m^2$ to a total number of island portions of the sea-island structure is 10% or more.

Item 5B. The exterior material for an electrical storage device according to any one of items 1B to 4B, in which the polypropylene-based resin of the adhesive layer is acid-modified polypropylene.

Item 6B. The exterior material for an electrical storage device according to any one of items 1B to 5B, in which the adhesive layer has a thickness of 5 μm or more.

Item 7B. The exterior material for an electrical storage device according to any one of items 1B to 6B, in which a resin that forms the heat-sealable resin layer contains a polyolefin backbone.

Item 8B. The exterior material for an electrical storage device according to any one of items 1B to 7B, in which at least one of layers on an inner side of the barrier layer contains at least one selected from the group consisting of an antioxidant and a radical scavenger.

Item 9B. The exterior material for an electrical storage device according to item 8B, in which the antioxidant is at least one selected from the group consisting of a phosphorus-based antioxidant and a phenol-based antioxidant.

Item 10B. The exterior material for an electrical storage device according to any one of items 1B to 9B, in which the radical scavenger is an alkyl radical scavenger.

Item 11B. A method of manufacturing an exterior material for an electrical storage device, the method including a step of obtaining a laminate by laminating at least a base material layer, a barrier layer, an adhesive layer, and a heat-sealable resin layer in this order from an outside toward an inside, in which the adhesive layer contains a polypropylene-based resin and polyethylene, a sea-island structure is observed in a cross-sectional image acquired using a scanning electron microscope for a cross section of the adhesive layer in a direction parallel to a transverse direction (TD) and in a thickness direction, the cross-sectional image is a cross-sectional image acquired within a range from a surface of the adhesive layer on a side of the barrier layer to a portion having a thickness of 25% when a thickness of the adhesive laver is 100%, and in the cross-sectional image, a ratio of a total number of island portions having an area of less than 0.25 $\mu m^2$ to a total number of island portions of the sea-island structure is 40% or more.

Item 12B. An electrical storage device in which an electrical storage device element including at least a positive electrode, a negative electrode and an electrolyte is accommodated in a packaging formed of the exterior material for an electrical storage device according to any one of items 1B to 10B.

Furthermore, the Third Embodiment of the present disclosure provides the invention of the following aspects.

Item 1C. An exterior material for an electrical storage device, including a laminate that includes at least a base material layer, a barrier layer, and a heat-sealable resin layer in this order from an outside toward an inside, in which the heat-sealable resin layer contains polypropylene and polyethylene, a sea-island structure is observed in a cross-sectional image acquired using a scanning electron microscope for a cross section of the heat-sealable resin layer in a direction parallel to a transverse direction (TD) and in a thickness direction, the cross-sectional image is a cross-sectional image acquired within a range from a surface of the heat-sealable resin layer on a side opposite to a side of the barrier layer to a portion having a thickness of 12.5% when a total thickness of layers located inside the barrier layer is 100%, in the cross-sectional image, a ratio of a total number of island portions having an area of 0.02 $\mu m^2$ or less to a total number of island portions of the sea-island structure is 80.0% or more, and at least one of the layers inside the barrier layer contains at least one of an antioxidant and a radical scavenger.

Item 2C. The exterior material for an electrical storage device according to item 1C, in which the antioxidant is at least one selected from the group consisting of a phosphorus-based antioxidant and a phenol-based antioxidant.

Item 3C. The exterior material for an electrical storage device according to item 1C or 2C, in which the radical scavenger is an alkyl radical scavenger.

Item 4C. The exterior material for an electrical storage device according to any one of items 1C to 3C, in which in the cross-sectional image of the heat-sealable resin layer, a ratio of a total area of the island portions of the sea-island structure to an area of a measurement range of the cross-sectional image is 12.0% or less.

Item 5C. The exterior material for an electrical storage device according to any one of items 1C to 4C, in which in the cross-sectional image of the heat-sealable resin layer, a ratio of a total number of island portions having an area of 0.03 $\mu m^2$ or less to a total number of island portions of the sea-island structure is 90.0% or more.

Item 6C. The exterior material for an electrical storage device according to any one of items 1C to 5C, in which in the cross-sectional image of the heat-sealable resin layer, a ratio of a total number of island portions having an area of 0.01 $\mu m^W$ or less to a total number of island portions of the sea-island structure is 50.0% or more.

Item 7C. The exterior material for an electrical storage device according to any one of items 1C to 6C, in which in the cross-sectional image of the heat-sealable resin layer, a ratio of a total number of island portions having an area of 0.30 $\mu m^2$ or more to a total number of island portions of the sea-island structure is 1.0% or less.

Item 8C. The exterior material for an electrical storage device according to any one of items 1C to 7C, further including an adhesive layer between the barrier layer and the heat-sealable resin layer.

Item 9C. The exterior material for an electrical storage device according to item 8C, in which the adhesive layer has a thickness of 5 $\mu m$ or more.

Item 10C. A method of manufacturing an exterior material for an electrical storage device, the method including a step of obtaining a laminate by laminating at least a base material layer, a barrier layer, and a heat-sealable resin layer in this order from an outside toward an inside, wherein the heat-sealable resin layer contains polypropylene and polyethylene, a sea-island structure is observed in a cross-sectional image acquired using a scanning electron microscope for a cross section of the heat-sealable resin layer in a direction parallel to a transverse direction (TD) and in a thickness direction, the cross-sectional image is a cross-sectional image acquired within a range from a surface of the heat-sealable resin layer on a side opposite to a side of the barrier layer to a portion having a thickness of 12.5% when a total thickness of layers located inside the barrier layer is 100%, in the cross-sectional image, a ratio of a total number of island portions having an area of 0.02 $\mu m^2$ or less to a total number of island portions of the sea-island structure is 80.0% or more, and at least one of the layers inside the barrier layer contains at least one of an antioxidant and a radical scavenger.

Item 11C. An electrical storage device in which an electrical storage device element including at least a positive electrode, a negative electrode and an electrolyte is accommodated in a packaging formed of the exterior material for an electrical storage device according to any one of items 1C to 9C.

DESCRIPTION OF REFERENCE SIGNS

1: Base material layer
2: Adhesive agent layer
3: Barrier layer
4: Heat-sealable resin layer
5: Adhesive layer
6: Surface coating layer
10: Exterior material for electrical storage device

The invention claimed is:

1. An exterior material for an electrical storage device, comprising a laminate that includes at least a base material layer, a barrier layer, an adhesive layer, and a heat-sealable resin layer in this order, wherein the adhesive layer contains a polypropylene-based resin and polyethylene, a sea-island structure is observed in a cross-sectional image acquired using a scanning electron microscope for a cross section of the adhesive layer in a direction parallel to a transverse direction (TD) and in a thickness direction, the cross-sectional image is a cross-sectional image acquired within a range from a surface of the adhesive layer on a side of the barrier layer to a portion having a thickness of 25% when a thickness of the adhesive layer is 100%, and in the cross-sectional image, a ratio of a total number of island portions having an area of less than 0.25 $\mu m^2$ to a total number of island portions of the sea-island structure is 40% or more, wherein in the cross-sectional image of the adhesive layer, a ratio of a total number of island portions having an area of less than 0.10 μ$m^2$ to a total number of island portions of the sea-island structure is 10% or more.

2. The exterior material for an electrical storage device according to claim 1, wherein in the cross-sectional image of the adhesive layer, a ratio of a total number of island portions having an area of 1.50 μ$m^2$ or more to a total number of island portions of the sea-island structure is 10% or less.

3. The exterior material for an electrical storage device according to claim 1, wherein in the cross-sectional image of the adhesive layer, a ratio of a total number of island portions having an area of less than 0.15 μ$m^2$ to a total number of island portions of the sea-island structure is 20% or more.

4. The exterior material for an electrical storage device according to claim 1, wherein the polypropylene-based resin of the adhesive layer is acid-modified polypropylene.

5. The exterior material for an electrical storage device according to claim 1, wherein the adhesive layer has a thickness of 5 μm or more.

6. The exterior material for an electrical storage device according to claim 1, wherein a resin that forms the heat-sealable resin layer contains a polyolefin backbone.

7. The exterior material for an electrical storage device according to claim 1, wherein at least one of layers on an inner side of the barrier layer contains at least one selected from the group consisting of an antioxidant and a radical scavenger.

8. The exterior material for an electrical storage device according to claim 7, wherein the antioxidant is at least one selected from the group consisting of a phosphorus-based antioxidant and a phenol-based antioxidant.

9. The exterior material for an electrical storage device according to claim 7, wherein the radical scavenger is an alkyl radical scavenger.

10. The exterior material for an electrical storage device according to claim 1, wherein the base material layer includes a laminate of polyamide film and polyester film, a laminate of polyamide film and polyamide film, or a laminate of polyester film and polyester film.

11. The exterior material for an electrical storage device according to claim 1, wherein the thickness of the laminate is 190 μm or less.

12. The exterior material for an electrical storage device according to claim 1, wherein the thickness of the base material layer is 50 μm or less.

13. The exterior material for an electrical storage device according to claim 1, wherein the barrier layer comprises at least one of stainless foil and aluminum foil.

14. The exterior material for an electrical storage device according to claim 1, wherein the thickness of the barrier layer is 45 μm or more.

15. The exterior material for an electrical storage device according to claim 1, wherein the heat-sealable resin layer is composed of a resin containing a polyolefin backbone.

16. The exterior material for an electrical storage device according to claim 1, wherein the heat-sealable resin layer contains at least one selected from the group consisting of a polyolefin, a cyclic polyolefin, a carboxylic acid-modified polyolefin, and a carboxylic acid-modified cyclic polyolefin.

17. The exterior material for an electrical storage device according to claim 1, wherein the heat-sealable resin layer is formed of a blended polymer obtained by combining two or more resin components.

18. The exterior material for an electrical storage device according to claim 1, wherein the heat-sealable resin layer contains at least one selected from the group consisting of a polyolefin, a cyclic polyolefin, a carboxylic acid-modified polyolefin, and a carboxylic acid-modified cyclic polyolefin, and wherein the heat-sealable resin layer is formed of a blended polymer obtained by combining two or more resin components.

19. The exterior material for an electrical storage device according to claim 1, wherein the heat-sealable resin layer has two or more layers with an identical resin component or different resin components.

20. The exterior material for an electrical storage device according to claim 1, wherein at least one of the surface and the inside of the heat-sealable resin layer contains two or more lubricants.

21. The exterior material for an electrical storage device according to claim 1, wherein at least one of the surface and the inside of the heat-sealable resin layer contains at least two species selected from the group consisting of saturated fatty acid amides, unsaturated fatty acid amides, substituted amides, methylol amides, saturated fatty acid bisamides, unsaturated fatty acid bisamides, fatty acid ester amides, and aromatic bisamides.

22. The exterior material for an electrical storage device according to claim 1, further comprising a surface coating layer on a side of the base material layer opposite to the barrier layer.

* * * * *